US012684576B2

(12) United States Patent (10) Patent No.: US 12,684,576 B2

Yamamoto et al. (45) Date of Patent: Jul. 14, 2026

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Ayako Horiuchi, Kanagawa (JP); Xuan Tuong Tran, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 337 days.

(21) Appl. No.: 17/799,874

(22) PCT Filed: Dec. 24, 2020

(86) PCT No.: PCT/JP2020/048334

§ 371 (c)(1),
(2) Date: Aug. 15, 2022

(87) PCT Pub. No.: WO2021/166440

PCT Pub. Date: Aug. 26, 2021

(65) Prior Publication Data

US 2023/0091216 A1 Mar. 23, 2023

(30) Foreign Application Priority Data

Feb. 21, 2020 (JP) ................................. 2020-028050

(51) Int. Cl.
H04W 72/21 (2023.01)
H04L 1/08 (2006.01)
H04W 72/0446 (2023.01)

(52) U.S. Cl.
CPC .............. H04W 72/21 (2023.01); H04L 1/08 (2013.01); H04W 72/0446 (2013.01)

(58) Field of Classification Search
CPC ...... H04W 72/21; H04W 72/0446; H04L 1/08
See application file for complete search history.

(56) References Cited

U.S. PATENT DOCUMENTS

| 11,153,059 B2 * | 10/2021 | Matsuda | ............... H04W 72/23 |
| 2004/0062321 A1 * | 4/2004 | Nakamura | ......... H04W 52/325 |
| | | | 375/295 |

(Continued)

FOREIGN PATENT DOCUMENTS

| KR | 20190075785 A | 7/2019 |
| WO | WO 2017134927 A1 | 8/2017 |

OTHER PUBLICATIONS

3GPP "3rd Generation Partnership Project; Technical Specification Group Radio Access Network; NR; Multiplexing and channel coding (Release 15)," 3GPP TS 38.212 V15.8.0, Dec. 2019, 101 pages.

(Continued)

*Primary Examiner* — Michael Thier
*Assistant Examiner* — Nevena Zecevic Sandhu
(74) *Attorney, Agent, or Firm* — Seed Intellectual Property Law Group LLP

(57) ABSTRACT

A terminal comprising a control circuit for controlling communications in units of a second symbol, each unit being associated with a plurality of first symbols, and a communication circuit for performing communications.

13 Claims, 33 Drawing Sheets

(56) References Cited

U.S. PATENT DOCUMENTS

| | | | |
|---|---|---|---|
| 2017/0163310 A1 | 6/2017 | Haug et al. | |
| 2018/0083758 A1* | 3/2018 | Islam | H04L 27/2602 |
| 2018/0183508 A1* | 6/2018 | Zhang | H04B 7/0669 |
| 2019/0020455 A1 | 1/2019 | Yamamoto et al. | |
| 2020/0288441 A1* | 9/2020 | Park | H04W 72/0446 |
| 2023/0042536 A1* | 2/2023 | Ma | H04L 5/0092 |

OTHER PUBLICATIONS

3GPP "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.

3GPP "3rd Generation Partnership Project; Technical Specification Group Radio Access Network; NR; Physical layer procedures for control (Release 15)," 3GPP TS 38.213 V15.8.0, Dec. 2019, 109 pages.

3GPP "3rd Generation Partnership Project; Technical Specification Group Services and System Aspects; System Architecture for the 5G System; Stage 2 (Release 16)," 3GPP TS 23.501 V16.1.0, Jun. 2019, 368 pages.

3GPP, "3rd Generation Partnership Project; Technical Specification Group Radio Access Network; NR; Base Station (BS) radio transmission and reception (Release 15)," 3GPP TS 38.104 V15.8.0, Dec. 2019, 227 pages.

3GPP, "3rd Generation Partnership Project; Technical Specification Group Radio Access Network; NR; Physical channels and modulation (Release 15)," 3GPP TS 38.211 V15.6.0, Jun. 2019, 97 pages.

3GPP, "3rd Generation Partnership Project; Technical Specification Group Radio Access Network; NR; Physical channels and modulation (Release 15)," 3GPP TS 38.211 V15.8.0, Dec. 2019, 97 pages.

3GPP, "3rd Generation Partnership Project; Technical Specification Group Radio Access Network; NR; Physical layer procedures for data (Release 15)," 3GPP TS 38.214 V15.8.0, Dec. 2019, 106 pages.

3GPP, "3rd Generation Partnership Project; Technical Specification Group Radio Access Network; NR; Physical layer procedures for data (Release 16)," 3GPP TS 38.214 V16.0.0, Dec. 2019, 147 pages.

3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020, 40 pages.

China Telecom, "New SID on NR coverage enhancement," RP-193240, Agenda Item: 9.1.1, 3GPP TSG Ran Meeting #86, Sitges, Spain, Dec. 9-12, 2019, 4 pages.

International Search Report, mailed Apr. 6, 2021, for International Patent Application No. PCT/JP2020/048334, 5 pages. (with English translation).

Panasonic, "NB-Iot Pusch link level evaluation," R1-160061, Agenda Item: 2.1.2.1, 3GPP TSG RAN WG1 IN-Iot Ad-Hoc Meeting, Budapest, Hungary, Jan. 18-20, 2016, 6 pages.

Tarokh et al., "Space-Time Block Codes from Orthogonal Designs," IEEE Transactions on Information Theory, 45(5):1456-1467, Jul. 5, 1999.

Office Action, dated Jan. 30, 2026, for Indian Patent Application No. 202227046808. (7 pages)(with English Translation).

* cited by examiner

TERMINAL AND COMMUNICATION METHOD

TECHNICAL FIELD

The present disclosure relates to a terminal and a communication method.

BACKGROUND ART

In recent years, a dramatic development of Internet of Things (IoT) has been expected with the expansion and diversification of radio services as a background. The usage of mobile communication is expanding to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. Given such a background, the 5th generation mobile communication systems (5G), which have been undergoing research and development and standardization, can flexibly provide radio communication in response to a wide variety of needs by enhanced mobile broadband (eMBB), massive machine type communication (mMTC), and ultra reliable and low latency communication (URLLC).

The 3rd Generation Partnership Project (3GPP) as an international standardizing body has been specifying New Radio (NR) as one of 5G radio interfaces.

CITATION LIST

Non-Patent Literature

NPL 1
3GPP T538.104 V15.8.0, "NR Base Station (BS) radio transmission and/or reception (Release 15)," 2019-12.
NPL 2
RP-193240, "New SID on NR coverage enhancement," China Telecom, December 2019.
NPL 3
3GPP TS 38.211 V15.8.0, "NR; Physical channels and modulation (Release 15)," 2019-12.
NPL 4
3GPP TS 38.212 V15.8.0, "NR; Multiplexing and channel coding (Release 15)," 2019-12.
NPL 5
3GPP TS 38.213 V15.8.0, "NR; Physical layer procedure for control (Release 15)," 2019-12.
NPL 6
3GPP TS 38.214 V15.8.0, "NR; Physical layer procedures for data (Release 15)," 2019-12.
NPL 7
3GPP TS 38.214 V16.0.0, "NR; Physical layer procedures for data (Release 16)," 2019-12.
NPL 8
V. Tarokh, H. Jafarkhani, and A. R. Calderbank, "Space-time block codes from orthogonal designs," IEEE Transaction on Information Theory, Vol. 45, No. 5, July 1999.

SUMMARY OF INVENTION

However, there is scope for further study on a method for enhancing channel estimation accuracy in radio communication.

One non-limiting and exemplary embodiment facilitates providing a terminal and a communication method each capable of enhancing channel estimation accuracy in radio communication.

A terminal according to an exemplary embodiment of the present disclosure includes: control circuitry, which, in operation, controls communication in units of certain symbols each being a symbol with which a plurality of first symbols is associated in one unit and being referred to as a second symbol; and communication circuitry which, in operation, performs the communication.

It should be noted that general or specific embodiment may be implemented as a system, a method, an integrated circuit, a computer program, a storage medium, or any selective combination thereof.

According to an exemplary embodiment of the present disclosure, it is possible to enhance channel estimation accuracy in radio communication.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings.

In NR, for example, in addition to a frequency band of 6 GHz or less, mainly within 700 MHz to 3.5 GHz band (e.g., may be referred to as Frequency Range 1 (FR1)), which has been used for cellular communication, a millimeter-wave band such as 28 GHz or 39 GHz band capable of ensuring a wide band (e.g., may be referred to as FR2) can be utilized (e.g., see Non-Patent Literature (hereinafter referred to as "NPL") 1). Further, for example, in FR1, a high frequency band is possibly used compared with the frequency band used in Long Term Evolution (LTE) or 3rd Generation mobile communication systems (3G) such as 3.5 GHz band. The higher the frequency band is, the greater a radio wave propagation loss is, and thus, the received quality of radio waves is likely to be deteriorated. Hence, in NR, for example, a method has been studied for ensuring almost the same communication area (or coverage) as to the Radio Access Technology (RAT) such LTE or 3G, in other words, ensuring the appropriate communication when the frequency band higher than that in LTE or 3G is used (e.g., see NPL 2).

[Time Domain Resource]

Figure 1:
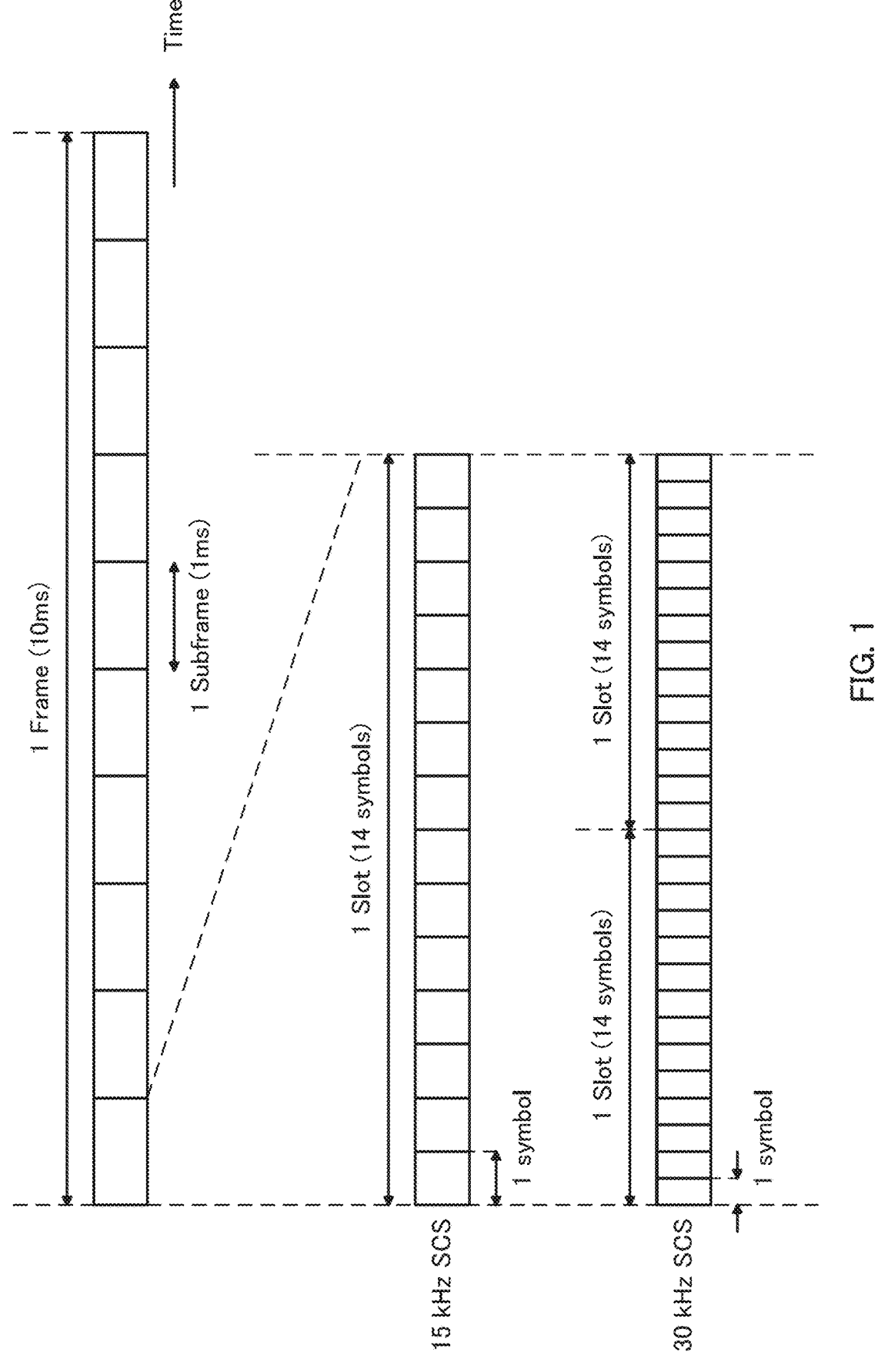
FIG. 1 illustrates configuration an example of a time domain resource.

In NR, a time domain resource such as a slot, a subframe, and a frame may be composed of, for example, time-resource units such as a plurality of Orthogonal Frequency Division Multiplexing (OFDM) symbols. For example, a slot may be composed of a plurality of OFDM symbols (e.g., 14 for Normal cyclic prefix (CP)) regardless of Subcarrier Spacing (SCS), a subframe is defined as a duration of 1 ms, and a frame may be defined by 10 subframes (e.g., see NPL 3). Incidentally, the slot may be understood to be equivalent to a unit time duration corresponding to a scheduling unit. FIG. 1 illustrates configuration an example of a time domain resource such as a symbol (e.g., OFDM symbol), a slot, a subframe, and a frame. As an example, FIG. 1 illustrates a configuration example when the sub-carrier spacing (SCS) is 15 kHz and 30 kHz.

Further, NR, for example, a terminal (e.g., may be also referred to as User Equipment (UE)) transmits and receives data in accordance with resource allocation indicated by a layer-1 control signal (e.g., Downlink Control Information: DCI) in a downlink control channel (e.g., Physical Downlink Control Channel: PDCCH) from a base station (e.g., may be also referred to as gNB) (e.g., see NPLs 4 to 6). For example, in downlink, the base station may assign a downlink data channel (e.g., Physical Downlink Shared Channel: PDSCH) and transmit, by PDCCH, DCI for PDSCH. The terminal may receive and decode PDCCH and perform reception, demodulation, and decoding of PDSCH based on control information included in PDCCH (e.g., DCI).

Here, with respect to the assignment of PDSCH, the control information included in DCI may include, for example, information on a time domain resource (hereinafter may be also referred to as "time domain resource information") to which PDSCH is assigned. The time domain resource information may be, for example, information on a timing (e.g., number of slots "$K_0$"), e.g., how many slots later the terminal receives PDSCH since the slot in which the terminal has received PDCCH, a starting symbol position of PDSCH in a slot (e.g., starting symbol "$S_{PDSCH}$"), or the number of symbols to which PDSCH is assigned (e.g., number of symbols "$L_{PDSCH}$").

In addition, the terminal may feed back, to the base station, for example, a response signal (e.g., Acknowledgement/Negative Acknowledgement (ACK/NACK) or Hybrid Automatic Repeat Request (HARQ)-ACK) indicating success or failure of decoding for PDSCH by using, for example, an uplink control channel (e.g., Physical Uplink Control Channel (PUCCH)) (e.g., see NPL 5).

Further, the terminal may use, for example, PUCCH to transmit, in addition to ACK/NACK, downlink channel state information (e.g., Channel State Information (CSI)) and uplink radio resource allocation request (e.g., Scheduling Request (SR)) to the base station. ACK/NACK, CSI, and SR may be also referred to as uplink control information (e.g., Uplink Control Information (UCI)).

Further, for example, when transmitting ACK/NACK for PDSCH assigned by DCI, the terminal may transmit PUCCH including ACK/NACK in accordance with resource allocation indicated by DCI from the base station.

Here, with respect to a PUCCH assignment, the control information included in DCI may include, for example, information on a PUCCH resource. The PUCCH resource may be configured with, for example, a plurality of parameters. Of the parameters configuring the PUCCH resource, the time domain resource information may be, for example, information on a starting symbol position of PUCCH in a slot (e.g., starting symbol "startingSymbolIndex") and on the number of symbols in which PUCCH is transmitted (e.g., number of symbols "nrofSymbols"). Moreover, the control information included in DCI may include information on a timing, e.g., how many slots later PUCCH is transmitted since the slot in which PDSCH has been received (e.g., number of slots "k").

Further, with respect to CSI or SR, a PUCCH resource may be designated (in other words, configured, indicated, or instructed) from the base station by, for example, a higher layer signal (may be also referred to as radio resource control (RRC) signal, higher layer signaling, or higher layer parameter).

Figure 2:
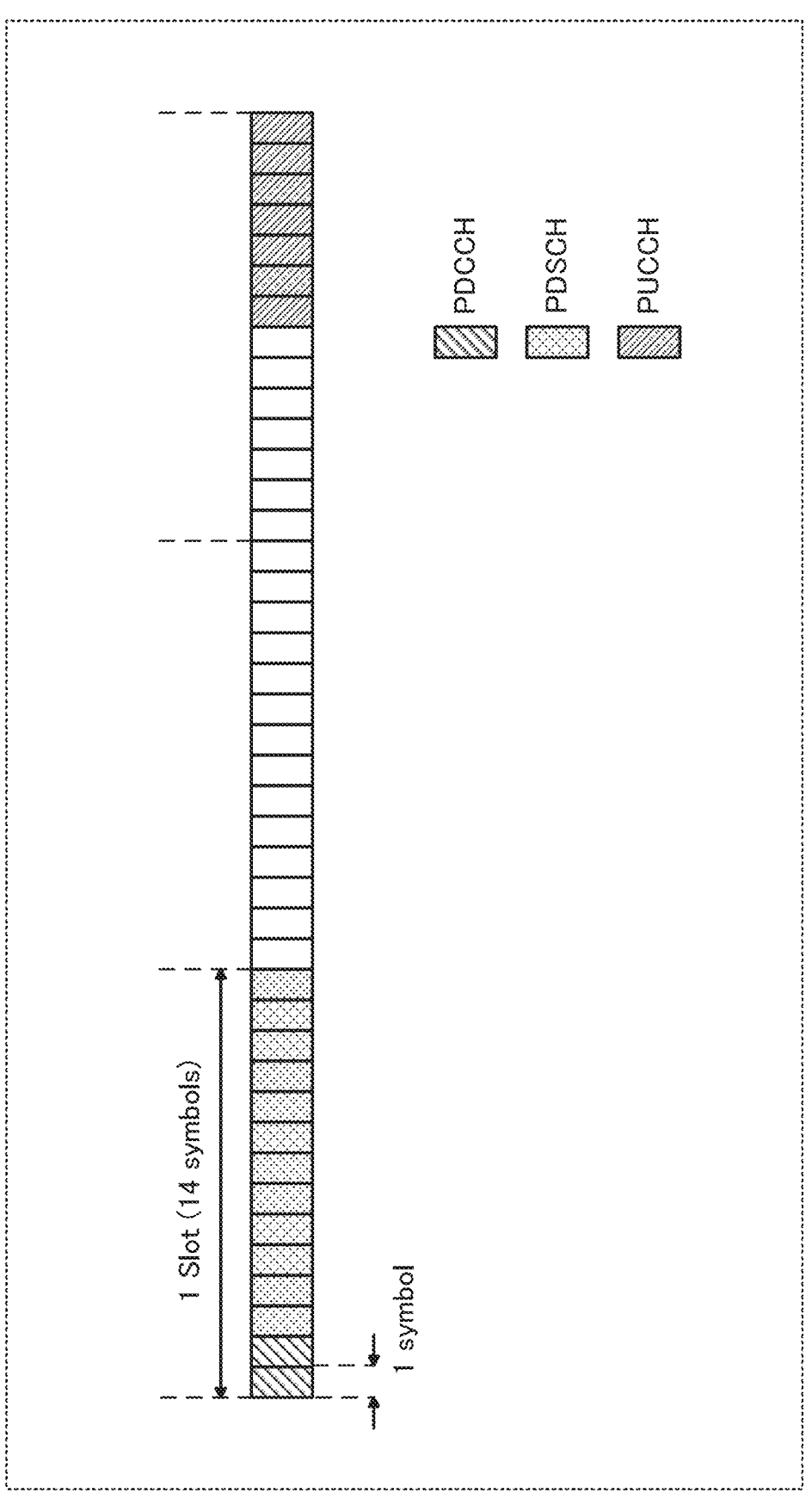
FIG. 2 illustrates a transmission example of downlink data.

FIG. 2 illustrates an example of time domain resource allocation for PDCCH, PDSCH, and PUCCH in a downlink data transmission. In FIG. 2, as an example, $K_0=0$, $S_{PDSCH}=2$, $L_{PDSCH}=12$, k=2, startingSymbolIndex=7, and nrofSymbols=7. In FIG. 2, for example, 14 symbols in a slot are denoted by symbol numbers of 0 to 13 (e.g., symbols #0 to #13). In FIG. 2, for example, PDSCH is transmitted in symbols having $L_{PUSCH}=12$ symbols #2 to #13) from the symbol having $S_{PUSCH}=2$, in the slot after $K_0=0$ slots (i.e., slot in which PDCCH has been received) from the slot in which the terminal has received PDCCH. Further, in FIG. 2, for example, PUCCH is transmitted in symbols having nrofSymbols=7 (e.g., symbols #7 to #13) from the symbol having startingSymbolIndex=7, in the slot after k=2 slots from the slot in which the terminal has received PDSCH.

Besides, for example, in uplink, the terminal may transmit an uplink data channel (e.g., Physical Uplink Shared Channel: PUSCH) according to resource allocation (e.g., Grant) indicated by DCI in PDCCH from the base station (e.g., see NPLs 4 to 6).

Here, with respect to the assignment of PUSCH, the control information included in DCI may include, for example, information on a time domain resource in which PUSCH is transmitted. The time domain resource information may be, for example, information on a timing (e.g., number of slots "$K_2$"), e.g., how many slots later the terminal transmits PUSCH since the slot in which the terminal has received PDCCH, a starting symbol position of PUSCH in a slot (e.g., starting symbol "$S_{PUSCH}$"), or the number of symbols in which PUSCH is transmitted (e.g., number of symbols "$L_{PUSCH}$").

Figure 3:
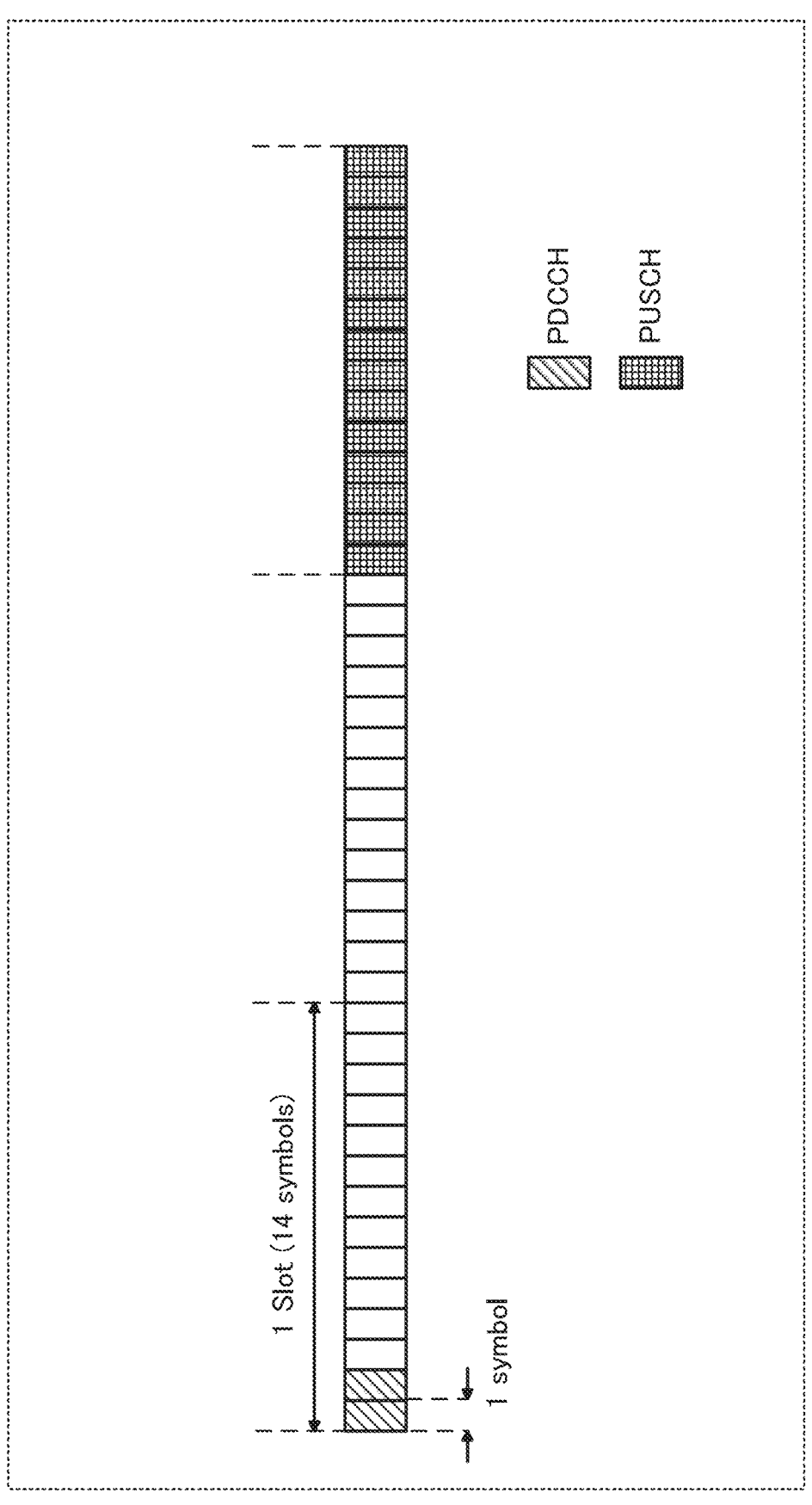
FIG. 3 illustrates a transmission example of uplink data.

FIG. 3 illustrates an example of time domain resource allocation for PDCCH, PUSCH in an uplink data transmission. In FIG. 3, as an example, $K_2=2$, $S_{PUSCH}=0$, and $L_{PUSCH}=14$. In FIG. 3, for example, 14 symbols in a slot are denoted by symbol numbers of 0 to 13 (e.g., symbols #0 to #13). In FIG. 3, for example, PUSCH is transmitted in symbols having $L_{PUSCH}=14$ (e.g., symbols #0 to #13) from the symbol having $S_{PUSCH}=0$, in the slot after $K_2=2$ slots from the slot in which the terminal has received PDCCH.

Further, in NR, a Grant-free transmission (or Configured Grant transmission) is supported in which the terminal transmits PUSCH by using a pre-designated (or preconfigured) resource, without allocation from the base station (e.g., Grant) (e.g., see NPL 4 or 6). Examples of methods for designating a resource in the Grant-free transmission include "Type 1" in which a transmission parameter such as a period of transmission resources or a time domain resource is previously configured by the higher layer signal (e.g., RRC) and "Type 2" in which designation of some transmission parameters such as the time domain resource can be changed semi-persistently by DCI.

[Channel Estimation]

In NR, for example, a reference signal (e.g., Demodulation Reference Signal: DMRS) to be used in channel estimation for demodulation may be mapped in resources for PDCCH, PDSCH, PUCCH, and PUSCH. DMRS may be mapped, for example, in front of a slot. Alternatively, DMRS may be mapped in, for example, a plurality of symbols in the slot (e.g., see NPL 3, 5, or 6).

Further, in NR Rel. 15, for example, PDSCH, PUCCH, and PUSCH may be transmitted repeatedly (or also referred to as repetition) using a plurality of slots (e.g., in units of slots) (e.g., see NPL 5 or 6). For example, information on whether the terminal applies the repetition and the number of repetitions (e.g., number of slots) when performing repeated transmission may be semi-statically indicated from the base station to the terminal by an UE-specific higher-layer signal (e.g., RRC signal). Meanwhile, when the repetition is applied, a common time domain resource allocation may be applied in a plurality of slots, for example.

Figure 4:
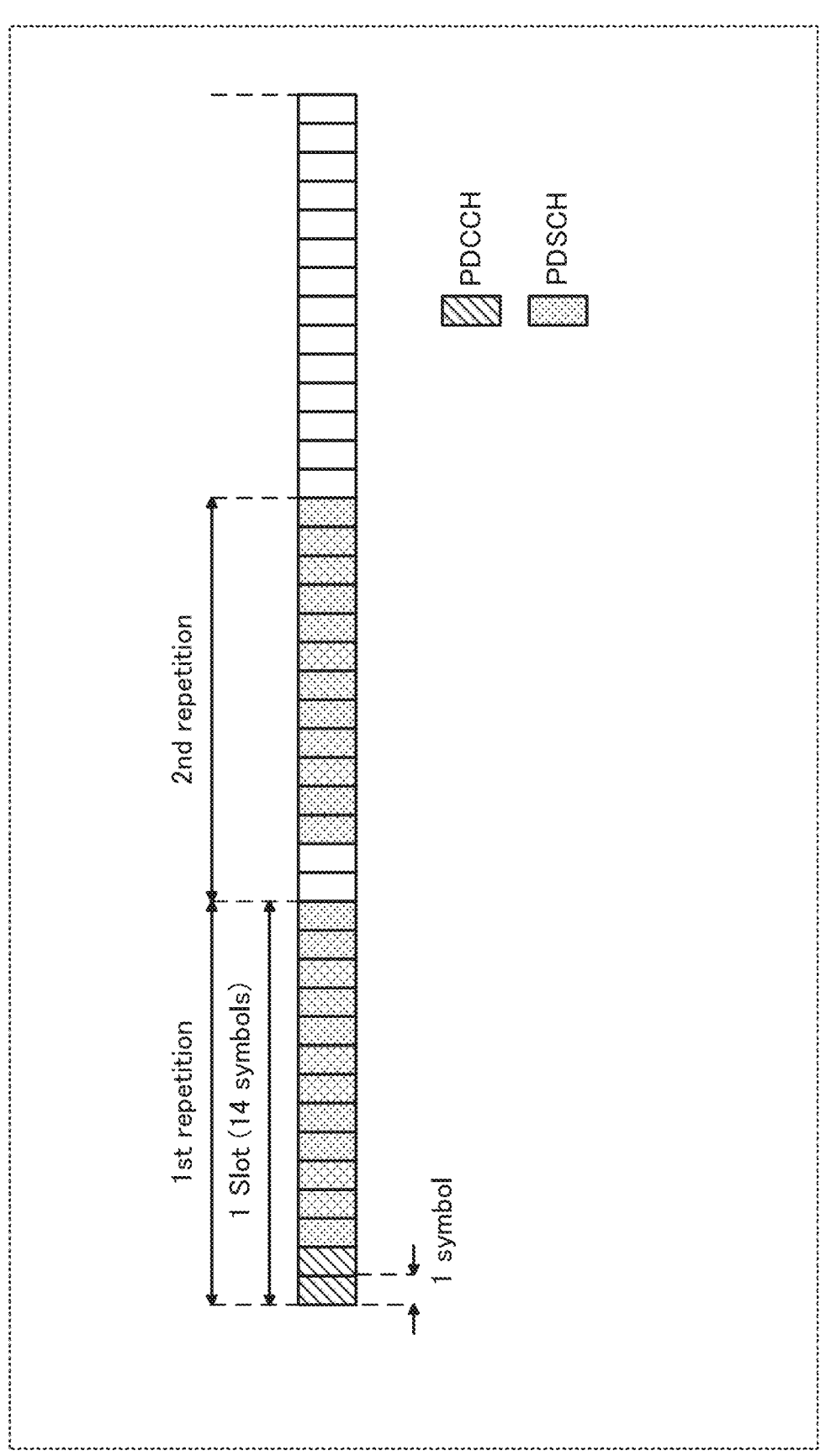
FIG. 4 illustrates an exemplary Physical Downlink Shared Channel (PDSCH) repetition.

FIG. 4 illustrates an exemplary Repetition of PDSCH in NR Rel. 15. FIG. 4 illustrates an example in which $K_0=0$. $S_{PDSCH}=2$, $L_{PDSCH}=12$, and the number of repetitions=2 slots are set. As illustrated in FIG. 4, with respect to PDSCH to which the repetition is applied, a common time domain resource allocation (in other words, symbol assignment) is applied in the slots corresponding to durations of the first and second repetitions, respectively. Incidentally, the term "duration" may be replaced with "transmission duration." and "transmission occasion or transmission opportunity."

In the following description, such a repetition scheme is referred to as "slot-level Repetition" (repetition in units of slots).

Meanwhile, in NR Rel. 16, for example, a method is defined in which, for transmission of PUSCH, one or more PUSCHs are repeatedly transmitted in one slot (see, e.g., NPL 7). In this method, for example, the base station indicates, to the terminal, allocation of a time resource (e.g., $K_2$, $S_{PUSCH}$, and $L_{PUSCH}$) for the first (i.e., initial) PUSCH transmission (e.g., first repetition) and the number of repetitions. Additionally, in this method, for example, symbol(s) contiguous to the last PUSCH transmission in the same number of symbols as the last PUSCH transmission may be assigned as the time resource allocation for the second and subsequent PUSCH transmissions.

Figure 5:
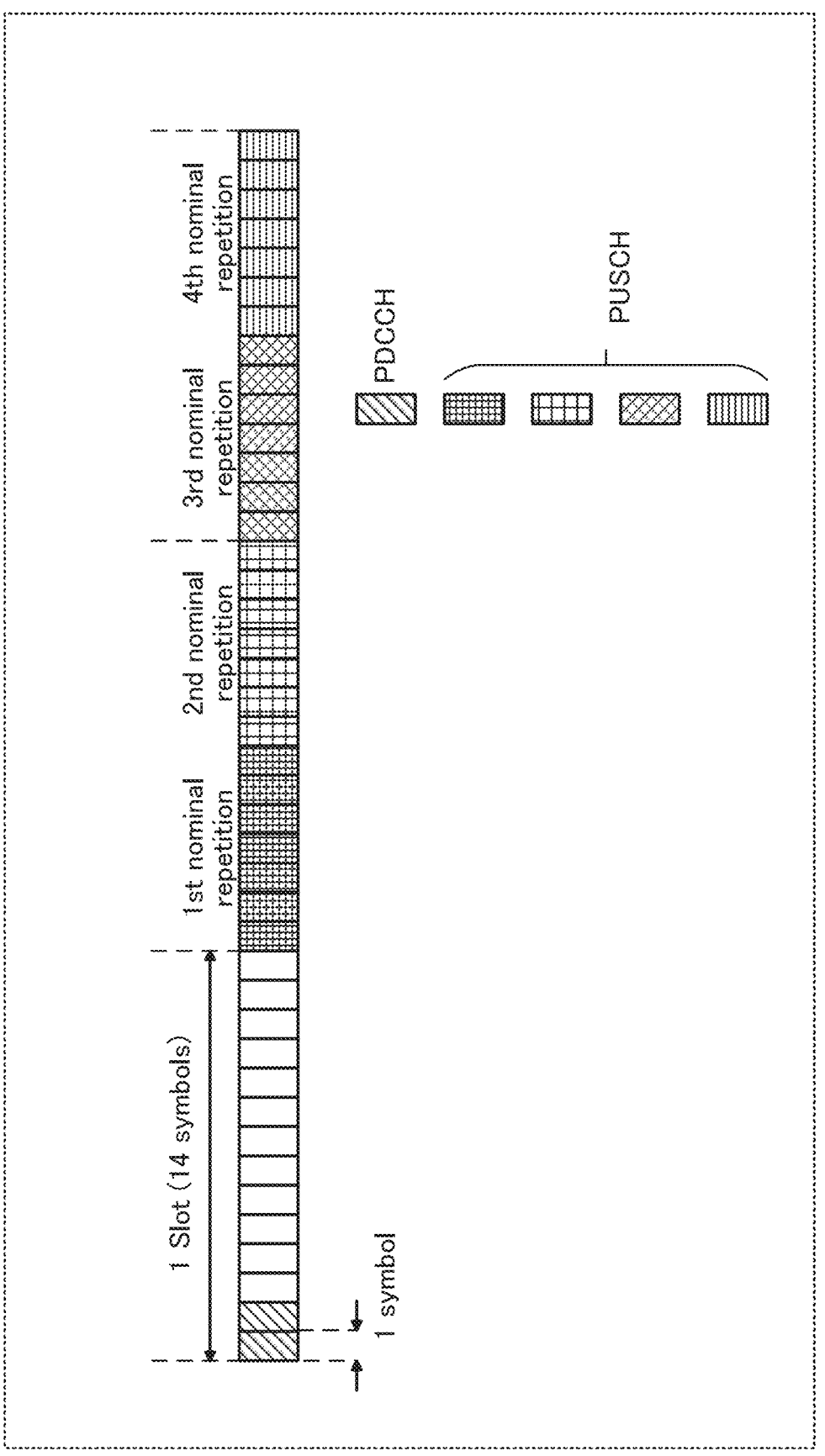
FIG. 5 illustrates an exemplary Physical Uplink Shared Channel (PUSCH) repetition.

FIG. 5 illustrates an exemplary PUSCH Repetition in NR Rel. 16. FIG. 5 illustrates an example in which $K_2=1$, $S_{PUSCH}=0$, $L_{PUSCH}=7$, and the number of repetitions=4 slots are set. As illustrated in FIG. 5, to PUSCH to which the repetition is applied, symbols contiguous to the last PUSCH transmission in the same number of symbols as the last PUSCH transmission (e.g., seven symbols) are assigned in the second and subsequent repetition durations.

In the following description, such a repetition scheme is referred to as "mini-slot-level Repetition" (repetition in units of mini-slots) Incidentally, the mini-slot may be understood as, for example, a time-resource unit shorter than a slot.

Note that, in the environment where the lower the index indicating communication quality such as a Signal-to-Noise power Ratio (SNR) or a Signal-to-Interference plus Noise power Ratio (SINR) to which Coverage Enhancement (CE) can be applied is, the more likely the channel estimation accuracy is deteriorated.

For improved coverage, introduction of the above-mentioned Repetitions is assumed, for example, but in NR, it is defined that, for example, a channel estimation result demodulated by DMRS can be used in a slot in which the DMRS is included. That is, in this definition, the channel estimation result by DMRS is not used in a slot different from the slot including the DMRS.

Thus in the above-mentioned Repetitions in NR, as reception processing, for example, a method may be adopted in which channel estimation is performed for each slot, the obtained channel estimation value per slot is used for demodulating and decoding data of each slot, and thereby an output of the decoding result (e.g., Log Likelihood Ratio (LLR) is combined.

In this method, for example, the output result for each slot (e.g., LLR) can be combined for data. On the other hand, in this method, since channel estimation is performed for each slot, the channel estimation accuracy is less likely to be improved. For example, in a case where a channel estimation value with reduced estimation accuracy is used for demodulating and decoding data of each slot, a combining gain from the Repetition may not be sufficiently obtained. Thus, it is expected to improve the channel estimation accuracy in Repetition.

Figure 6:
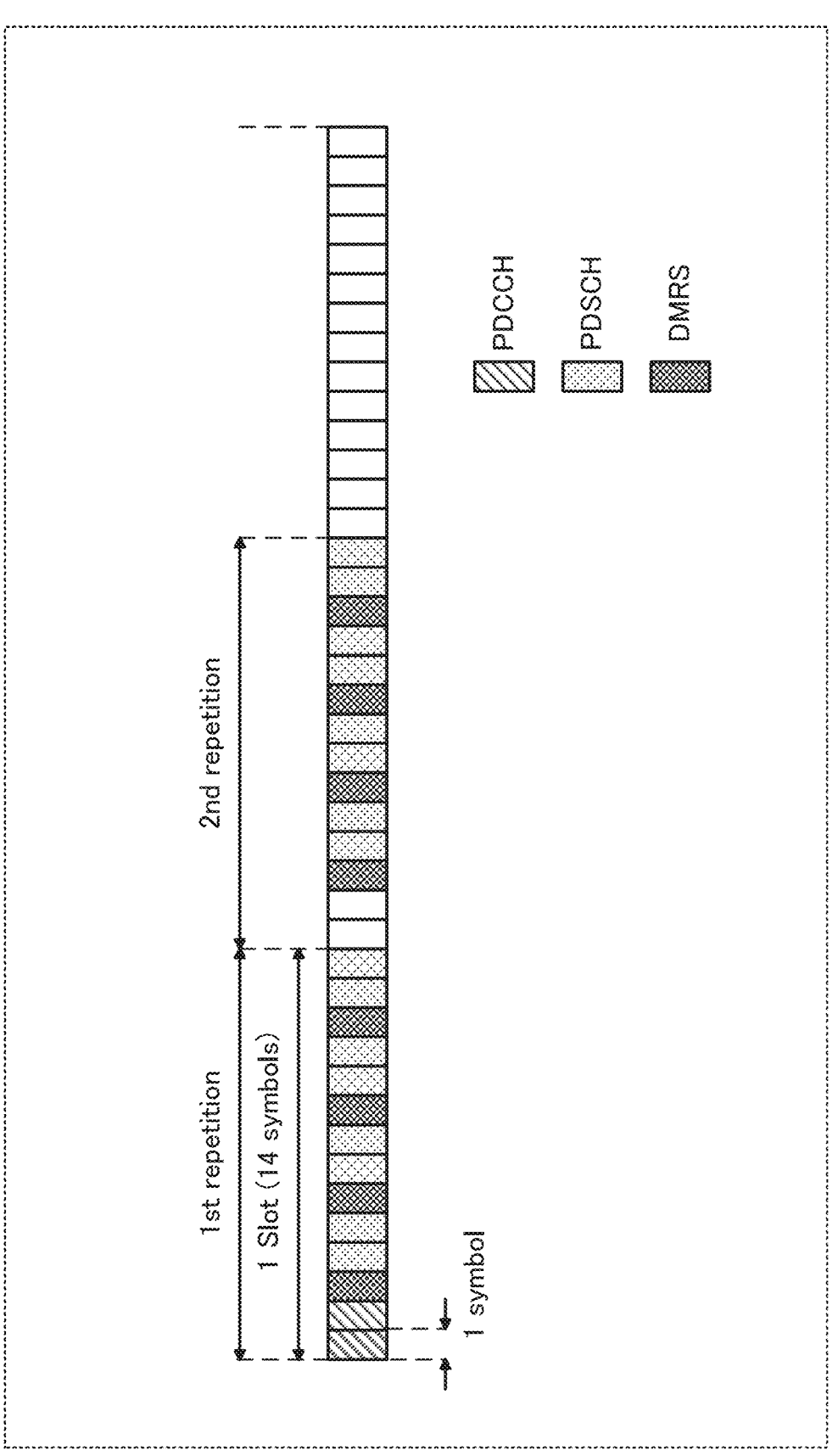
FIG. 6 illustrates a mapping example of Additional Demodulation Reference Signal (DMRS)

An example of a method for improving the channel estimation accuracy includes a method in which Additional DMRS mapping is applied, as employed in NR. In this method, for example, as illustrated in FIG. 6, DMRS may be mapped to a plurality of symbols in a slot. However, when Additional DMRS is used, an overhead of DMRS is likely to increase, and thus, the transmission efficiency may be lowered.

Figure 7:
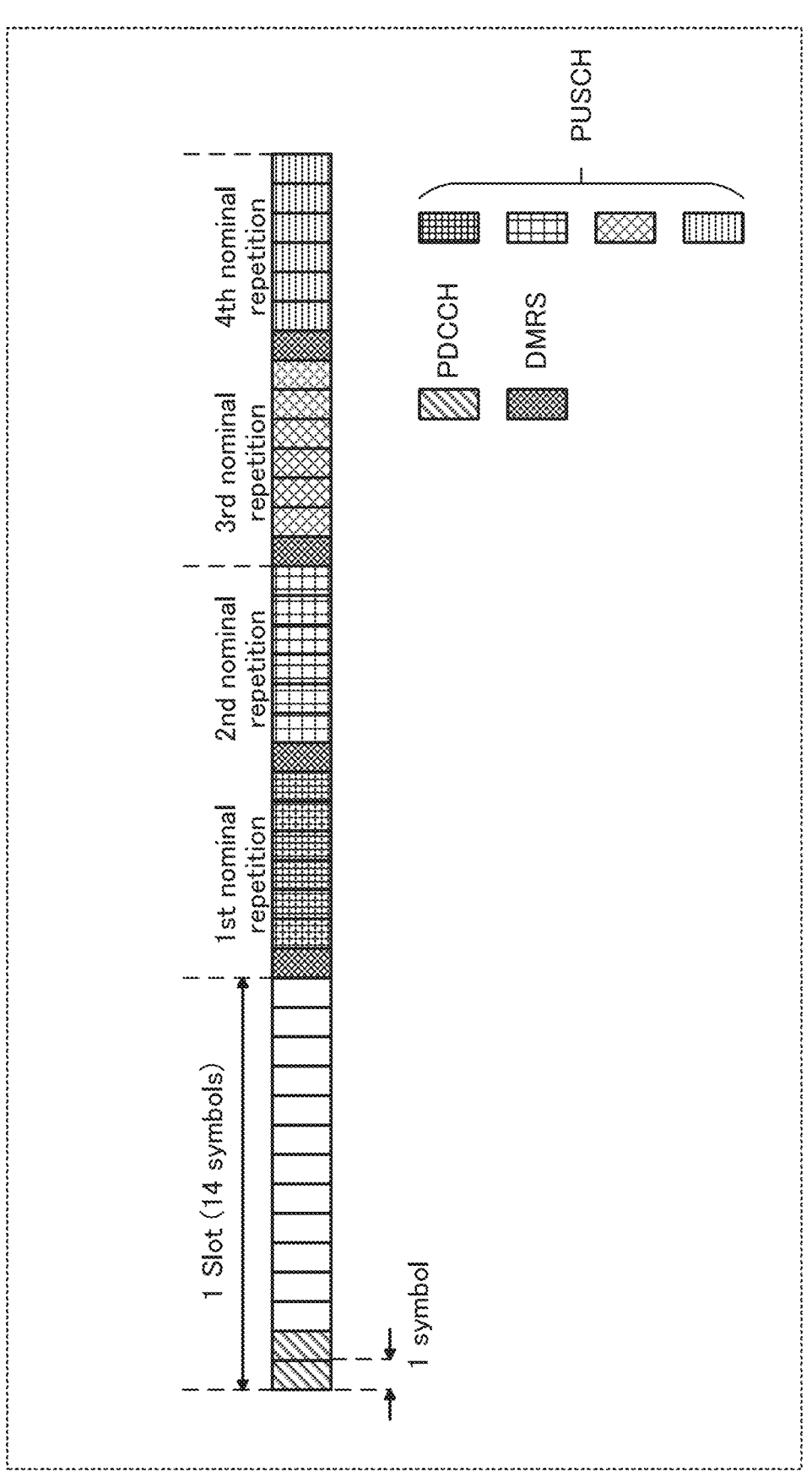
FIG. 7 illustrates another mapping example of Additional DMRS.

Further, it can be said that the above-mentioned PUSCH repetition in NR Rel. 16 (e.g., mini-slot-level Repetition) is also a method for improving the channel estimation accuracy because, for example, as illustrated in FIG. 7, DMRS is mapped to each of a plurality of repetition durations, and the number of DMRS symbols in one slot can be increased. However, in the PUSCH repetition in NR Rel. 16, for example, since DMRS is mapped to each of Repetition durations, an overhead of DMRS may be increased, and thus, the transmission efficiency may be lowered as in the case of applying the Additional DMRS.

Another example of a method for improving the channel estimation accuracy includes, for example, a method in which channel estimation is performed by combination of DMRS in a plurality of slots. For example, by making the above-mentioned channel estimation result demodulated by DMRS usable not only in the slot including the DMRS but also in other slots, received SNR of DMRS used for channel estimation is improved (i.e., inter-slot channel estimation). However, in the inter-slot channel estimation, channel estimation can be performed after receiving a plurality of slots for combining DMRS; accordingly, the processing latency in decoding and demodulation of the data may increase. For this reason, the inter-slot channel estimation may not take advantage of the latency reduction in the demodulation processing by Front-load DMRS employed in NR, for example. In addition, for example, in an environment where the coverage enhancement may be applied (e.g., environment where terminal moves), the effect of the inter-slot channel estimation may be small as compared to an environment where the coverage enhancement is not applied.

In one non-limiting exemplary embodiment of the present disclosure, a description will be given of methods (may be also referred to as a "framework") for improving the channel estimation accuracy in radio communications including, for example, Repetition.

[Overview of Communication System]

A communication system according to each embodiment of the present disclosure includes base station 100 and terminal 200.

Figure 8:
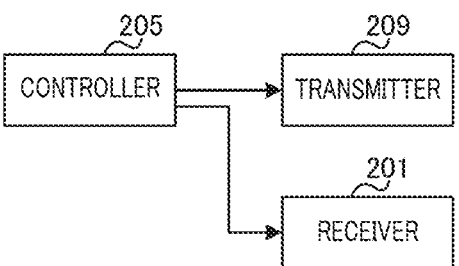
FIG. 8 is a block diagram illustrating a configuration example of a part of a terminal.

FIG. 8 is a block diagram illustrating a configuration example of a part of terminal 200 according to an exemplary embodiment of the present disclosure. In terminal 200 illustrated in FIG. 8, controller 205 (e.g., corresponding to control circuitry) controls communication in units of second symbols (e.g., "Virtual symbols" to be described later) in which a plurality of first symbols (e.g., "Normal symbol" to be described later) is associated in one unit, while receiver 201 and transmitter 209 (e.g., corresponding to communication circuitry) perform the communication.

[Configuration of Base Station]

Figure 9:
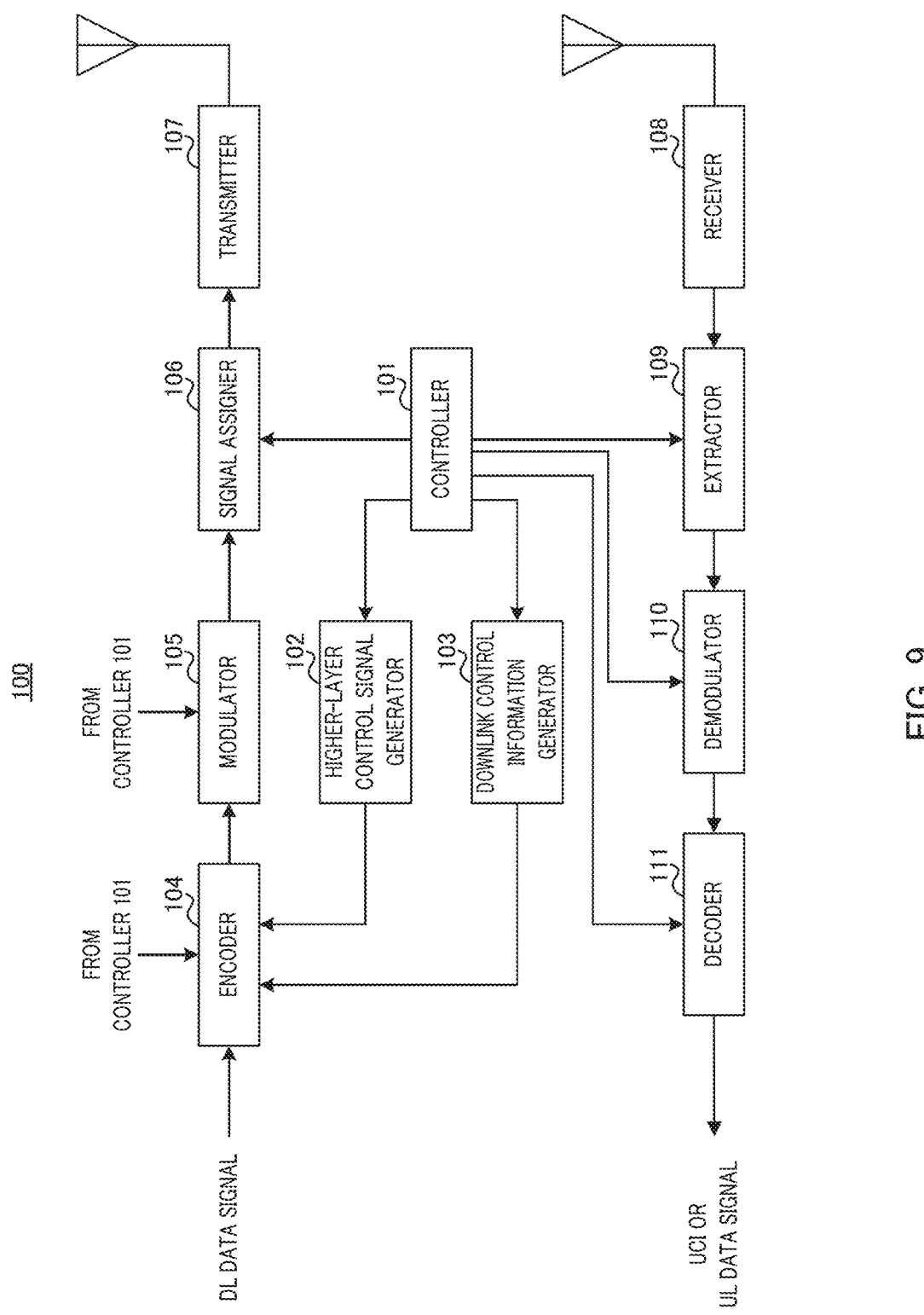
FIG. 9 is a block diagram illustrating a configuration example of a base station.

FIG. 9 is a block diagram illustrating a configuration example of base station 100 according to Embodiment 1. In FIG. 9, base station 100 includes controller 101, higher-layer control signal generator 102, downlink control information generator 103, encoder 104, modulator 105, signal assigner 106, transmitter 107, receiver 108, extractor 109, demodulator 110, and decoder 111.

Controller 101 determines, for example, information on "Symbol-level Repetition" (repetition in units of symbols) for terminal 200 and outputs the determined information to higher-layer control signal generator 102 or downlink control information generator 103.

Incidentally, an example of the Symbol-level Repetition will be described later.

Further, controller 101 determines, for example, information on PDSCH reception, information on PUSCH transmission, and information on PUCCH transmission for terminal 200 and outputs the determined information to higher-layer control signal generator 102. The information on PDSCH reception and the information on PUSCH transmission may include, for example, information on Time domain resource Allocation (TDRA). The information on TDRA (sometimes referred to as "TDRA information") may be represented in a table format (TDRA table). Further, the information on PUCCH transmission may include, for example, information on a PUCCH resource set (e.g., candidate for PUCCH resource).

Controller 101 also determines information on a downlink signal for transmitting a downlink data signal (e.g., PDSCH), a higher-layer control signal (e.g., RRC signal), or downlink control information (e.g., DCI), for example. The information on the downlink signal may include information such as a Modulation and Coding Scheme (MCS) and radio resource allocation. Controller 101, for example, outputs the determined information to encoder 104, modulator 105, and signal assigner 106. In addition, controller 101 outputs information on the downlink signal, such as the data signal or the higher-layer control signal, to downlink control information generator 103.

Moreover, controller 101 determines, for example, a PUCCH resource for terminal 200 to transmit an uplink control signal (e.g., PUCCH) and outputs information on the determined resource to, for example, extractor 109, demodulator 110, and decoder 111.

Furthermore, controller 101 determines, for example, information (e.g., encoding and modulation scheme (MCS) and radio resource allocation) on an uplink signal for terminal 200 to transmit an uplink data signal (e.g., PUSCH) and outputs the determined information to downlink control information generator 103, extractor 109, demodulator 110, and decoder 111.

Note that, controller 101 may determine the information on the downlink signal, the information on the PUCCH resource, or the information on the uplink signal, based on, for example, methods described below (e.g., method such as resource allocation, DMRS mapping or additional Repetition).

Higher-layer control signal generator 102, for example, generates a higher-layer control signal bit string based on information input from controller 101 and outputs the higher-layer control signal bit string to encoder 104.

Downlink control information generator 103, for example, generates a downlink control information (e.g., DCI) bit string based on information input from controller 101 and outputs the generated DCI bit string to encoder 104. Note that, the control information may be transmitted to a plurality of terminals.

Encoder 104, for example, encodes downlink data (e.g., DL data signal), a bit string input from higher-layer control signal generator 102, or a DCI bit string input from downlink control information generator 103, based on information input from controller 101. Encoder 104 outputs the encoded bit string to modulator 105.

Modulator 105, for example, modulates an encoded bit string input from encoder 104, based on information input from controller 101, and outputs the modulated signal (e.g., symbol string) to signal assigner 106.

Signal assigner 106, for example, maps, to a radio resource, a symbol string (including, for example, downlink data or control signal) input from modulator 105, based on radio resource-indicating information input from controller 101. Signal assigner 106 outputs, to transmitter 107, a downlink signal to which the signal is mapped.

Transmitter 107, for example, performs transmission-waveform generation processing such as orthogonal Frequency Division Multiplexing (OFDM) on a signal input from signal assigner 106. In addition, in the case of, for example, an OFDM transmission in which a cyclic prefix (CP) is added, transmitter 107 performs Inverse Fast Fourier Transform (IFFT) processing on a signal, and adds the CP to the signal resulting from the IFFT. Moreover, transmitter 107 performs RF processing such as D/A conversion or up-conversion on a signal, and transmits the resulting radio signal to terminal 200 via an antenna.

Receiver 108, for example, performs RF processing such as down-conversion or A/D conversion on an uplink signal received from terminal 200 via the antenna. Further, in the case of the OFDM transmission, receiver 108 performs Fast Fourier Transform (FFT) processing on a received signal, and outputs the resulting frequency-domain signal to extractor 109.

Extractor 109, for example, extracts a radio resource part with which an uplink signal (e.g., PUSCH or PUCCH) to be transmitted by terminal 200 is transmitted based on information input from controller 101, and outputs the extracted radio resource part to demodulator 110.

Demodulator 110 performs channel estimation by using a reference signal (e.g., DMRS) included in a received signal input from extractor 109 based on, for example, the information input from controller 101, Further, demodulator 110 demodulates an uplink signal (e.g., PUSCH or PUCCH) input from extractor 109 by using, for example, a channel estimation result. Demodulator 110, for example, outputs a demodulation result to decoder 111.

Decoder 111, for example, performs error correction decoding on an uplink signal (e.g., PUSCH or PUCCH) based on information input from controller 101 and a demodulation result input from demodulator 110 to obtain a reception bit sequence (e.g., UL data signal or UCI) after decoding.

[Configuration of Terminal]

Figure 10:
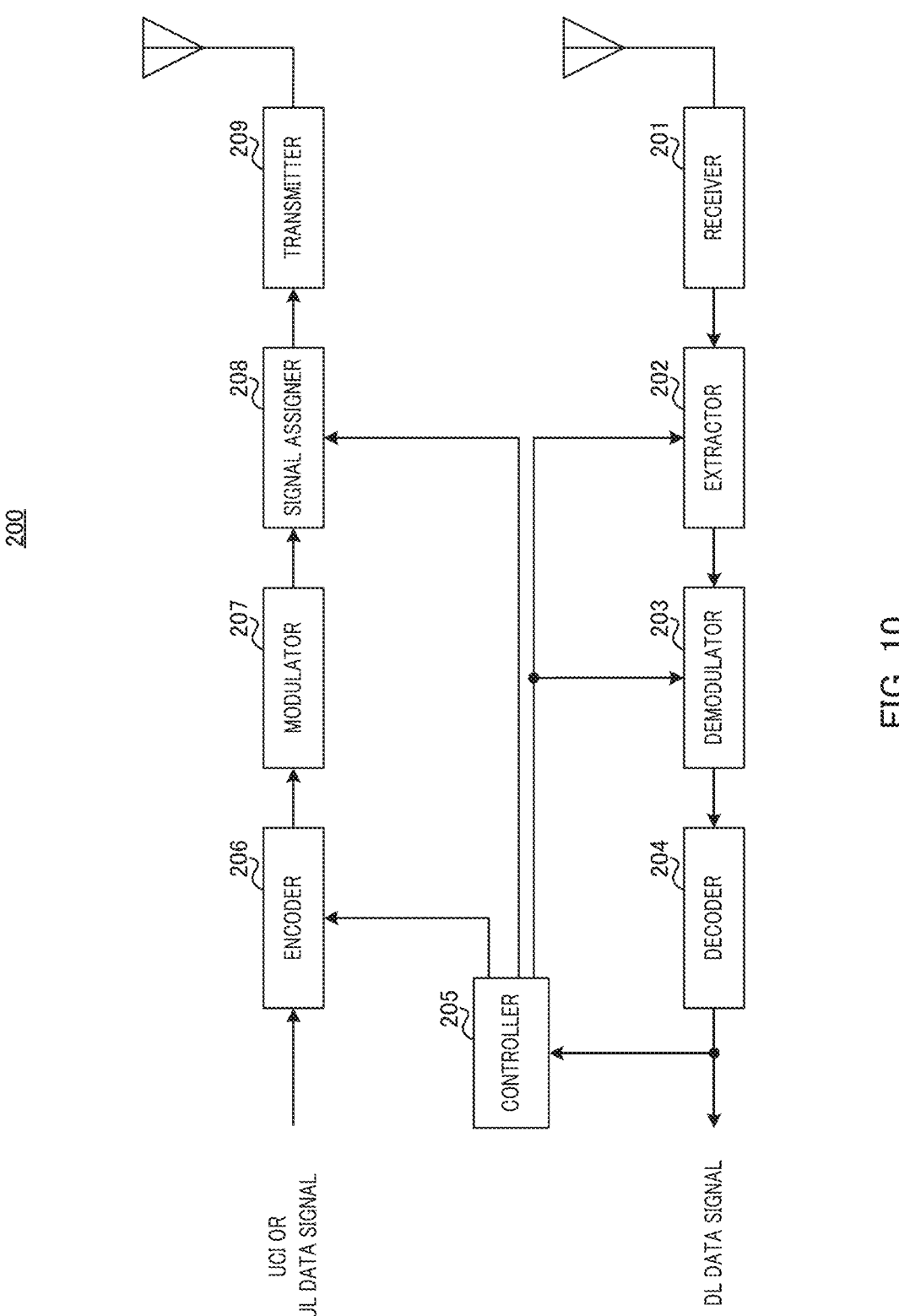
FIG. 10 is a block diagram illustrating a configuration example of the terminal.

FIG. 10 is a block diagram illustrating a configuration example of terminal 200 according to an exemplary embodiment of the present disclosure. For example, in FIG. 10, terminal 200 includes receiver 201, extractor 202, demodulator 203, decoder 204, controller 205, encoder 206, modulator 207, signal assigner 208, and transmitter 209.

Receiver 201, for example, receives a downlink signal (e.g., downlink data signal or downlink control information) from base station 100 via an antenna, performs the RE processing such as the down-conversion or the A/D conversion on the received radio signal to obtain a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202, for example, extracts a radio resource part, which may include downlink control information, from a received signal input from receiver 201 based on information on a radio resource in downlink control information input from controller 205, and outputs the radio resource part to demodulator 203. Further, extractor 202 extracts a radio resource part which includes downlink data based on information on a radio resource for a data signal input from controller 205, and outputs the radio resource part to demodulator 203.

Demodulator 203 performs channel estimation by using a reference signal (e.g., DMRS) included in a reception signal input from extractor 202 based on, for example, information input from controller 205. Further, demodulator 203, for example, demodulates a signal (e.g., PDCCH or PDSCH) input from extractor 202 by using a channel estimation result and outputs a demodulation result to decoder 204.

Decoder 204, for example, performs error correction decoding on a demodulation result input from demodulator 203 to obtain, for example, downlink reception data, a higher-layer control signal, or downlink control information. Decoder 204 outputs the higher-layer control signal and the downlink control information to controller 205, and outputs the downlink reception data. Further, decoder 204 may generate a response signal (e.g., ACK/NACK) based on a decoding result of the downlink reception data and output the generated response signal to encoder 206.

Controller 205 determines a radio resource for PDSCH reception, PUSCH transmission, or PUCCH transmission based on, for example, a signal (e.g., higher layer control signal or downlink control information) input from decoder 204. Incidentally, controller 205 may determine the above-mentioned radio resource based on, for example, methods to be described later (e.g., method such as resource allocation, DMRS mapping, or additional Repetition). Controller 205 outputs the determined information to, for example, extractor 202, demodulator 203, encoder 206, and signal assigner 208.

Encoder 206, for example, encodes an uplink signal (e.g., UCI or uplink data signal) based on information input from controller 205 and outputs the encoded bit string to modulator 207. Note that, encoding may not be performed in some PUCCH formats.

Modulator 207, for example, modulates an encoded bit string input from encoder 206 and outputs the modulated signal (symbol string) to signal assigner 208.

Signal assigner 208, for example, maps a signal input from modulator 207 to a radio resource based on information input from controller 205, and outputs an uplink signal to which the signal is mapped to transmitter 209.

Transmitter 209, for example, performs the transmission-waveform generation processing such as the OFDM on a signal input from signal assigner 208. In addition, in the case of, for example, the OFDM transmission using the CP, transmitter 209 performs the IFFT processing on a signal, and adds the CP to the signal resulting from the IFFT. Alternatively, when transmitter 209 generates a single-carrier waveform, for example, a Discrete Fourier Transformer (DFT) may be additionally provided at a rear stage of modulator 207 or a front stage of signal assigner 208 (neither is illustrated). Moreover, transmitter 209, for example, performs the RF processing such as the D/A conversion or the up-conversion on a transmission signal, and transmits the resulting radio signal to base station 100 via the antenna.

Operation Example of Base Station 100 and Terminal 200

An operation example of base station 100 and terminal 200 having the above configurations will be described.

In the present embodiment, for example, a "Symbol-level Repetition" is applied that is different from the above-mentioned slot-level Repetition or mini-slot-level Repetition. The symbol-level Repetition is, for example, repetition of consecutively transmitting the same OFDM symbols.

In the symbol-level Repetition, for example, an coherent combination for DMRS symbols and data symbols that are transmitted consecutively in the time domain is easily performed as compared to the slot-level or mini-slot-level Repetition, and thus, received SNR of the combined DMRS can be improved. Therefore, for example, using the combined DMRS for channel estimation can improve the channel estimation accuracy.

Further, in the present embodiment, when applying the symbol-level Repetition, as a time-resource unit, for example, "Virtual symbol" composed of a plurality of OFDM symbols that are subject to the Repetition per symbol and "Virtual slot" composed of a plurality of Virtual symbols are introduced.

Meanwhile, in the following description, a symbol (e.g., OFDM symbol) and a slot to which the symbol-level Repetition is not applied are may be respectively referred to as "Normal symbol" and "Normal slot" in order to distinguish them from a Virtual symbol and a Virtual slot.

For example, in the present embodiment, a case will be described where one or more physical layer processings in NR, such as the resource allocation, the DMRS mapping, the slot-level or mini-slot-level Repetition is executed by applying a Virtual symbol or a Virtual slot.

For example, executing the physical layer processing in NR that is based on a symbol or a slot while replacing them with a Virtual symbol or a Virtual slot suppresses a change for the physical layer processing in NR, and thereby the symbol-level Repetition can be achieved. The physical layer processing may include processing such as resource allocation processing, processing related to DMRS, processing related to timing, or power control processing, for example.

In other words, base station 100 and terminal 200 control communication based at least (or both) in units of Virtual symbols (e.g., equivalent to second symbol) each being a symbol to which a plurality of Normal symbols (e.g., equivalent to first symbols) is associated in one unit or (and) in units of Virtual slots each composed of a plurality of Virtual symbols.

Hereinafter, an operation example of the symbol-level Repetition will be described.

[1. Configuration Examples of Symbol-level Repetition, Virtual Symbol, and Virtual Slot]

In the present embodiment, for example, a "symbol-level Repetition" is applied in which one OFDM symbol is consecutively and repeatedly transmitted.

In the following description, as an example, the number of symbol-level Repetitions is referred to as, for example, "virtualsymbolLength" for convenience.

Figure 11:
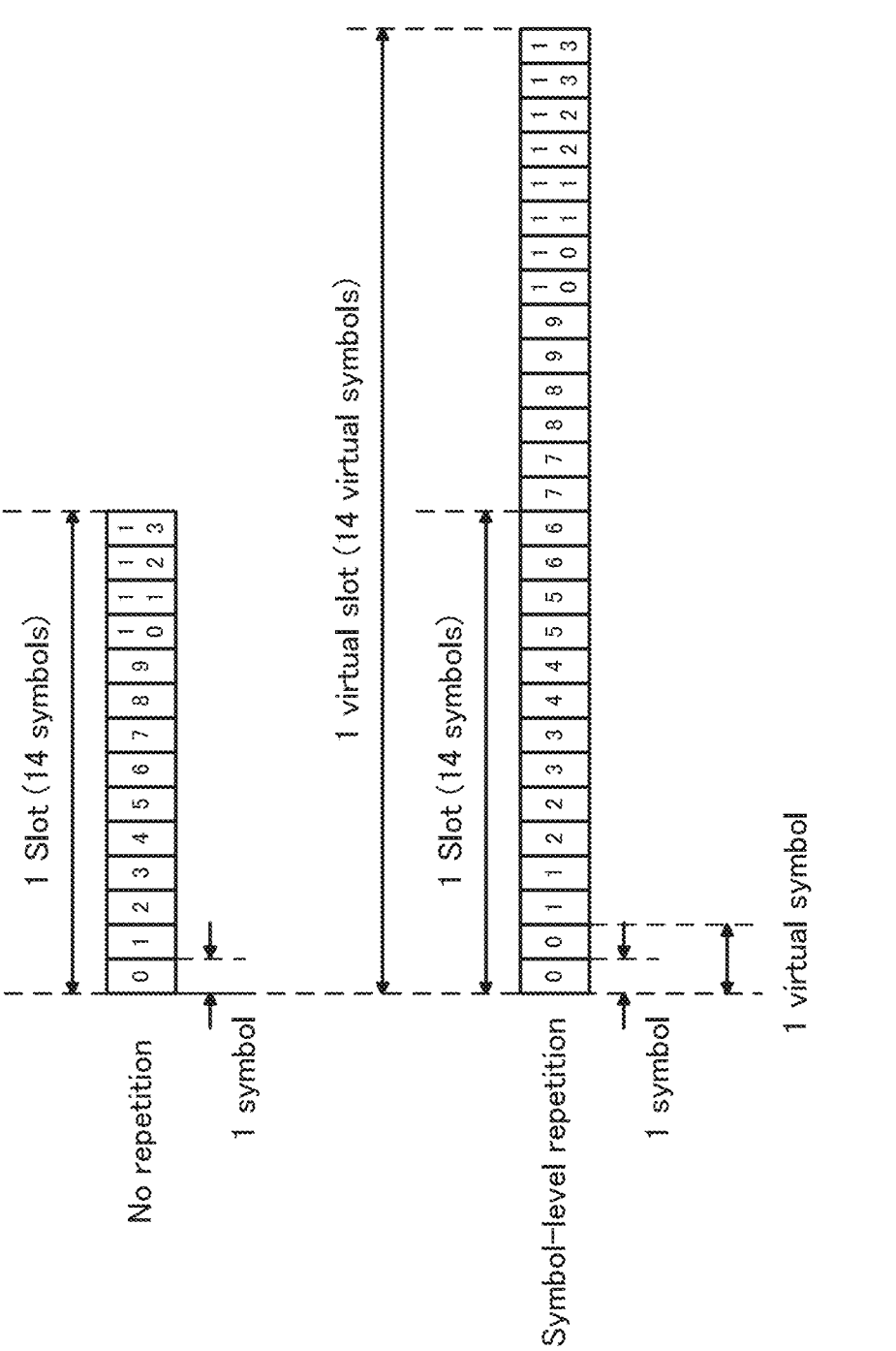
FIG. 11 illustrates configuration examples of Virtual symbols and a Virtual slot.

FIG. 11 illustrates an exemplary symbol-level Repetition in a case where virtualsymbolLength=2. As illustrated in FIG. 11, the same OFDM symbols (each of OFDM symbols 0 to 13) are consecutively transmitted (in other words, mapped).

Here, a time-resource unit composed of consecutive OFDM symbols (e.g., Normal symbols) of virtualsymbolLength is defined as a "Virtual symbol." For example, in FIG. 11, one Virtual symbol is composed of two OFDM symbols. In OFDM symbols of virtualsymbolLength configuring the Virtual symbol, a signal (e.g., PDSCH, PUSCH, or PUCCH) may be subject to the Repetition.

In addition, for example, in the case of Normal cyclic prefix, a time-resource unit (in other words, unit time duration) composed of Virtual symbols in the same number of symbols as OFDM symbols (in other words, Normal symbols) configuring a Normal slot is defined as a "Virtual slot." For example, in FIG. 11, one Virtual slot is composed of 14 Virtual symbols. That is, a Virtual slot can be composed of OFDM symbols of 14×virtualsymbolLength (28 OFDM symbols in FIG. 11).

Incidentally, in NR, for example, an extended cyclic prefix is defined in 60 kHz SCS. In this case, for example, since the number of OFDM symbols included in a Normal slot is 12, the number of Virtual symbols included in a Virtual slot may be set to 12.

Thus, the symbol-level Repetition allows, for example, base station 100 and terminal 200 to coherently combine DMRS symbols and data symbols that are consecutively transmitted in a plurality of Normal symbols composing a Virtual symbol. Accordingly, in the symbol-level Repetition, for example, the received SNR of DMRS can be improved as compared to the slot-level or mini-slot-level Repetition. As a result, according to the present embodiment, the channel estimation accuracy in base station 100 and terminal 200 can be improved.

Further, in the present embodiment, base station 100 and terminal 200 perform channel estimation by, for example, coherent combining DMRS symbols consecutively transmitted in a Virtual symbol. Thus, according to the present embodiment, for example, as compared to the method in which a plurality pieces of DMRS is mapped in each slot (e.g., corresponding to Normal slot) as illustrated in FIG. 6 or FIG. 7, it is possible to suppress an overhead of DMRS and a reduction in transmission efficiency.

Further, according to the present embodiment, base station 100 and terminal 200 perform channel estimation by coherent combining DMRS symbols consecutively transmitted in a Virtual symbol, and thereby the processing latency in decoding and demodulation can be suppressed as compared to, for example, the inter-slot channel estimation using DMRS mapped in a plurality of slots. Further, the present embodiment may take advantage of, for example, the latency reduction in the demodulation processing by Front-load DMRS that can be employed in NR.

[2. Configuration (Setting, Example of Virtualsymbol-Length]

Terminal 200 may receive, from base station 100, information on the number of symbol-level Repetitions or on the number of OFDM symbols (e.g., virtualsymbolLength) composing a Virtual symbol, for example.

VirtualsymbolLength may be semi-statically indicated from base station 100 to terminal 200 by, for example, a broadcast signal or an UE-specific higher layer signal (e.g., RRC signal), or may be dynamically indicated from base station 100 to terminal 200 by dynamic signaling such as DCI.

Alternatively, for example, a plurality of candidates for virtualsymbolLength may be semi-statically indicated from base station 100 to terminal 200 by a broadcast signal or an UE-specific higher layer signal (e.g., RRC signal), and a value of one virtualsymbolLength from among the plurality of candidates may be dynamically indicated from base station 100 to terminal 200 by dynamic signaling (or indication) such as DCI.

VirtualsymbolLength may be configured as in the following Options C-1 to C-4.

<Option C-1>

In Option C-1, for example, virtualsymbolLength may be set to one value (i.e., one type) with respect to terminal 200. In other words, virtualsymbolLength may indicate, to terminal 200, one of a plurality of configurable candidate numbers of symbols.

For example, virtualsymbolLength may be configured, corresponding to the coverage enhancement level of terminal 200.

For example, virtualsymbolLength configured for terminal 200 may be applied to a plurality (e.g., all) of channels/signals. Note that, the term "channel/signal" represents a channel or a signal, or a combination of a channel and a signal.

VirtualsymbolLength may be applied, for example, to a channel/signal that can be transmitted and/or received by terminal 200 such as SS/PBCH Block (SSB) configured with a Synchronization Signal (SS) and a broadcast channel (e.g., Physical Broadcast Channel: PBCH), Physical Random-Access Channel (PRACH), PDCCH, PDSCH, PUCCH, PUSCH, CSI-Reference Signal (CSI-RS), or a Sounding Reference Signal (SRS). The type of channel/signal is not limited to these and may be another channel/signal.

Alternatively, virtualsymbolLength for terminal 200 may be applied to some channels/signals, for example. That is, channels/signals that can be transmitted and/or received by terminal 200 may include therein a channel/signal to which the symbol-level Repetition is applied and a channel/signal to which the symbol-level Repetition is not applied.

For example, the symbol-level Repetition may be applied to PUSCH where it is assumed that the coverage enhancement is likely to be configured whereas the symbol-level Repetition may not be applied to another channel/signal different from PUSCH. Alternatively, for example, the symbol-level Repetition may not be applied to SSB and PRACH where coexistence with an existing terminal is regarded important whereas the symbol-level Repetition may be applied to another channel/signal different from SSB and PRACH.

Note that, whether to apply the symbol-level Repetition to a channel/signal that can be transmitted and/or received by terminal 200 is not limited to the above-mentioned examples.

<Option C-2>

In Option C-2, for example, virtualsymbolLength may be configured for downlink and uplink, respectively, with respect to terminal 200.

In NR, for example, the coverage enhancement in the uplink is expected as compared to the downlink. Hence, for example, a value of virtualsymbolLength for the uplink can be set to a value larger than virtualsymbolLength for the downlink. With this setting, for example, the channel estimation accuracy in the uplink can be improved, Incidentally, the relation of virtualsymbolLengths between the downlink and the uplink is not limited to the above-mentioned example. In one example, virtualsymbolLength may be the same value for the uplink and the downlink, or a value of virtualsymbolLength for the downlink may be greater than a value of virtualsymbolLength for the uplink.

In Option C-2, parameters such as "virtualsymbolLengthForDL" for the downlink and "virtualsymbolLengthForUL" for the uplink may be introduced, for example.

In Option C-2, for example, virtualsymbolLength may be configured for either downlink or uplink, with respect to terminal 200.

<Option C-3>

In Option C-3, for example, virtualsymbolLength may be configured for each channel/signal used for communication, with respect to terminal 200.

In Option C-3 parameters such as "virtualsymbolLengthForPDCCH" for PDCCH. "virtualsymbolLengthForPDSCH" for PDSCH, "virtualsymbolLengthForPUCCH" for PUCCH, "virtualsymbolLengthForPUSCH" for PUSCH, "virtualsymbolLengthForCSI-RS" for CSI-RS, or "virtualsymbolLengthForSRS" for SRS may be introduced, for example. Note that, the type of channel/signal is not limited to these, and virtualsymbolLength may be individually configured for another channel or signal.

For example, the assumed number of Repetitions may differ for each channel/signal. Hence, in Option C-3, an appropriate number of Repetitions can be configured for each channel/signal.

Incidentally, for example, in PDCCH, PDSCH, PUCCH, and PUSCH, different virtualsymbolLength may be configured for each of data symbols and DMRS symbols. Further, virtualsymbolLength is not limited to being configured individually for each of channels/signals, and, for example, virtualsymbolLength may be configured in units of a plurality of channels or signals (i.e., for each group of channels or signals).

<Option C-4>

In Option C-4, for example, a plurality of different virtualsymbolLength configurations may be indicated to each channel/signal. That is, virtualsymbolLength may be configured for each configuration (e.g., setting) of a parameter for terminal 200.

For example, in PDCCH, a parameter for a control resource set (e.g., Control Resource Set (CORESET) configuration may include virtualsymbolLength, and a value of virtualsymbolLength may be configured for each CORESET. For example, in NR, operations of a plurality of transmission and reception points may be applied. In this case, a distance from the terminal may differ between the plurality of transmission and reception points, and thus, the coverage enhancement level may also differ between the plurality of transmission and reception points. In this case, virtualsymbolLength may be included in a CORESET configuration for each of the plurality of transmission and/or reception points. Thus, for example, a different number of Repetitions can be configured for each of a plurality of transmission and/or reception points (in other words, different coverage enhancement levels).

In addition, for example, virtualsymbolLength may be associated with a beam of CORESET (e.g., Transmission Configuration Indicator (TCI) or SRS Resource indicator (SRI)).

Moreover, for example, with respect to PUCCH, a value of virtualsymbolLength may be configured for each PUCCH format. For example, the number of symbols or the number of transmission bits may differ between the PUCCH formats, and thus, the coverage enhancement level may also differ therebetween. In this case, with this configuration of virtualsymbolLength for each PUCCH format, different number of Repetitions can be configured for a plurality of PUCCH formats.

Furthermore, for example, a value of virtualsymbolLength may be configured for each SCS configuration. In one example, the larger SCS is, the wider bandwidth transmission is, which can reduce the coverage. Therefore, as SCS increases, the number of Repetitions to be configured may also increase. In this case, with the configuration of virtualsymbolLength for each SCS configuration, different number of Repetitions can be configured for a plurality of SCS configurations.

[3. Configuration Examples of Virtual Symbol and Virtual Slot]

When virtualsymbolLength is configured as in Options C-1 to C-4 described above, base station 100 and terminal 200 may, for example, apply the symbol-level Repetition and configure a Virtual symbol and a Virtual slot to and for a target channel/signal.

As mentioned above, a Virtual symbol is, for example, a time-resource unit composed of OFDM symbols (i.e., Normal symbols) of consecutive virtualsymbolLength. In addition, for example, in the case of Normal CP, a Virtual slot is a time-resource unit composed of 14 consecutive Virtual symbols or consecutive OFDM symbols of 14× virtualsymbolLength.

Here, a Virtual symbol and a Virtual slot may be configured by either of the following two Options FS-1 and FS-2 based on, for example, an association with a Normal symbol, a Normal slot, a sub-frame, or a frame.

<Option FS-1>

In Option FS-1, a Virtual slot may start from the starting position of a Normal slot, for example.

Figure 12:
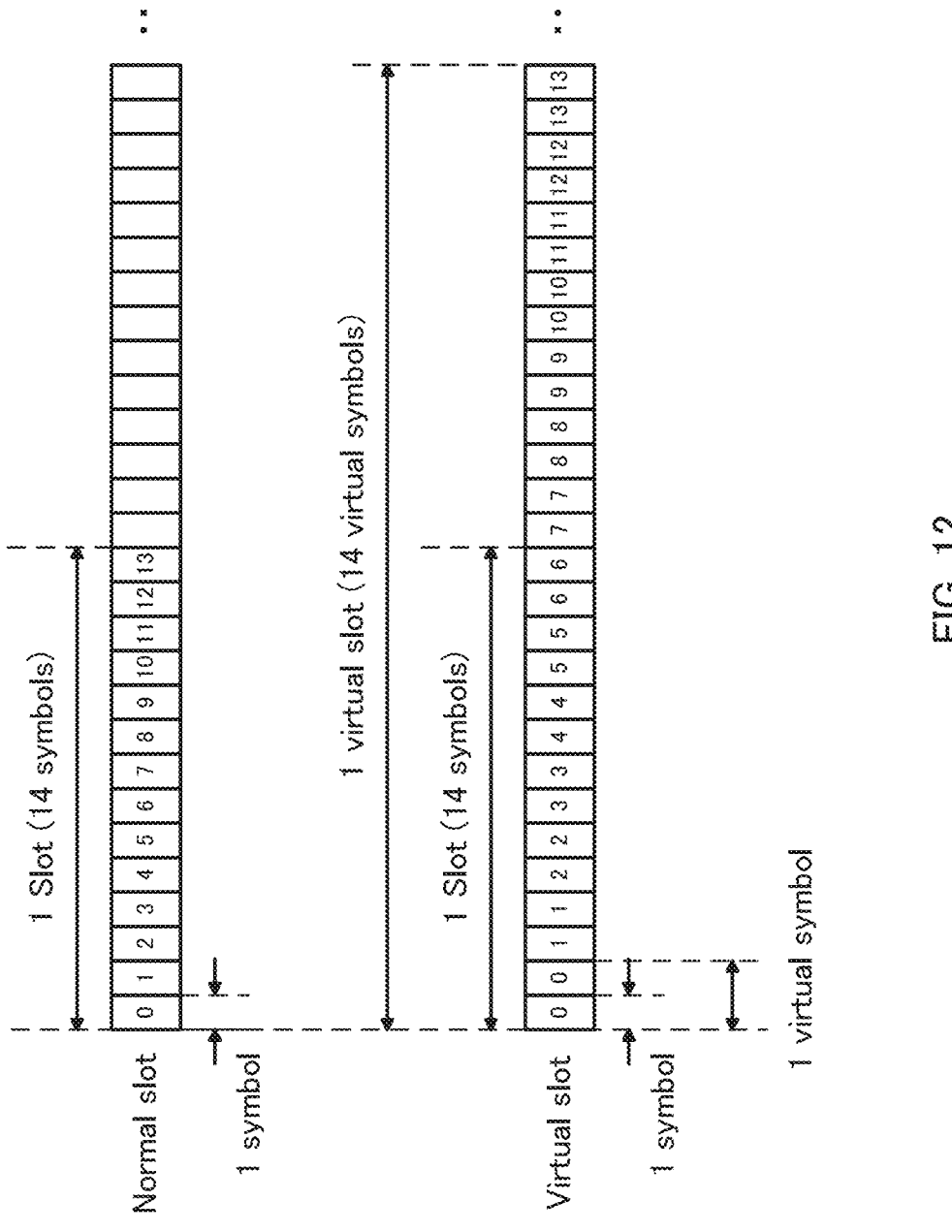
FIG. 12 illustrates configuration examples of Virtual symbols and a Virtual slot according to Option FS-1.

FIG. 12 illustrates a configuration example when virtualsymbolLength=2. In Option FS-1, as illustrated in FIG. 12, the 0-th Normal symbol (e.g., Normal symbol #0-0) included in the first Virtual symbol (e.g., Virtual symbol #0) configuring the Virtual slot matches the first symbol in position (e.g., Normal symbol #0) configuring the Normal slot (e.g., starting position of Virtual slot).

Next, a configuration example of virtualsymbolLength in Option FS-1 will be described.

(Option FS-1-1)

In Option FS-1-1, virtualsymbolLength (i.e., number of symbols composing Virtual symbol) may be set to a power of 2.

Figure 13:
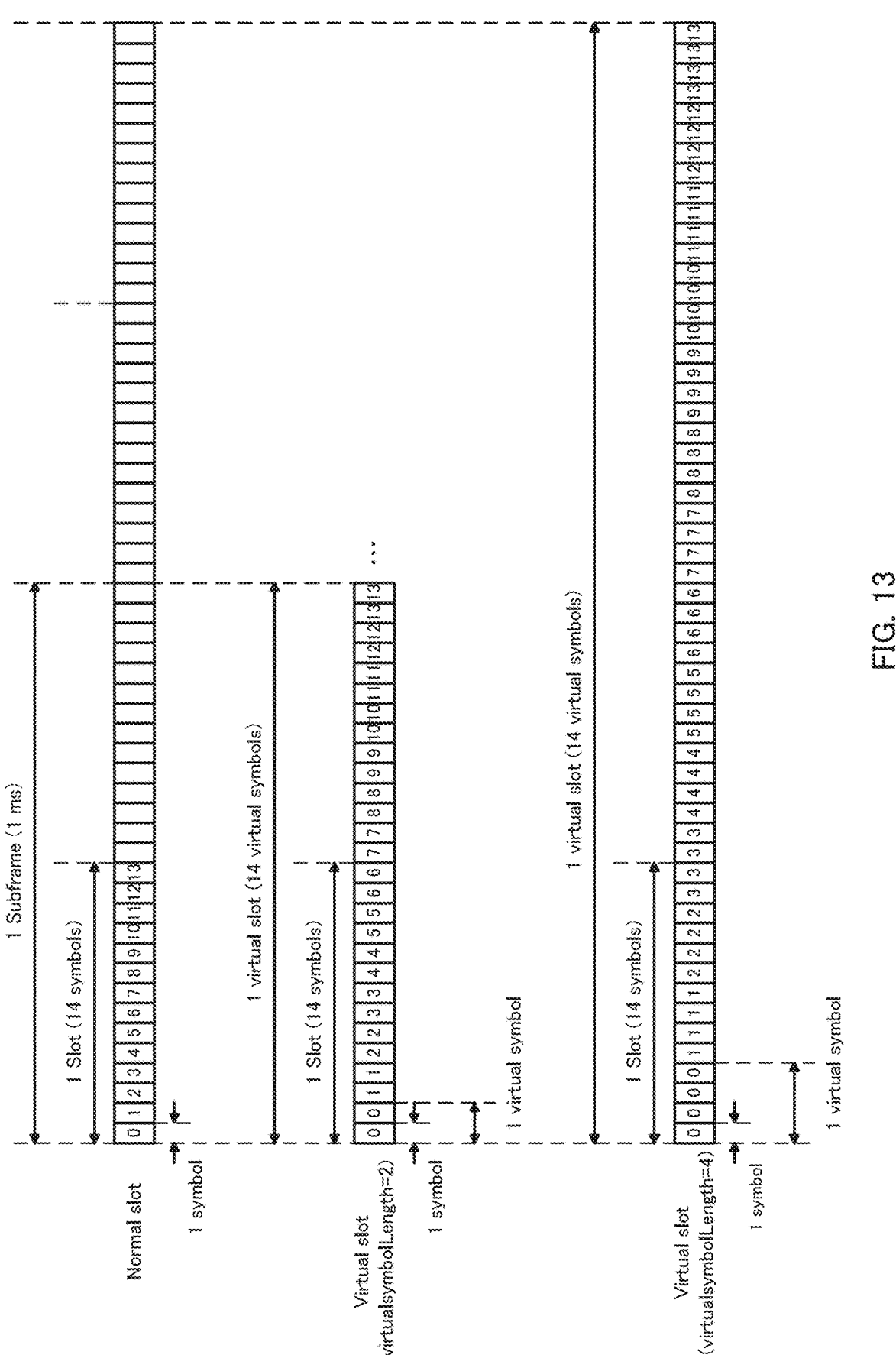
FIG. 13 illustrates configuration examples of Virtual symbols and Virtual slots according to Option FS-1-1.

FIG. 13 illustrates a configuration example of virtualsymbolLength=2 (=$2^1$) and virtualsymbolLength=4 (=$2^2$) when SCS=30 kHz. As illustrated in FIG. 13, in Option FS-1-1, for example, even when different virtualsymbolLengths are configured, the Virtual slot boundary and the sub-frame boundary in the Normal slot configuration can be matched.

Further, in NR, for example, on the basis of 15 kHz SCS, SCS of power of 2 (e.g., 30 kHz SCS, 60 kHz SCS, 120 kHz SCS, or 240 kHz SCS) is supported. Thus, for example, configurations of Virtual symbols and a Virtual slot corresponding to virtualsymbolLength resulting from multiplication (power of 2) can be time-resource units similar to configurations of Normal symbols and a Normal slot in which SCS is multiplied by one with a power of 2.

(Option FS-1-2)

In Option FS-1-2, for example, in the case of Normal CP, virtualsymbolLength (in other words, number of symbols composing Virtual symbol) may be set to any value of 2, 7, and 14 and an integral multiple of 14.

Figure 14:
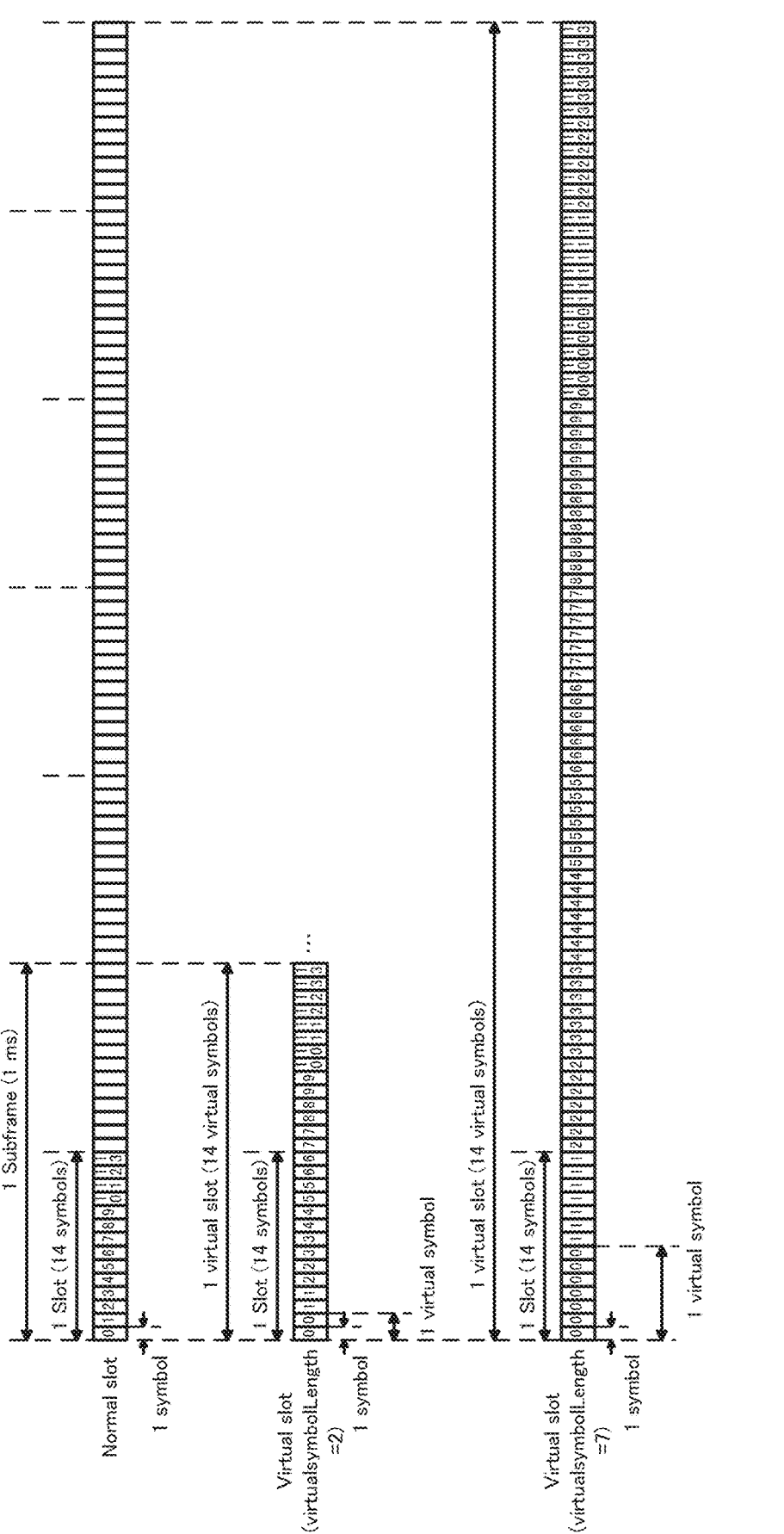
FIG. 14 illustrates configuration examples of Virtual symbols and Virtual slots according to Option FS-1-2.

FIG. 14 illustrates a configuration example of virtualsymbolLength=2 and virtualsymbolLength=7 when SCS=30 kHz. As illustrated in FIG. 14, in Option FS-1-2, for example, even when different values of virtualsymbolLengths are configured, the Virtual slot boundary and the slot boundary in the Normal slot configuration can be matched.

For example, when a terminal (in other words, terminal using Normal symbol and Normal slot) to which the symbol-level Repetition is not applied is present in a cell, matching a Virtual slot boundary and a Normal slot boundary is advantageous in that the terminal and terminal 200 can easily coexist in scheduling or the like.

Incidentally, when using the extended CP, the same effect as in the Normal CP can be obtained by setting a value that can be configured as virtualsymbolLength to, for example, any of values of 2, 6, and 12 and an integral multiple of 12. In other words, in Option FS-1-2, virtualsymbolLength (e.g., number of Normal symbols composing Virtual symbol) may be configured based on the number of Normal symbols configuring a Normal slot.

(Option FS-1-3)

When a Virtual slot boundary and a Normal slot boundary are matched in Option FS-1-2, a granularity of a value that can be configured as virtualsymbolLength may be any of values of 2, 7, and 14 and an integral multiple of 14; thus, it may be impossible to flexibly support the coverage enhancement level.

Hence, in Option FS-1-3, for example, the number of Normal symbols (e.g., virtualsymbolLength) included in a Virtual symbol configuring a Virtual slot may be uneven among Virtual symbols. In Option FS-1-3, a Virtual slot boundary matches a Normal slot boundary.

Figure 15:
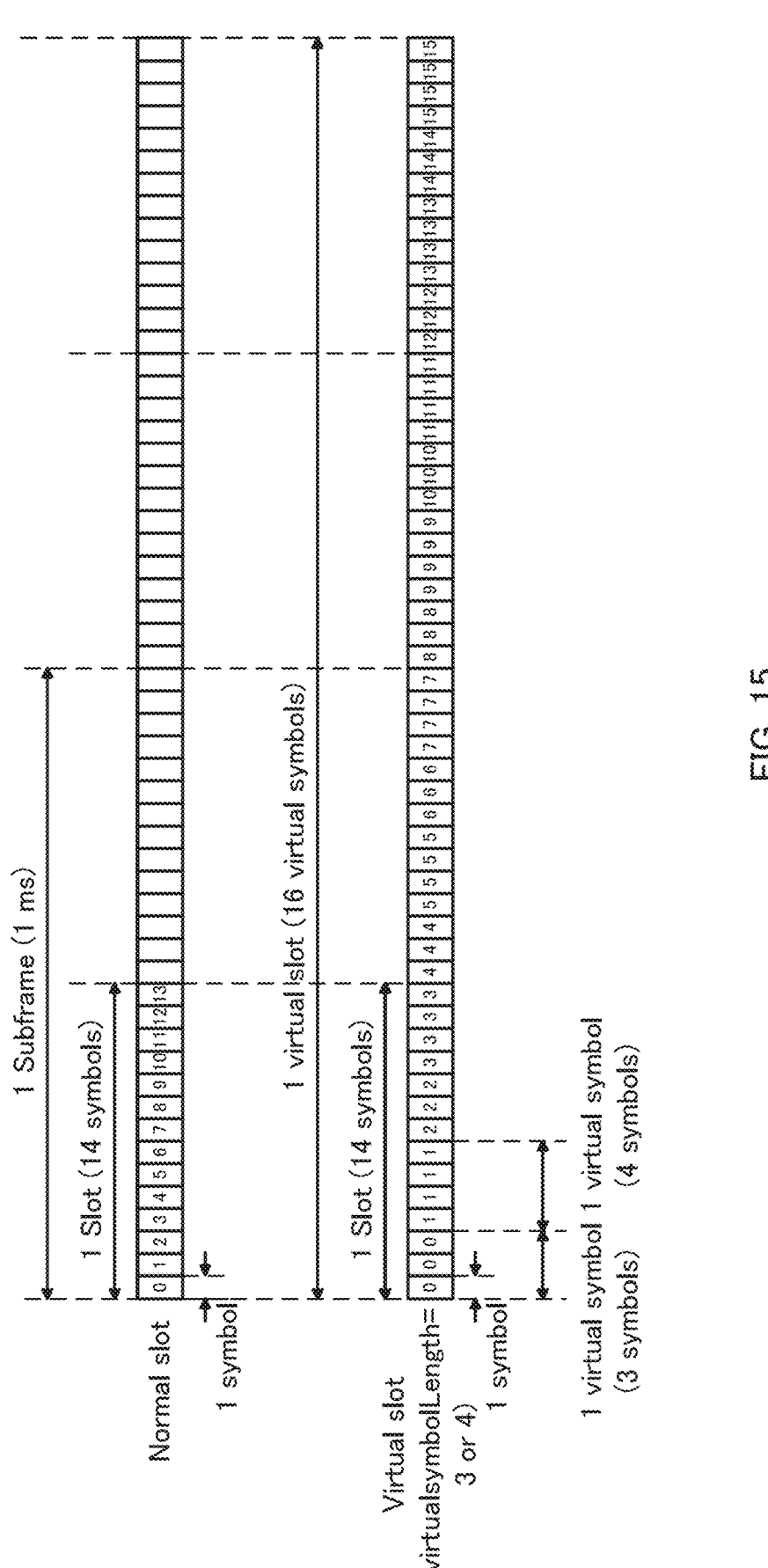
FIG. 15 illustrates configuration examples of a Virtual symbol and Virtual slots according to Option FS-1-3.

FIG. 15 illustrates a configuration example of a Virtual slot with Virtual symbols of virtualsymbolLength=3 and virtualsymbolLength=4 when SCS=30 kHz.

In FIG. 15, for example, a Virtual symbol composed of three OFDM symbols and a Virtual symbol composed of four OFDM symbols are included. That is, the number of Normal symbols (i.e., virtualsymbolLength) composing one of at least two Virtual symbols included in a Virtual slot is different from the number of Normal symbols composing the other one of the at least two Virtual symbols.

Further, in FIG. 15, for example, a slot boundary of the Normal slot configuration matches a Virtual symbol boundary. That is, in FIG. 15, a duration of each Virtual symbol does not cross a Normal slot boundary.

According to Option FS-1-3, for example, as in Option FS-1-2, even when a terminal to which the symbol-level Repetition is not applied and a terminal to which the symbol-level Repetition is applied are present in a cell, matching a Virtual slot boundary and a Normal slot boundary is advantageous in that the terminals can easily coexist in scheduling or the like. Further, in Option FS-1-3 can achieve a coverage enhancement with finer granularity (e.g., granularity different from 2, 7, and 14 and integral multiple of 14) as compared to Option FS-1-2.

Note that, in Option FS-1-3, for example, it is not necessary to define a time-resource unit as a Virtual slot, the time-resource unit being composed of 14 Virtual symbols (in case of Normal CP) in the same number of symbols as OFDM symbols included in a Normal slot configuration, as described in [1. Configuration Examples of Symbol-level Repetition, Virtual Symbol, and Virtual Slot]. In other words, the number of Virtual symbols included in a Virtual slot may be different from the number of OFDM symbols included in a Normal slot.

(Option FS-1-4)

In Option FS-1-4, an upper limit value may be provided to a value that can be configured as virtualsymbolLength. For example, the upper limit value of a Normal symbol composing a Virtual symbol may be less than the number of Normal symbols configuring a Normal slot. For example, in the case of Normal CP, the upper limit value may be a value less than 14, such as 7 or 4.

In NR, for example, base station 100 can flexibly configure the type of slot or the type of symbol in the slot (e.g., downlink symbol, uplink symbol, or Flexible symbol). For example, when the symbol-level Repetition is applied, it is desirable that the common symbol type is configured for a time duration of the number of Normal symbols configured as virtualsymbolLength.

For example, the larger a value of virtualsymbolLength is, the greater the number of Normal symbols composing a Virtual symbol (e.g., number of consecutive symbols of the same symbol type) is, and thus, it may be impossible to flexibly cope with a traffic situation in a cell. Therefore, for example, with respect to virtualsymbolLength to which the symbol-level Repetition is applied, the smaller a value is configured as the upper limit value, the easier to achieve a flexible TDD pattern is.

Incidentally, a method will be described later for compensating for the coverage enhancement effect against a decrease in the number of Repetitions applicable to the symbol-level Repetition.

Option FS-1 has been described thus far.

Meanwhile, any of Options FS-1-1 to FS-1-4 may be combined with each other. By way of example, Option FS-1-1 and Option FS-1-4 may be combined, so that values that can be configured as virtualsymbolLength may be 1, 2, or 4. In NR, a frame of 10 ms is adopted in addition to the time-resource units called a slot and a subframe. For example, when virtualsymbolLength=2, a Virtual slot boundary can be matched with a frame boundary of the Normal slot configuration, which is advantageous in that an operation of System Frame Number (SFN) can be facilitated. Further, for example, when virtualsymbolLength=4, a Virtual slot boundary can be matched with a frame boundary of the Normal slot configuration at every 20 ms. In the operation in NR, for example, a transmission spacing for SSB used for an initial access is assumed to be 20 ms, which is highly consistent with the operation of SSB.

<Option FS-2>

In Option FS-2, a Virtual slot may start from any symbol position of a Normal slot, for example.

Figure 16:
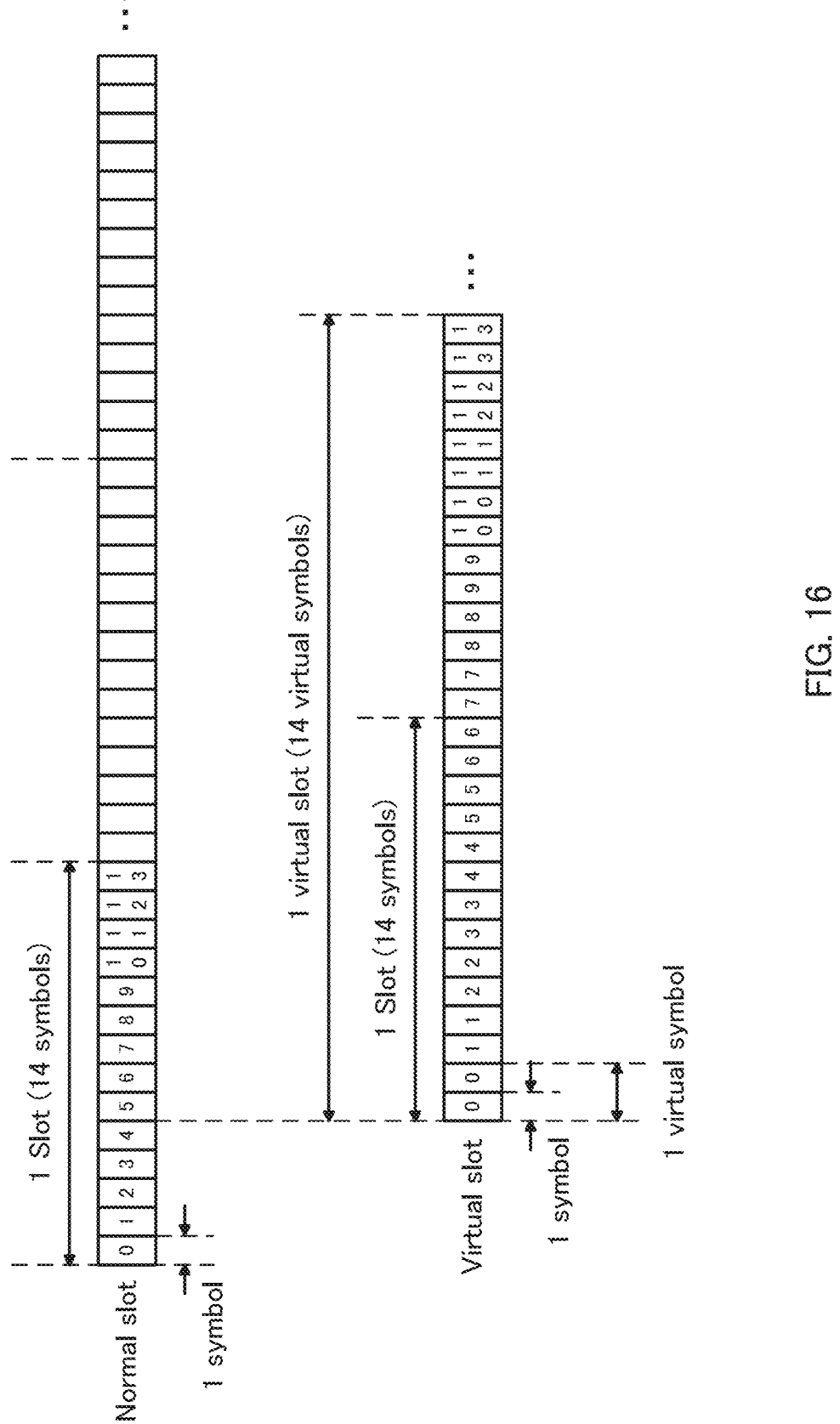
FIG. 16 illustrates a configuration example of a Virtual slot according to Option FS-2.

FIG. 16 illustrates a configuration example of virtualsymbolLength=2. In Option FS-2, as illustrated in FIG. 16, a Virtual slot starts from the fifth symbol (Normal symbol #5) of the Normal slot. In other words, the position (i.e., starting position of Virtual slot) of the 0th Normal symbol (Normal symbol #0-0) included in the first Virtual symbol #0 configuring the Virtual slot matches the position of the fifth symbol (Normal symbol #5) in the Normal slot.

According to Option FS-2, for example, in the symbol-level Repetition, resource allocation can be performed more flexibly than in the time domain resource allocation described later,

[4. Resource Allocation]

The time domain resource allocation for PDSCH received by terminal 200 and PUSCH and PUCCH transmitted by terminal 200 may be determined (i.e., identified) based on, for example, a Virtual symbol or a Virtual slot.

In the following, a description will be given of determination examples for a time domain resources <Option RA-1>

In Option RA-1, for example, base station 100 and terminal 200 may determine (i.e., identify) a time domain resource for communication, based on a Virtual symbol and a Virtual slot. That is, in Option RA-1, for example, a Normal slot and a Normal symbol need not be used for identifying the time domain resource.

Option RA-1 may be applied to, for example, Option FS-1 described above.

Hereinafter, a description will be given of examples of applying Option RA-1 to PDSCH, PUSCH, and PUCCH.

(Option RA-1: PDSCH)

Base station 100, for example, may allocate a resource for PDSCH and transmit, to terminal 200, DCI for the resource-allocated PDSCH, in PDCCH. Terminal 200, for example, receives and decodes PDCCH and performs demodulation and decoding of PDSCH based on control information included in DCI.

Here, the control information included in DCI may include, for example, information on a time domain resource to which PDSCH is assigned (e.g., TDRA information).

The time domain resource information may include, for example, information on a timing, e.g., how many Virtual slots later terminal 200 receives PDSCH since the Virtual slot in which terminal 200 has received PDCCH (e.g., referred to as "$K_0$" or Virtual slot offset), information on the start Virtual symbol position of PDSCH in a Virtual slot (e.g., referred to as "$S_{PDSCH}$" or starting Virtual symbol) and on the number of Virtual symbols to which PDSCH is assigned (e.g., referred to as "$L_{PDSCH}$" or Virtual symbol length).

For the time domain resource information, for example, a TDRA table (candidate for combination of above-mentioned $K_0$, $S_{PDSCH}$, $L_{PDSCH}$, and PDSCH mapping type) may be semi-statically configured by an UE-specific higher layer signal (RRC signal), and a combination to be used from the TDRA table may be configured by a dynamic indication such as DCI.

Further, a Virtual symbol position "$S_{PDSCH}$" and the number of Virtual symbols "$L_{PDSCH}$" that are for PDSCH may be configured for terminal 200 by, for example, a value associated with a combination of the symbol position and the number of symbols (e.g., Start and Length Indicator Value: SLIV).

For example, a Virtual slot in which terminal 200 receives PDSCH may be identified according to following Equation 1.

(Equation 1)

$$\left\lfloor n \cdot \frac{2^{\mu_{PDSCH}}}{2^{\mu_{PDCCH}}} \cdot \frac{virtualsymbolLengthForPDCCH}{virtualsymbolLengthForPDSCH} \right\rfloor + K_0 \qquad [1]$$

Here, n indicates a Virtual slot in which terminal 200 has received. DCI (or PDCCH) corresponding to PDSCH assignment. Further, $2^{\mu_{PDSCH}}$ indicates SCS of the carrier or the Bandwidth Part (BWP) that receive PDSCH, and $2^{\mu_{PDCCH}}$ indicates SCS of the carrier or the BWP that receive DCI (or PDCCH). VirtualsymbolLengthForPDCCH indicates virtualsymbolLength applied to PDCCH including ICI corresponding to the PDSCH assignment, and virtualsymbolLengthForPDSCH indicates virtualsymbolLength applied to PDSCH received by terminal 200. Besides, a floor function for value x, as illustrated in Equation 1, may be also referred to as "floor(x)."

For example, terminal 200 may identify the Virtual slot for receiving PDSCH, according to Equation 1. In addition, terminal 200 may identify, in the identified Virtual slot, a Virtual symbol in which PDSCH reception is started (i.e., starting position), based on Spasm, for example. Terminal 200 may also identify, for example, the number of Virtual symbols for receiving PDSCH, based on $L_{PDSCH}$.

Figure 17:
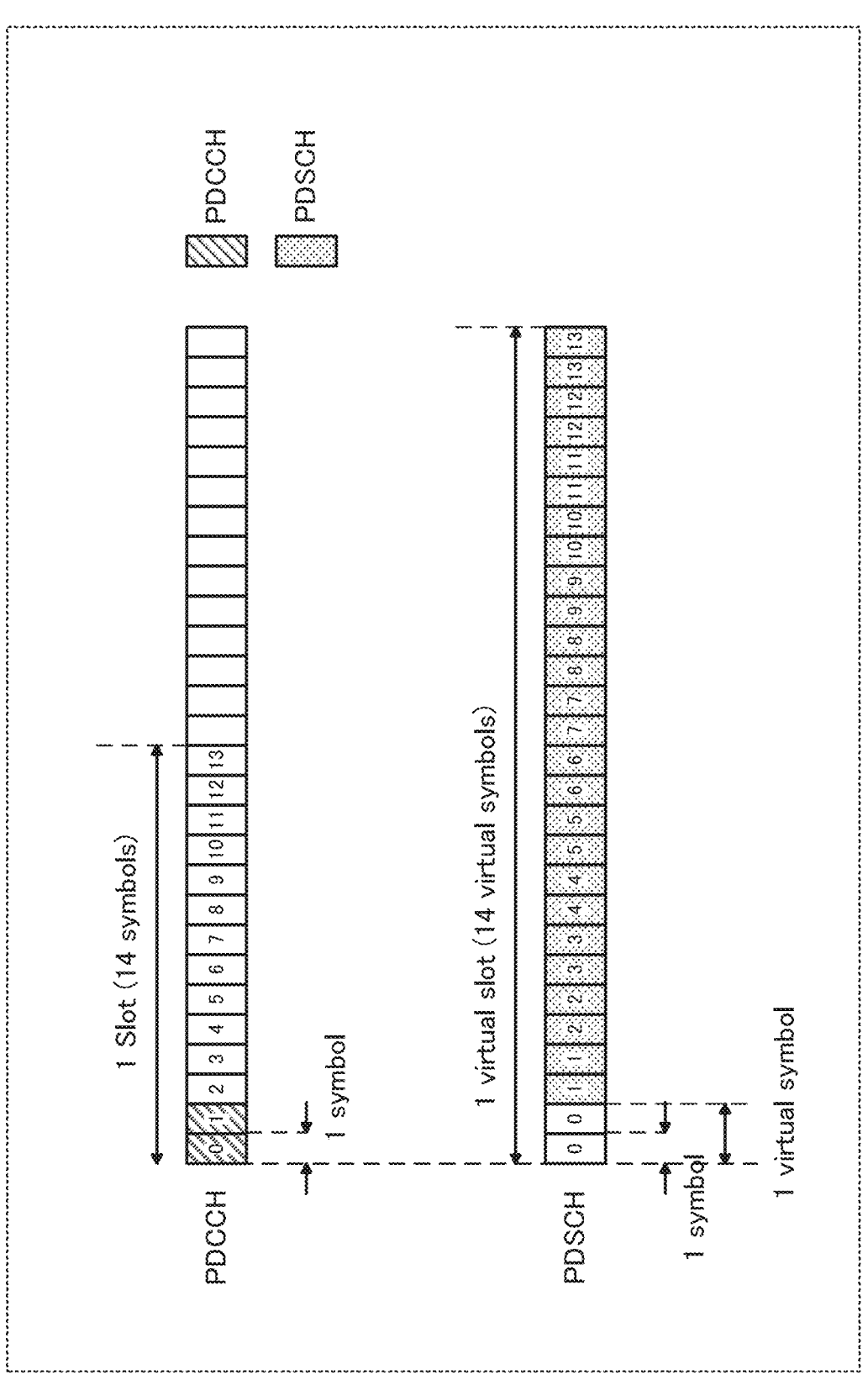
FIG. 17 illustrates an example of PDSCH resource allocation according to Option RA-1.

FIG. 17 illustrates an example of time domain resource allocation for PDSCH. In FIG. 17, virtualsymbolLengthForPDCCH for PDCCH=1, virtualsymbolLengthForPDSCH for PDSCH=2, $K_0$=0, $S_{PDSCH}$=1, and $L_{PDSCH}$=13.

In FIG. 17, for example, PDSCH is transmitted in Virtual symbols having $L_{PDSCH}=13$ (e.g., Virtual symbols #1 to #13) from the Virtual symbol having $S_{PDSCH}=1$, in the Virtual slot after $K_0=0$ slots (i.e., identical Virtual slot) from the Virtual slot in which terminal 200 has received PDCCH.

According to Option RA-1, for example, with respect to terminal 200, virtualsymbolLength is set while the Virtual symbol and the Virtual slot are configured, so that the time domain resource for the symbol-level Repetition can be identified by using an indication of the time domain resource for PDSCH as in the Normal slot configuration. Note that, the time domain resource for PDSCH is identified by using a Virtual symbol and a Virtual slot, as described above. On the other hand, the signal actually received by terminal 200 (e.g., PDSCH) is a signal in units of Normal symbols, and terminal 200 receives Normal symbols in the number of virtualsymbolLengthForPDSCHs in, for example, a time duration of a Virtual symbol. For example, base station 100 may generate, according to the PDSCH resource allocation, a complex symbol group corresponding to the number of Virtual symbols, and may replicate and map one complex symbol group to the Normal symbols in the number of virtualsymbolLengthForPDSCHs included in one Virtual symbol. Moreover, terminal 200 may assume that, for example, one complex symbol group is replicated and mapped to Normal symbols included in one Virtual symbol at base station 100. Meanwhile, for example, processing such as common scrambling, a data modulation scheme, layer mapping, or antenna port mapping may be applied to a complex symbol group included in one Virtual symbol.

(Option RA-1: PUSCH)

Terminal 200 may, for example, transmit PUSCH according to at least one of resource allocation indicated by DCI in PDCCH from base station 100 and resource allocation previously configured by a higher layer signal (e.g., RRC signal).

Here, the control information included in DCI or the control information previously configured by the higher layer signal may include, for example, information on a time domain resource in which PUSCH is transmitted (e.g., TDRA information).

The time domain resource information may include, for example, information on a timing, e.g., terminal 200 transmits PUSCH how many Virtual slots later from the Virtual slot in which PDCCH has been received (e.g., may be referred to as "$K_2$" or Virtual slot offset), information on the start Virtual symbol position of PUSCH in a Virtual slot (e.g., "$S_{PUSCH}$" or starting Virtual symbol) and on the number of Virtual symbols in which PUSCH is transmitted (e.g., "$L_{PUSCH}$" or Virtual symbol length).

For the time domain resource information, for example, a TDRA table (candidate for combination of above-mentioned $K_2$, $S_{PUSCH}$, $L_{PUSCH}$, and PUSCH mapping type) may be semi-statically configured by an UE-specific higher layer signal (RRC signal), and a combination to be used from the TDRA table may be configured by a dynamic indication such as DCI or a previous configuration by the higher layer signal (e.g., RRC signal).

Further, a Virtual symbol position "$S_{PUSCH}$" and the number of Virtual symbols "$L_{PUSCH}$" that are for PUSCH may be configured for terminal 200 by, for example, a value associated with a combination of the Virtual position and the number of Virtual symbols (e.g., SLIV).

For example, a Virtual slot in which terminal 200 transmits PUSCH may be identified according to following Equation 2.

(Equation 2)

$$\left\lfloor n \cdot \frac{2^{\mu_{PUSCH}}}{2^{\mu_{PDCCH}}} \cdot \frac{virtualsymbolLengthForPDCCH}{virtualsymbolLengthForPUSCH} \right\rfloor + K_2 \qquad [2]$$

Here, n indicates a Virtual slot in which terminal 200 has received DCI (or PDCCH) corresponding to PUSCH assignment. Further, $2^{\mu_{PUSCH}}$ indicates SCS of the carrier or the BWP that transmit PUSCH, and $2^{\mu_{PDCCH}}$ indicates SCS of the carrier or the BWP that receive DCI (or PDCCH). VirtualsymbolLengthForPDCCH indicates virtualsymbolLength applied to PDCCH including DCI corresponding to the PUSCH assignment, and virtualsymbolLengthForPUSCH indicates virtualsymbolLength applied to PUSCH transmitted by terminal 200.

For example, terminal 200 may identify the Virtual slot for transmitting PUSCH, according to Equation 2. In addition, terminal 200 may identify, in the identified Virtual slot, a Virtual symbol in which PUSCH transmission is started (i.e., starting position), based on $S_{PUSCH}$, for example. Terminal 200 may also identify, for example, the number of Virtual symbols for transmitting PUSCH, based on $L_{PUSCH}$.

Figure 18:
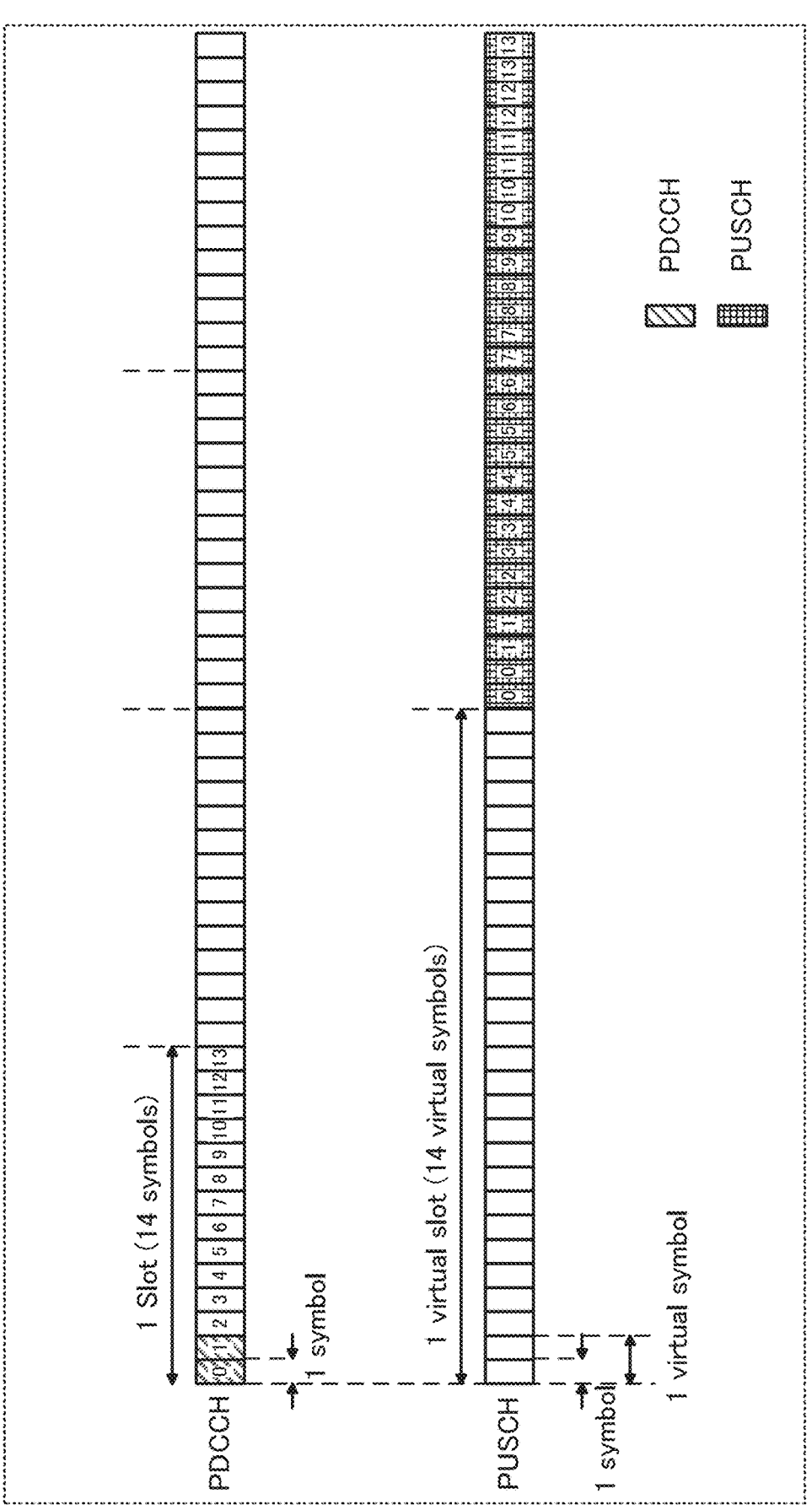
FIG. 18 illustrates an example of PUSCH resource allocation according to Option RA-1.

FIG. 18 illustrates an example of time domain resource allocation for PUSCH. In FIG. 18, virtualsymbolLength-ForPDCCH for PDCCH=1, virtualsymbolLengthFor-PUSCH for PUSCH=2, $K_2=1$, $S_{PUSCH}=0$, and $L_{PUSCH}=14$.

In FIG. 18, for example, PUSCH is transmitted in Virtual symbols having $L_{PUSCH}=14$ (e.g., Virtual symbols #0 to #13) from the Virtual symbol having $S_{PUSCH}=0$, in the Virtual slot after $K_2=1$ slot from the Virtual slot in which terminal 200 has received PDCCH.

According to Option RA-1, for example, with respect to terminal 200, virtualsymbolLength is set while the Virtual symbol and the Virtual slot are configured, so that the time domain resource for the symbol-level Repetition can be identified by using an indication of the time domain resource for PUSCH as in the Normal slot configuration.

Note that, the time domain resource for PUSCH is identified by using a Virtual symbol and a Virtual slot, as described above. On the other hand, the signal actually transmitted by terminal 200 (e.g., PUSCH) is a signal in units of Normal symbols, and terminal 200 transmits Normal symbols in the number of virtual symbolLengthForPD-SCHs in, for example, a time duration of a Virtual symbol. For example, terminal 200 may generate, according to the PDSCH resource allocation, a complex symbol group corresponding to the number of Virtual symbols, and may replicate and map one complex symbol group to the Normal symbols in the number of virtualsymbolLengthForPUSCHs included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

(Option RA-1:PUCCH)

Terminal 200, for example, may feed back, in PUCCH, ACK/NACK indicating success or failure of decoding for PDSCH, Terminal 200 may also transmit, to base station 100, another kind of UCI such as CSI or SR by using, for example, PUCCH.

Further, when transmitting ACK/NACK for PDSCH assigned by DCI, terminal 200 may transmit PUCCH according to resource allocation indicated by DCI in PDSCH from base station 100, for example.

Here, the control information included in DCI may include, for example, information on a PUCCH resource. The PUCCH resource may be configured with, for example, a plurality of parameters.

In the PUCCH resource, the time domain resource information may include, for example, information on the start Virtual symbol position of PUCCH in a Virtual slot (e.g., may be referred to as "startingSymbolIndex" or starting Virtual symbol) and on the number of Virtual symbols for transmitting PUCCH (e.g., may be referred to as "nrofSymbols" or Virtual symbol length).

Further, the control information included in DCI may include, for example, information on a timing, e.g., terminal 200 transmits PUCCH how many Virtual slots later from the Virtual slot in which PDSCH has been received (e.g., number of Virtual slots "k").

Incidentally, for CSI and SR, for example, a PUCCH resource may be designated from base station 100 to terminal 200 by a higher layer signal (e.g., RRC signal).

For example, a Virtual slot in which terminal 200 transmits PUCCH may be identified according to following Equation 3.

[3]

$$n+k \quad \text{(Equation 3)}$$

Here, n indicates a Virtual slot in which terminal 200 has received PDSCH. For example, k=0 may correspond to the last Virtual slot that temporally overlaps the Virtual slot in which PDSCH has been received among Virtual slots applied to PUCCH.

For example, terminal 200 may identify the Virtual slot for transmitting PUCCH, according to Equation 3. In addition, terminal 200 may identify, in the identified Virtual slot, a Virtual symbol in which PUCCH transmission is started (i.e., starting position), based on startingSymbolIndex, for example. Terminal 200 may also identify, for example, the number of Virtual symbols for transmitting PUCCH, based on nrofSymbols.

Figure 19:
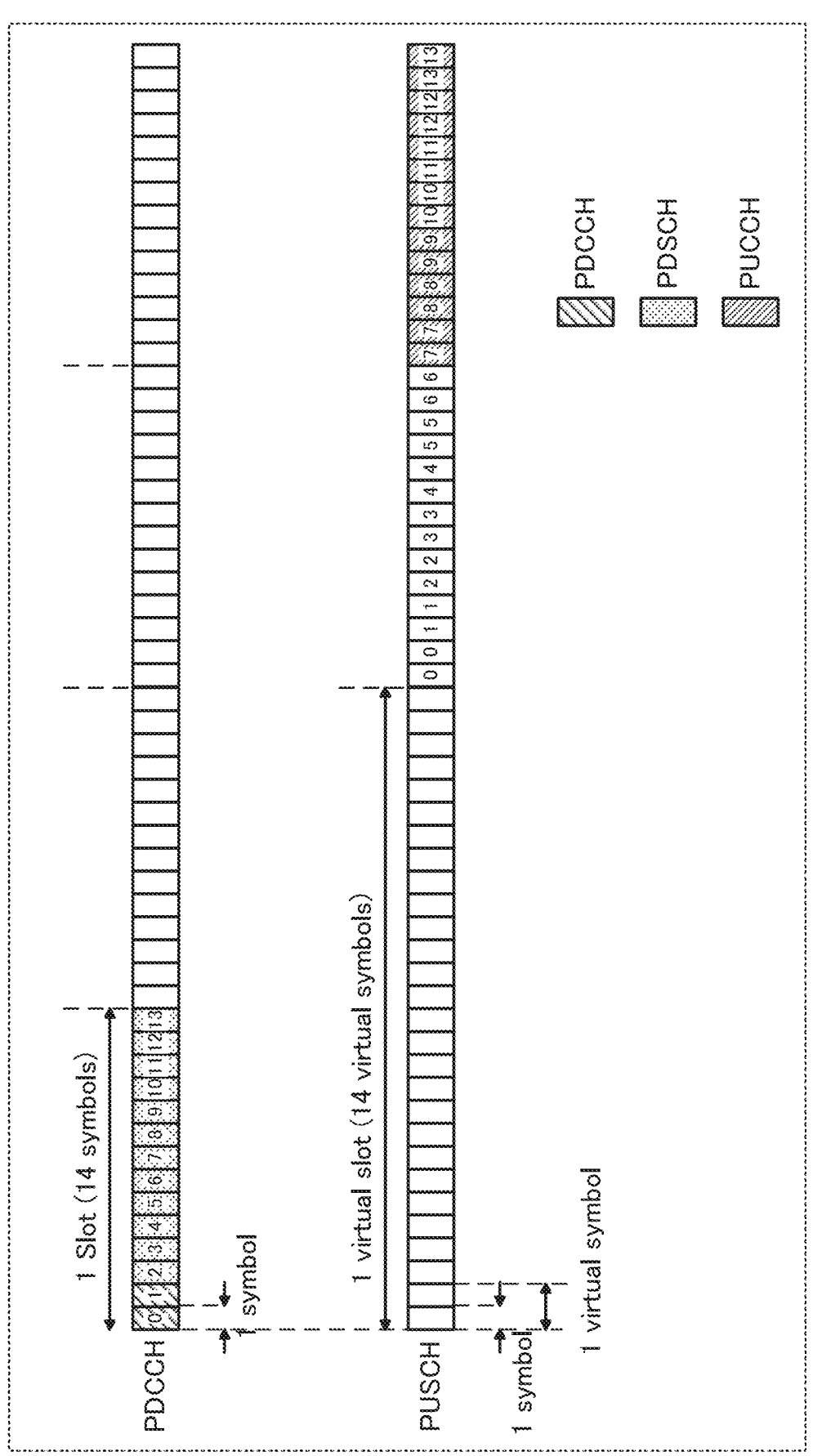
FIG. 19 illustrates an example of PUCCH resource allocation according to Option RA-1.

FIG. 19 illustrates an example of time domain resource allocation for PUCCH. In FIG. 19, virtualsymbolLengthForPDCCH=virtual symbolLengthForPDSCH=1, which are respectively for PDCCH and PDSCH, virtualsymbolLengthForPUCCH=2, which is for PUCCH, k=1, startingSymbolIndex=7, and nrofSymbol=7.

In FIG. 19, for example, PUCCH is transmitted in symbols having nrofSymbols=7 (e.g., Virtual symbols #7 to #13) from the Virtual symbol having startingSymbolIndex=7, in the Virtual slot after k=1 slot from the Virtual slot in which terminal 200 has received PDSCH.

According to Option RA-1, for example, with respect to terminal 200, virtualsymbolLength is set while the Virtual symbol and the Virtual slot are configured, so that the time domain resource for the symbol-level Repetition can be identified by using a PUCCH resource indication as in the Normal slot configuration.

Note that, the time domain resource for PUCCH is identified by using a Virtual symbol and a Virtual slot, as described above. On the other hand, the signal actually transmitted by terminal 200 (e.g., PUCCH) is a signal in units of Normal symbols, and terminal 200 transmits Normal symbols in the number of virtual symbolLengthForPUCCHs in, for example, a time duration of a Virtual symbol. For example, terminal 200 may generate, according to the PUCCH resource allocation, a complex symbol group corresponding to the number of Virtual symbols, and may replicate and map one complex symbol group to the Normal symbols in the number of virtualsymbolLengthForPUCCHs included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

<Option RA-2>

In Option RA-2, for example, base station 100 and terminal 200 may determine (i.e., identify) a time domain resource for communication, based on a Virtual symbol and a Virtual slot. Further, in Option RA-2, for assigning a start symbol position, base station 100 and terminal 200 may use at least one of a Normal symbol and a Normal slot, among time-domain resources, for example.

Option RN-2 may be applied to, for example, Option FS-2 described above.

Hereinafter, a description will be given of examples of applying Option RA-2 to PDSCH, PUSCH, and PUCCH.

(Option RA-2: PDSCH)

Base station 100, for example, may allocate a resource for PDSCH and transmit, to terminal 200. DCI for the resource-allocated PDSCH, PDCCH. Terminal 200, for example, receives and decodes PDCCH and performs demodulation and decoding of PDSCH based on control information included in DCI.

Here, the control information included in DCI may include, for example, information on a time domain resource to which PDSCH is assigned (e.g., TDRA information).

The time domain resource information may include, for example, information on a timing, e.g., how many Normal slots later terminal 200 starts receiving PDSCH since the Normal slot in which terminal 200 has received PDCCH (e.g., referred to as "$K_0$" or Normal slot offset), information on the start Normal symbol position of PDSCH in a Normal slot (e.g., referred to as "$S_{PDSCH}$" or starting Normal symbol) and on the number of Virtual symbols to which PDSCH is assigned (e.g., referred to as "$L_{PDSCH}$" or Virtual symbol length). For the time domain resource information, for example, a TDRA table (candidate for combination of above-mentioned $K_0$, $S_{PDSCH}$, $L_{PDSCH}$, and PDSCH mapping type) may be semi-statically configured by an UE-specific higher layer signal (RRC signal), and a combination to be used from the TDRA table may be configured by a dynamic indication such as DCI.

Further, a Normal symbol position "$S_{PDSCH}$" and the number of Virtual symbols "$L_{PDSCH}$" that are for PDSCH may be configured for terminal 200 by, for example, a value associated with a combination of the symbol position and the number of symbols (e.g., SLIV).

For example, a Normal slot in which terminal 200 starts receiving PDSCH may be identified according to following Equation 4.

(Equation 4)

$$\left\lfloor n \cdot \frac{2^{\mu_{PDSCH}}}{2^{\mu_{PDCCH}}} \right\rfloor + K_0 \quad [4]$$

Here, n indicates a Normal slot at which terminal 200 has received DCI (or PDCCH) corresponding to PDSCH assignment. Further, $2^{\mu_{PDSCH}}$ indicates SCS of the carrier or the MVP that receive PDSCH, and $2^{\mu PDCCH}$ indicates SCS of the carrier or the BWP that receive DCI (or PDCCH).

For example, terminal 200 may identify the Normal slot for receiving PDSCH, according to Equation 4. In addition, terminal 200 may identify, in the identified Normal slot, a Normal symbol in which PDSCH reception is started (i.e., starting position), based on $S_{PDSCH}$, for example. Terminal 200 may also identify, for example, the number of Virtual symbols for receiving PDSCH, based on $L_{PDSCH}$.

Figure 20:
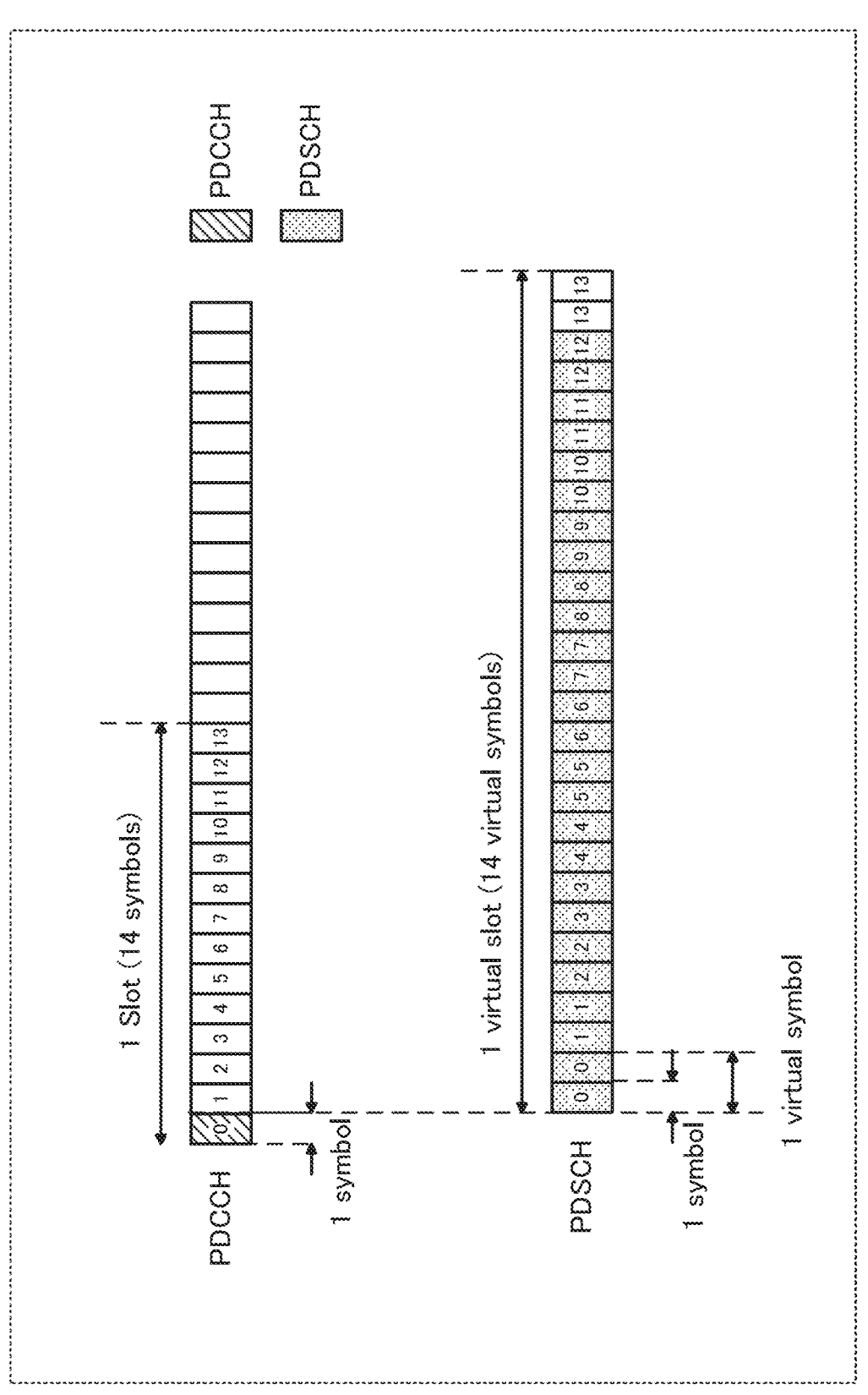
FIG. 20 illustrates an example of PDSCH resource allocation according to Option RA-2.

FIG. 20 illustrates an example of time domain resource allocation for PDSCH. In FIG. 20, virtualsymbolLength-ForPDCCH for PDCCH=1, virtualsymbolLength-ForPDSCH for PDSCH=2, $K_0$=0, $S_{PDSCH}$=1, and $L_{pDSCH}$=13.

In the example of FIG. 20, terminal 200 receives PDSCH to which the symbol-level Repetition is applied in Virtual symbols having $L_{PDSCH}$=13 (e.g., Virtual symbols #0 to #12) from a symbol position corresponding to the Normal symbol having $S_{PDSCH}$=1 (Normal symbol #1), in the Normal slot after $K_0$=0 slots (i.e., identical Normal slot) from the Normal slot in which terminal 200 has received PDCCH.

According to Option RA-2, for example, with respect to terminal 200, virtualsymbolLength is set while the Virtual symbol and the Virtual slot are configured, so that the time domain resource for the symbol-level Repetition can be identified by using an indication of the time domain resource for PDSCH as in the Normal slot configuration.

Further, according to Option RA-2, for example, in the time domain resource allocation, using the parameters in units of Normal symbols and Normal slots (e.g., $K_0$ and $S_{PDSCH}$) allows terminal 200 to receive PDSCH from any Normal symbol position in the Normal slat (e.g., any Normal symbol position including starting symbol). For example, in Option RA-2, a reception starting position of PDSCH can be configured with finer granularity (e.g., one Normal symbol) than the granularity of the Virtual symbol (two Normal symbols in FIG. 20). Accordingly, in Option RA-2, the flexibility of resource allocation for PDSCH can be improved as compared to Option RA-1, for example.

Note that, the time domain resource for PDSCH is identified by using a Virtual symbol and a Virtual slot, as described above. On the other hand, the signal actually received by terminal 200 (e.g., PDSCH) is a signal in units of Normal symbols, and terminal 200 receives Normal symbols in the number of virtualsymbolLengthForPDSCHs in, for example, a time duration of a Virtual symbol. For example, base station 100 may generate, according to the PDSCH resource allocation, a complex symbol group corresponding to the number of Virtual symbols, and may replicate and map one complex symbol group to the Normal symbols in the number of virtualsymbolLengthForPDSCHs included in one Virtual symbol. Moreover, terminal 200 may assume that, for example, one complex symbol group is replicated and mapped to Normal symbols included in one Virtual symbol at base station 100. Meanwhile, for example, processing such as common scrambling, a data modulation scheme, layer mapping, or antenna port mapping may be applied to a complex symbol group included in one Virtual symbol.

(Option RA-2: PUSCH)

Terminal 200 may, for example, transmit PUSCH according to at least one of resource allocation indicated by DCI in PDCCH from base station 100 and resource allocation previously configured by a higher layer signal (e.g., RRC signal).

Here, the control information included in DCI or the control information previously configured by the higher layer signal may include, for example, information on a time domain resource in which PUSCH is transmitted (e.g., TDRA information).

The time domain resource information may include, for example, information on a timing, e.g., terminal 200 transmits PUSCH how many Normal slots later from the Normal slot in which PDCCH has been received (e.g., may be referred to as "$K_2$" or Normal slot offset), information on the start Normal symbol position of PUSCH in a Normal slot (e.g., "$S_{PUSCH}$" or starting Normal symbol) and on the number of Virtual symbols in which PUSCH is transmitted (e.g., "$L_{PUSCH}$" or Virtual symbol length).

For the time domain resource information, for example, a TDRA table (candidate for combination of above-mentioned $K_2$, $S_{PUSCH}$, $L_{PUSCH}$, and PUTSCH mapping type) may be semi-statically, configured by an UE-specific higher layer signal (RRC signal), and a combination to be used from the TDRA table may be configured by a dynamic indication such as DCI or a previous configuration by the higher layer signal (e.g., RRC signal).

Further, a Virtual symbol position "$S_{PUSCH}$" and the number of Virtual symbols "$L_{PUSCH}$" that are for PUSCH may be configured for terminal 200 by, for example, a value associated with a combination of the Virtual position and the number of Virtual symbols (e. SLIV).

For example, a Normal slot in which terminal 200 transmits PUSCH may be identified according to following Equation 5.

(Equation 5)

$$\left\lfloor n \cdot \frac{2^{\mu PUSCH}}{2^{\mu PDCCH}} \right\rfloor + K_2 \qquad [5]$$

Here, n indicates a Normal slot in which terminal 200 has received DCI (or PDCCH) corresponding to PUSCH assignment. Further, $2^{\mu PUSCH}$ indicates SCS of the carrier or the BWP that transmit PUSCH, and $2^{\mu PDCCH}$ indicates SCS of the carrier or the BWP that receive DCI (or PDCCH).

For example, terminal 200 may identify the Normal slot for transmitting PUSCH, according to Equation 5, in addition, terminal 200 may identify, in the identified Normal slot, a Normal symbol in which PUSCH transmission is started (i.e., starting position), based on $S_{PUSCH}$, for example. Terminal 200 may also identify, for example, the number of Virtual symbols for transmitting PUSCH, based on $L_{PUSCH}$.

According to Option RA-2, for example, with respect to terminal 200, virtualsymbolLength is set while the Virtual symbol and the Virtual slot are configured, so that the time domain resource for the symbol-level Repetition can be identified by using an indication of the time domain resource for PUSCH as in the Normal slot configuration.

Further, according to Option RA-2, for example, in the time domain resource allocation, using the parameters in units of Normal symbols and Normal slots (e.g., K2 and SPUSCH) allows terminal 200 to transmit PUSCH from any Normal symbol position in the Normal slot (e.g., any Normal symbol position including starting symbol). For example, in Option RA-2, a transmission starting position of PUSCH can be configured with finer granularity than the granularity of the Virtual symbol. Accordingly, in Option RA-2, the flexibility of resource allocation for PUSCH can be improved as compared to Option RA-1, for example.

Note that, the time domain resource for PUSCH is identified by using a Virtual symbol and a Virtual slot, as described above. On the other hand, the signal actually transmitted by terminal 200 (e.g., PUSCH) is a signal in units of Normal symbols, and terminal 200 transmits Normal symbols in the number of virtualsymbolLengthForPDSCHs in, for example, a time duration of a Virtual symbol. For example, terminal 200 may generate, according to the PUSCH resource allocation, a complex symbol group corresponding to the number of Virtual symbols, and may replicate and map one complex symbol group to the Normal symbols in the number of virtualsymbolLengthForPUSCHs included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

(Option RA-2:PUCCH)

Terminal 200, for example, may feed back, in PUCCH, ACK/HACK indicating success or failure of decoding for PDSCH, Terminal 200 may also transmit, to base station 100, another kind of UCI such as CSI or SR by using, for example, PUCCH.

Further, when transmitting ACK/NACK for PDSCH assigned by DCI, terminal 200 may transmit PUCCH according to resource allocation indicated by DCI in PDCCH from base station 100, for example.

Here, the control information included in DCI may include, example, information on a PUCCH resource. The PUCCH resource may be configured with, for example, a plurality of parameters.

In the PUCCH resource, the time domain resource information may include, for example, information on the start Normal symbol position of PUCCH in a Normal slot (e.g., may be referred to as "startingSymbolIndex" or starting Normal symbol) and on the number of Virtual symbols for transmitting PUCCH (e.g., may be referred to as "nrofSymbols" or Virtual symbol length).

Further, the control information included in DCI may include, for example, information on a timing, e.g., terminal 200 starts transmitting PUCCH how many Normal slots later from the Normal slot in which PDSCH has been received (e.g., number of Normal slots "k").

Incidentally, for CSI and SR, for example, a PUCCH resource may be designated from base station 100 to terminal 200 by a higher layer signal (e.g., RRC signal).

For example, a Normal slot in which terminal 200 transmits PUCCH may be identified according to following Equation 6.

[6]

$$n+k \qquad \text{(Equation 6)}$$

Here, n indicates a Normal slot in which terminal 200 has received PDSCH. For example, k=0 may correspond to the last Normal slot that temporally overlaps the Normal slot in which PDSCH has been received among Normal slots applied to PUCCH.

For example, terminal 200 may identify the Normal slot for transmitting PUCCH, according to Equation 6. In addition, terminal 200 may identify, in the identified Normal slot, a Normal symbol in which PUCCH transmission is started (i.e., starting position), based on startingSymbolIndex, for example. Terminal 200 may also identify, for example, the number of Virtual symbols for transmitting PUCCH, based on nrofSymbols.

According to Option RA-2, for example, with respect to terminal 200, virtualsymbolLength is set while the Virtual symbol and the Virtual slot are configured, so that the time domain resource for the symbol-level Repetition can be identified by using an indication of the time domain resource for PUCCH as in the Normal slot configuration.

Further, according to Option RA-2, for example, in the time domain resource allocation, using the parameters in units of Normal symbols and Normal slots (e.g., K and startingSymbolIndex) allows terminal 200 to transmit PUCCH from any Normal symbol position in the Normal slot (e.g., any Normal symbol position including starting symbol).

For example, in Option RA-2, a transmission starting position of PUCCH can be configured with finer granularity than the granularity of the Virtual symbol. Accordingly, in Option RA-2, the flexibility of resource allocation for PUCCH can be improved as compared to Option RA-1, for example.

Note that, the time domain resource for PUCCH is identified by using a Virtual symbol and a Virtual slot, as described above. On the other hand, the signal actually transmitted by terminal 200 (e.g., PUCCH) is a signal in units of Normal symbols, and terminal 200 transmits Normal symbols in the number of virtualsymbolLengths in, for example, a time duration of a Virtual symbol. For example, terminal 200 may generate, according to the PUCCH resource allocation, a complex symbol group corresponding to the number of Virtual symbols, and may replicate and map one complex symbol group to the Normal symbols in the number of virtualsymbolLengths included in one Virtual symbol. Moreover, base station 100 may assume that, for example, one complex symbol group is replicated and mapped to Normal symbols included in one Virtual symbol at terminal 200, Meanwhile, for example, processing such as common scrambling, a data modulation scheme, layer mapping, or antenna port mapping may be applied to a complex symbol group included in one Virtual symbol.

<Option RA-3>

In Option RA-3, for example, base station 100 and terminal 200 may determine (i.e., identify) a time domain resource for communication, based on a Virtual symbol and a Virtual slot. Further, in Option RA-3, for identifying the time domain resource, base station 100 and terminal 200 may introduce an offset relating to a Normal symbol (e.g., offset in units of Normal symbols), for example.

Option RA-3 may be applied to, for example, either Option FS-1 or Option FS-2 described above.

Hereinafter, a description will be given of examples of applying Option RA-3 to PDSCH, PUSCH, and PUCCH.

(Option RA-3: PDSCH)

Base station 100, for example, may allocate a resource for PDSCH and transmit, to terminal 200, DCI for the resource-allocated PDSCH, in PDCCH. Terminal 200, for example, receives and decodes PDCCH and performs demodulation and decoding of PDSCH based on control information included in DCI.

Here, the control information included in DCI may include, for example, information on a time domain resource to which PDSCH is assigned (e.g., TDRA information).

The time domain resource information may include, for example, information on a timing, e.g., how many Virtual slots later terminal 200 receives PDSCH since the Virtual slot in which terminal 200 has received. PDCCH (referred to as "$K_0$" or Virtual slot offset), information on the start Virtual symbol position of PDSCH in a Virtual slot (e.g., referred to as "$S_{PDSCH}$" or starting Virtual symbol) and on the number of Virtual symbols to which PDSCH is assigned (e.g., referred to as "$L_{PDSCH}$" or Virtual symbol length).

For the time domain resource information, for example, a TDRA table (candidate for combination of above-mentioned $K_0$, $S_{PDSCH}$, $L_{PDSCH}$, and PDSCH mapping type) may be semi-statically configured by an UE-specific higher layer signal (RRC signal), and a combination to be used from the TDRA table may be configured by a dynamic indication such as DCI.

Further, a Virtual symbol position "$S_{PDSCH}$" and the number of Virtual symbols "$L_{PDSCH}$" that are for PDSCH may be configured for terminal 200 by, for example, a value associated with a combination of the symbol position and the number of symbols (e.g., Start and Length Indicator Value: SLIV).

Further, in Option RA-3, the time domain resource information may include, for example, an offset in units of Normal symbols. The offset may be indicated from base station 100 to terminal 200 by, for example, at least one of an UE-specific higher layer signal (e.g., RRC signal) and DCI separately from the TDRA information. Alternatively, the offset may be indicated (i.e., configured) by being included in the TDRA table.

For example, a Virtual slot in which terminal 200 receives PDSCH may be identified according to following Equation 7.

(Equation 7)

$$\left\lfloor n \cdot \frac{2^{\mu_{PDSCH}}}{2^{\mu_{PDCCH}}} \cdot \frac{virtualsymbolLengthForPDCCH}{virtualsymbolLengthForPDSCH} \right\rfloor + K_0 \quad [7]$$

Here, n indicates a Virtual slot in which terminal 200 has received DCI (e.g., PDCCH) corresponding to PDSCH assignment. Further, $2^{\mu_{PDSCH}}$ indicates SCS of the carrier or the BWP that receive PDSCH, and $2^{\mu_{PDCCH}}$ indicates SCS of the carrier or the BWP that receive DCI (or PDCCH). VirtualsymbolLengthForPDCCH indicates virtualsymbolLength applied to PDCCH including DCI corresponding to the PDSCH assignment, and virtualsymbolLengthForPDSCH indicates virtualsymbolLength applied to PDSCH received by terminal 200.

For example, terminal 200 may identify the Virtual slot for receiving PDSCH, according to Equation 7. In addition, terminal 200 may identify, in the identified Virtual slot, a Virtual symbol in which PDSCH reception is started (i.e., starting position), based on $S_{PDSCH}$, for example. Terminal 200 may also identify, for example, the number of Virtual symbols for receiving PDSCH, based on $L_{PDSCH}$.

Further, in Option RA-3, terminal 200, for example, after identifying, by the above-mentioned method, the time domain resource for receiving PDSCH, shifts, based on the offset in units of Normal symbols, the time domain resource for receiving PDSCH by the offset.

Figure 21:
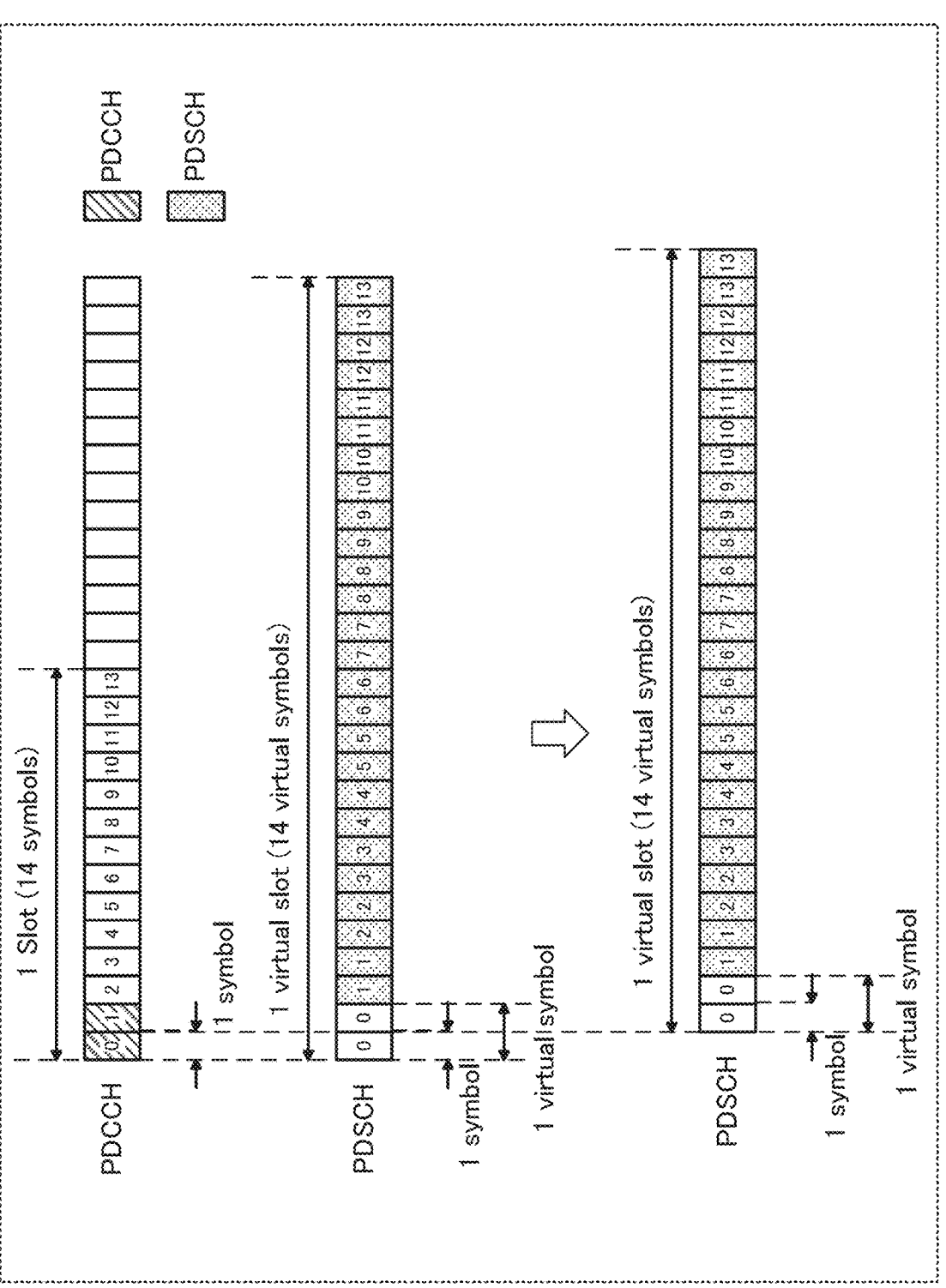
FIG. 21 illustrates an example of PDSCH resource allocation according to Option RA-3.

FIG. 21 illustrates an example of time domain resource allocation r PDSCH. In FIG. 21, virtualsymbolLength-ForPDCCH for PDCCH=1, virtualsymbolLength-ForPDCCH for PDSCH=2, $K_0$=0, $S_{PDSCH}$=1, and $L_{PDSCH}$=13, and Normal symbol-level offset=1 symbol.

In FIG. 21, for example, PDSCH is assigned to Virtual symbols having $L_{PDSCH}$=13 (e.g., Virtual symbols #1 to #13) from the Virtual symbol having $S_{PDSCH}$ in the Virtual slot after $K_0$=0 slots (i.e., identical Virtual slot) from the Virtual slot in which terminal 200 has received PDCCH.

Further, as illustrated in FIG. 21, Virtual symbols #1 to #13 to which PDSCH is assigned are shifted by the offset=1 Normal symbol.

According to Option RA-3, for example, with respect to terminal 200, virtualsymbolLength is set while the Virtual symbol and the Virtual slot are configured, so that the time domain resource for the symbol-level Repetition can be identified by using an indication of the time domain resource for PDSCH as in the Normal slot configuration.

Further, according to Option RA-3, for example, in the time domain resource allocation, applying the offset in units of Normal symbols allows terminal 200 to receive PDSCH from any Normal symbol position in the Normal slot (e.g., any Normal symbol position including starting symbol). For example, in Option RA-3, a reception starting position of PDSCH can be configured with finer granularity (e.g., one Normal symbol) than the granularity of the Virtual symbol (two Normal symbols in FIG. 21). Accordingly, in Option RA-3, the flexibility of resource allocation for PDSCH can be improved as compared to Option RA-1, for example.

Note that, the time domain resource for PDSCH is identified by using a Virtual symbol and a Virtual slot, as described above. On the other hand, the signal actually received by terminal 200 (e.g., PDSCH) is a signal in units of Normal symbols, and terminal 200 receives Normal symbols in the number of virtualsymbolLengthForPDSCHs in, for example, a time duration of a Virtual symbol. For example, base station 100 may generate, according to the PDSCH resource allocation, a complex symbol group corresponding to the number of Virtual symbols, and may replicate and map one complex symbol group to the Normal symbols in the number of virtualsymbolLengthForPDSCHs included in one Virtual symbol. Moreover, terminal 200 may assume that, for example, one complex symbol group is replicated and mapped to Normal symbols included in one Virtual symbol at base station 100. Meanwhile, for example, processing such as common scrambling, a data modulation scheme, layer mapping, or antenna port mapping may be applied to a complex symbol group included in one Virtual symbol.

Further, the example illustrated in FIG. 21 is similar to, for example, the example of applying the configuration of Option FS-2. On the other hand, Option RA-3 may be applied to, for example, the configuration of Option FS-1. When Option RA-3 is applied to Option FS-1, for example, terminal 200 may receive some of the Normal symbols included in the Virtual symbol.

(Option RA-3: PUSCH)

Terminal 200 may, for example, transmit PUSCH according to at least one of resource allocation indicated by DCI in PDCCH from base station 100 and resource allocation previously configured by a higher layer signal (e.g., RRC signal).

Here, the control information included in DCI or the control information previously configured by the higher layer signal may include, for example, information on a time domain resource in which PUSCH is transmitted (e.g., TDRA information).

The time domain resource information may include, for example, information on a timing, e.g., terminal 200 transmits PUSCH how many Virtual slots later from the Virtual slot in which PDCCH has been received (e.g., may be referred to as "$K_2$" or Virtual slot offset), information on the start Virtual symbol position of PUSCH in a Virtual slot (e.g., "$S_{PUSCH}$" or starting Virtual symbol) and on the number of Virtual symbols in which PUSCH is transmitted (e.g., "$L_{PUSCH}$" or Virtual symbol length).

For the time domain resource information, for example, a TDRA table (candidate for combination of above-mentioned $K_2$, $S_{PUSCH}$, $L_{PUSCH}$ and PUSCH mapping type) may be semi-statically configured by an UE-specific higher layer signal (RRC signal), and a combination to be used from the TDRA table may be configured by a dynamic indication such as DCI or a previous configuration by the higher layer signal (e.g., RRC signal).

Further, a Virtual symbol position "$S_{PUSCH}$" and the number of Virtual symbols "$L_{PUSCH}$" that are for PUSCH may be configured for terminal 200 by, for example, a value associated with a combination of the Virtual position and the number of Virtual symbols (e.g., SLIV).

Further, in Option RA-3, the time domain resource information may include, for example, an offset in units of Normal symbols. The offset may be indicated from base station 100 to terminal 200 by, for example, at least one of an UE-specific higher layer signal (e.g., RRC signal) and DCI separately from the TDRA information. Alternatively, the offset may be indicated (i.e., configured) by being included in the TDRA table.

For example, a Virtual slot in which terminal 200 transmits PUSCH may be identified according to following Equation 8.

(Equation 8)

$$\left\lfloor n \cdot \frac{2^{\mu PUSCH}}{2^{\mu PDCCH}} \cdot \frac{virtualsymbolLengthForPDCCH}{virtualsymbolLengthForPUSCH} \right\rfloor + K_2 \qquad [8]$$

Here, n indicates a Virtual slot in which terminal 200 has received DCI (or PDCCH) corresponding to PUSCH assignment. Further, $2^{\mu PUSCH}$ indicates SCS of the carrier or the BWP that transmit PUSCH, and $2^{\mu PDSCH}$ indicates SCS of the carrier or the BWP that receive DCI (or PDCCH). VirtualsymbolLengthForPDCCH indicates virtualsymbolLength applied to PDCCH including DCI corresponding to the PUSCH assignment, and virtualsymbolLengthForPUSCH indicates virtualsymbolLength applied to PUSCH transmitted by terminal 200.

For example, terminal 200 may identify the Virtual slot for transmitting PUSCH, according to Equation 8. In addition, terminal 200 may identify, in the identified Virtual slot, a Virtual symbol in which PUSCH transmission is started (i.e., starting position), based on $S_{PUSCH}$, for example. Terminal 200 may also identify, for example, the number of Virtual symbols for transmitting PUSCH, based on $L_{PUSCH}$.

Further, in Option RA-3, terminal 200, for example, after identifying, by the above-mentioned method, the time domain resource for transmitting PUSCH, shifts, based on the offset in units of Normal symbols, the time domain resource for transmitting PUSCH by the offset.

According to Option RA-3, for example, with respect to terminal 200, virtualsymbolLength is set while the Virtual symbol and the Virtual slot are configured, so that the time domain resource for the symbol-level Repetition can be identified by using an indication of the time domain resource for PUSCH as in the Normal slot configuration.

Further, according to Option RA-3, for example, in the time domain resource allocation, applying the offset in units of Normal symbols allows terminal 200 to transmit PUSCH from any Normal symbol position in the Normal slot (e.g., any Normal symbol position including starting symbol). For example, in Option RA-3, a transmission starting position of PUSCH can be configured with finer granularity than the granularity of the Virtual symbol. Accordingly, in Option RA-3, the flexibility of resource allocation for PUSCH can be improved as compared to Option RA-1, for example.

Note that, the time domain resource for PUSCH may be identified by using a Virtual symbol and a Virtual slot, as described above. On the other hand, the signal actually transmitted by terminal 200 (e.g., PUSCH) is a signal in units of Normal symbols, and terminal 200 transmits Normal symbols in the number of virtualsymbolLengths in, for example, a time duration of a Virtual symbol. For example, terminal 200 may generate, according to the PUSCH resource allocation, a complex symbol group corresponding to the number of Virtual symbols, and may replicate and map one complex symbol group to the Normal symbols in the number of virtualsymbolLengths included in one. Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

Further, for example. Option RA-3 may be applied to a configuration of Option FS-1 or Option FS-2. When Option RA-3 is applied to Option FS-2, terminal 200 may configure a Virtual symbol and a Virtual slot from, for example, a symbol position at which PUSCH transmission is started. On the other hand, when applying Option RA-3 to Option FS-1, terminal 200 may transmit, for example, some of Normal symbols included in a Virtual symbol.

(Option RA-3:PUCCH)

Terminal 200, for example, may feed back, in PUCCH, ACK/NACK indicating success or failure of decoding for PDSCH, Terminal 200 may also transmit, to base station 100, another kind of UCI such as CSI or SR by using, for example, PUCCH.

Further, when transmitting ACK/NACK for PDSCH assigned by DCI, terminal 200 may transmit PUCCH according to resource allocation indicated by DCI in PDCCH from base station 100, for example.

Here, the control information included in DCI may include, for example, information on a PUCCH resource. The PUCCH resource may be configured with, for example, a plurality of parameters.

In the PUCCH resource, the time domain resource information may include, for example, information on the start Virtual symbol position of PUCCH in a Virtual slot (e.g., may be referred to as "startingSymbolIndex" or starting Virtual symbol) and on the number of Virtual symbols for transmitting PUCCH (e.g., may be referred to as "nrofSymbols" or Virtual symbol length).

Further, the control information included in DCI may include, for example, information on a timing, e.g., terminal 200 transmits PUCCH how many Virtual slots later from the Virtual slot in which PDSCH has been received (e.g., number of Virtual slots "k").

Incidentally, for CSI and SR, for example, a PUCCH resource may be designated from base station 100 to terminal 200 by a higher layer signal (e.g., RRC signal).

Further, in Option RA-3, the time domain resource information may include, for example, an offset in units of Normal symbol. The offset may be indicated from base station 100 to terminal 200 by, for example, at least one of an UE-specific higher layer signal (e.g., RRC signal) and DCI separately from the above-mentioned PUCCH resource. Alternatively, the offset may be indicated (i.e., configured) by being included in the above-mentioned parameters of the PUCCH resource.

For example, a Virtual slot in which terminal 200 transmits PUCCH may identified according to following Equation 9.

[9]

$$n+k \qquad \text{(Equation 9)}$$

Here, n indicates a Virtual slot in which terminal 200 has received PDSCH. For example, k=0 may correspond to the last Virtual slot that temporally overlaps the Virtual slot in which PDSCH has been received among Virtual slots applied to PUCCH.

For example, terminal 200 may identify the Virtual slot for transmitting PUCCH, according to Equation 9. In addition, terminal 200 may identify, in the identified Virtual slot, a Virtual symbol in which PUCCH transmission is started (i.e., starting position), based on startingSymbolIndex, for example. Terminal 200 may also identify, for example, the number of Virtual symbols for transmitting PUCCH, based on nrofSymbols.

Further, in Option RA-3, terminal 200, for example, after identifying, by the above-mentioned method, the time domain resource for transmitting PUCCH, shifts, based on the offset in units of Normal symbols, the time domain resource for transmitting PUCCH by the offset.

According to Option RA-3, for example, with respect to terminal 200, virtualsymbolLength is set while the Virtual symbol and the Virtual slot are configured, so that the time domain resource for the symbol-level Repetition can be identified by using a PUCCH resource indication as in the Normal slot configuration.

Further, according to Option RA-3, for example, in the time domain resource allocation, applying the offset in units of Normal symbols allows terminal 200 to transmit PUCCH from any Normal symbol position in the Normal slot (e.g., any Normal symbol position including starting symbol). For example, in Option RA-3, a transmission starting position of PUCCH can be configured with finer granularity than the granularity of the Virtual symbol. Accordingly, in Option RA-3, the flexibility of resource allocation for PUCCH can be improved as compared to Option RA-1, for example.

Note that, the time domain resource for PUCCH may be identified by using a Virtual symbol and a Virtual slot, as described above. On the other hand, the signal actually transmitted by terminal 200 (e.g., PUCCH) is a signal in units of Normal symbols, and terminal 200 transmits Normal symbols in the number of virtualsymbolLengths in, for example, a time duration of a Virtual symbol. For example, terminal 200 may generate, according to the PUCCH resource allocation, a complex symbol group corresponding to the number of Virtual symbols, and may replicate and map one complex symbol group to the Normal symbols in the number of virtualsymbolLengths included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

Further, for example, Option RA-3 may be applied to a configuration of Option FS-1 or Option FS-2. When Option RA-3 is applied to Option FS-2, terminal 200 may configure a Virtual symbol and a Virtual slot from, for example, a symbol position at which PUCCH transmission is started. On the other hand, when applying Option RA-3 to Option FS-1, terminal 200 may transmit, for example, some of Normal symbols included in a Virtual symbol.

[5. DMRS Mapping]

Mapping of DMRS for PDSCH received by terminal 200, and PUSCH and PUCCH that are transmitted by terminal 200 may be determined (in other words, identified) based on, for example, at least a Virtual symbols and a Virtual slot.

Hereinafter, determination examples for the DMRS mapping will be described.

<Option DMRS-1>

In Option DMRS-1, for example, base station 100 and terminal 200 may determine (in other words, identify), based on a Virtual symbol and a Virtual slot, mapping of DMRS used for communication to a resource. That is, in Option DMRS-1, information on a Normal slot and on a Normal symbol need not be used for identifying the DMRS mapping.

In addition, in Option DMRS-1, for example, a channel estimation result obtained by DMRS may be used for demodulating a data symbol in a Virtual slot including the DMRS. That is, the channel estimation result obtained by DMRS need not be used in a Virtual slot different from the Virtual slot including the DMRS.

In NR, for example, DMRS to be used in channel estimation for demodulation may be mapped in resources for PDSCH, PUCCH, and PUSCH. DMRS may be mapped, for example, in front of a slot. Alternatively, DMRS may be mapped in, for example, a plurality of symbols in the slot. Further, in NR, for example, a symbol position where DMRS is mapped may be defined by parameters such as the mapping type of data (e.g., PDSCH or PUSCH), a PUCCH format, the number of symbols of PDSCH, PUSCH, or PUCCH (e.g., corresponding to number of Normal symbols), or the presence or absence of additional DMRS and the number thereof (e.g., see NPL 3).

Figure 22:
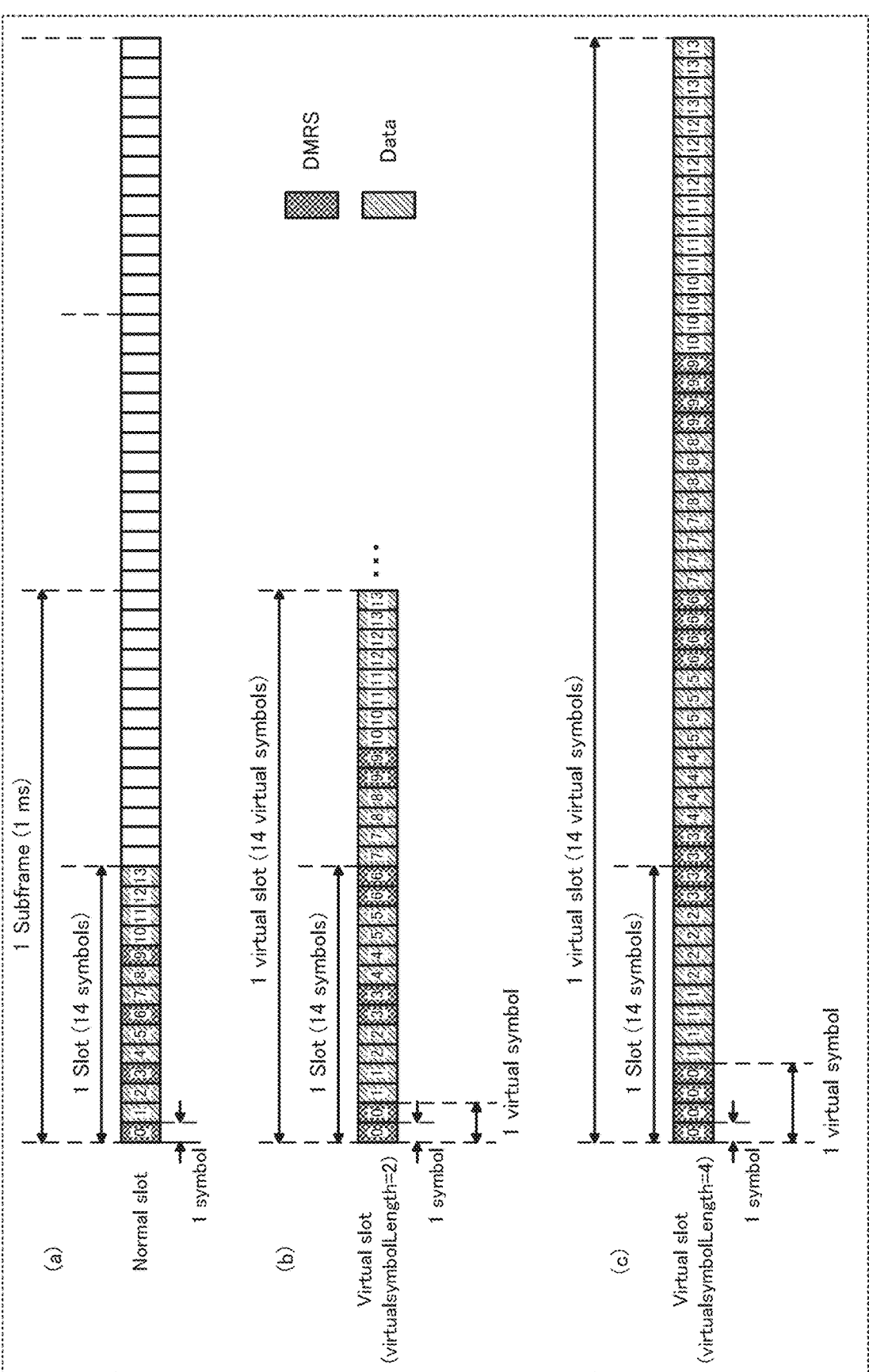
FIG. 22 illustrates a mapping example of DMRS according to Option DMRS-1.

FIG. 22 illustrates in (a) an example of DMRS mapping for data in NR (e.g., PDSCH or PUSCH). FIG. 22 indicates in (a) a DMRS mapping example in the case of, for example, mapping type B, 14-symbol assignment, 1-symbol-front-loaded DMRS (in other words, mapping of DMRS symbol in the front of slot), and three pieces of additional DMRS. In (a) of FIG. $2^2$, DMRS is mapped to, for example, symbols #0, #3, #6 and #9 in the slot.

In Option DMRS-1, DMRS is mapped while replacing DMRS mapping for a Normal slot and a Normal symbol with a Virtual slot and a Virtual symbol, for example.

That is, in Option DMRS-1, DMRS mapping in a Virtual symbol in a Virtual slot may be identified by parameters such as the mapping type of data (e.g., PDSCH or PUSCH), a PUCCH format, the number of Virtual symbols of PDSCH, PUSCH, or PUCCH, or the presence or absence of additional DMRS and the number thereof.

FIG. 22 illustrates in (b) and (c) examples of DMRS mapping in Option DMRS-1. FIG. 22 indicates in (b) for example, a DMRS mapping example in the case of virtualsymbolLength=2 while FIG. 22 indicates in (c), for example, a DMRS mapping example in the case of virtualsymbolLength=4. Further, FIG. 22 indicates in (b) and (c), as in (a) of FIG. 22, a DMRS mapping example in the case of, for example, mapping type B, 14-Virtual symbol assignment, 1-symbol-front-loaded DMRS, and three pieces of additional DMRS.

In both (b) and (c) of FIG. 22, DMRS is mapped to Virtual symbols #0, #3, #6, and #9 in the Virtual slots. Comparing (a) of FIG. 22 with (b) and (c) of FIG. 22, the symbol numbers where DMRS is mapped (e.g., Normal symbol numbers or Virtual symbol numbers) are the same (#0, #3, #6, and #9), although the values of virtualsymbolLength are different.

Thus, according to Option DMRS-1, for example, with respect to terminal 200, virtualsymbolLength is set while the Virtual symbol and the Virtual slot are configured, so that the DMRS mapping for the symbol-level Repetition (i.e., Virtual slot configuration) can be identified based on a DMRS mapping method as in the Normal slot configuration.

<Option DMRS-2>

In Option DMRS-2, for example, base station 100 and terminal 200 may determine (in other words, identify) mapping of DMRS used for communication to a resource, based on a Virtual symbol, a Virtual slot, and a Normal slot.

In addition, in Option DMRS-2, for example, a channel estimation result obtained, by DMRS may be used for demodulating a data symbol in a Normal slot including the DMRS. That is, the channel estimation result obtained by DMRS need not be used in a Virtual slot different from the Virtual slot including the DMRS.

As mentioned above, in NR, for example, DMRS to be used in channel estimation for demodulation may be mapped in resources for PDSCH, PUCCH, and PUSCH. DMRS may be mapped, for example, in front of a slot. Alternatively, DMRS may be mapped in, for example, a plurality of symbols in the slot. Further, in NR, for example, a symbol position where DMRS is mapped may be defined by parameters such as the mapping type of data (e.g., PDSCH or PUSCH), a PUCCH format, the number of symbols of PDSCH, PUSCH, or PUCCH (e.g., corresponding to number of Normal symbols), or the presence or absence of additional DMRS and the number thereof (e.g., see NPL 3).

Figure 23:
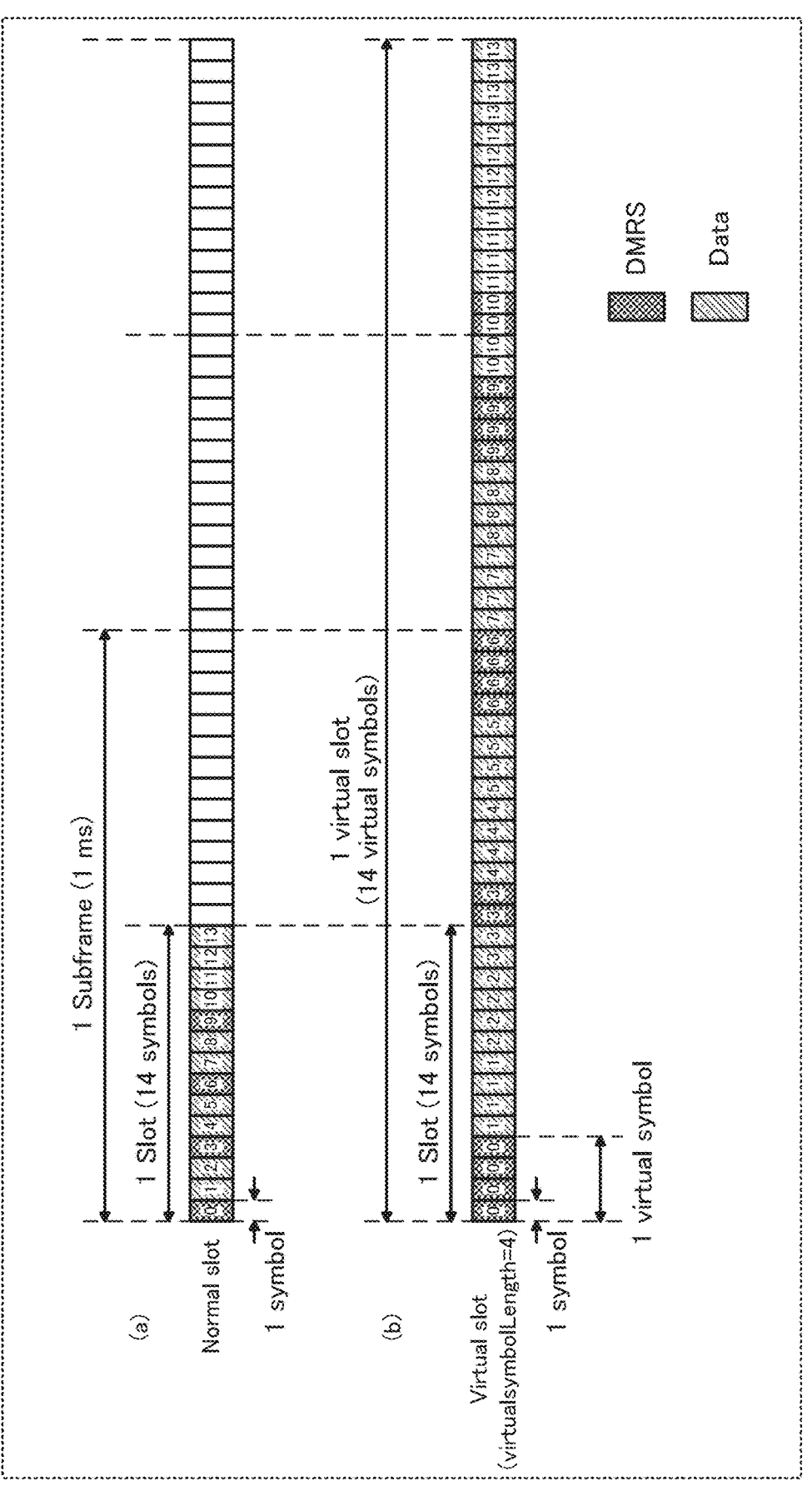
FIG. 23 illustrates a mapping example of DMRS according to Option DMRS-2.

FIG. 23 illustrates in (a) an example of DMRS mapping for data in NR (e.g., PDSCH or PUSCH), FIG. 23 indicates in (a) a DMRS mapping example in the case of, tier example, mapping type B, 14-symbol assignment, 1-symbol-front-loaded DMRS (in other words, mapping of DMRS symbol in the front of slot), and three pieces of additional DMRS. In (a) of FIG. 23, DMRS is mapped to, for example, symbols #0, #3, #6 and #9 in the slot.

In Option DMRS-2, DMRS is mapped while replacing DMRS mapping for Option DMRS-1, and a Normal slot and a Normal symbol with a Virtual slot and a Virtual symbol, for example. That is, in Option DMRS-2, DMRS mapping in a Virtual symbol in a Virtual slot may be identified by parameters such as the mapping type of data (PDSCH or PUSCH), a PUCCH format, the number of Virtual symbols of PDSCH, PUSCH, or PUCCH, or the presence or absence of additional DMRS and the number thereof.

Further, in Option DMRS-2, for example, in a case where a Virtual symbol crossing a Normal slot boundary is present in Virtual symbols to which DMRS may be mapped, the Virtual symbol may be divided into two Sub-virtual symbols before and after the Normal slot boundary, Among the Sub-virtual symbols resulting from division, DMRS may be mapped to the Sub-virtual symbol after the Normal slot boundary, for example.

Incidentally, among the Sub-virtual symbols resulting from division, to the Sub-virtual symbol before the slot boundary, DMRS may be mapped or a data symbol may be mapped. Alternatively, for example, among the Sub-virtual symbols resulting from division, DMRS is mapped to the Sub-virtual symbol before the slot boundary while DMRS may not be mapped to the Sub-virtual symbol after the slot boundary.

FIG. 23 illustrates in (b) an example of DMRS mapping in Option DMRS-2. FIG. 23 indicates in (b) for example, a DMRS mapping example in the case of virtualsymbolLength=4. Further, FIG. 23 indicates in (b), as in (a) of FIG. 23, a DMRS mapping example in the case of, for example, mapping type B, 14-Virtual symbol assignment. 1-symbol-front-loaded DMRS, and three pieces of additional DMRS.

In (b) of FIG. 23, DMRS is mapped to Virtual symbols #0, #3, #6, and #9 in the Virtual slot. Comparing (a) of FIG. 23 with (b) and (c) of FIG. 23, the symbol numbers where DMRS is mapped (e.g., Normal symbol numbers or Virtual symbol numbers) are the same (#0, #3, #6, and #9), although the values of virtualsymbolLength are different.

Further, in (b) of FIG. 23, Virtual symbols #3 and #10 cross the Normal slot boundaries. Therefore, as illustrated in (b) of FIG. 23, Virtual symbol #3 and #10 are each divided into two Sub-virtual symbols before and after the Normal slot boundaries, and then, DMRS is mapped to, for example, the Sub-virtual symbols after the Normal slot boundaries. On the other hand, in (b) of FIG. 23, in Virtual symbols #3 and #10, DMRS is not mapped to the Sub-virtual symbols before the Normal slot boundaries (i.e., data is mapped).

Thus, according to Option DMRS-2, for example, with respect to terminal 200, virtualsymbolLength is set while the Virtual symbol and the Virtual slot are configured, so that the DMRS mapping for the symbol-level Repetition (i.e., Virtual slot configuration) can be identified based on a DMRS mapping method as in the Normal slot configuration.

Further, as mentioned above, for example, the channel estimation result obtained by DMRS may be used for demodulating a data symbol in a Normal slot including the DMRS (i.e., result is not applicable in Normal slot different from Normal slots including DMRS). Even in this case, according to Option DMRS-2, for example, the channel estimation accuracy can be improved by DMRS mapped to a Virtual symbol corresponding to at least one Normal slot (in FIG. 23, Sub-virtual symbol after Normal slat boundary), in a Virtual symbol time duration that crosses a Normal slot boundary.

[6. Additional Repetition]

For example, with respect to the PDSCH reception, the PUSCH transmission, or the PUCCH transmission that are based on a Virtual symbol or a Virtual slot configured by application of the symbol-level Repetition, "Virtual slot-level Repetition (repetition in units of Virtual slots)," "Repetition per resource allocated by Virtual symbol," "Virtual symbol group-level Repetition (repetition in units of Virtual symbol groups)" may be further applied.

Hereinafter, an example of each Repetition will be described.

<Option R-1>

In NR Rel. In 15, for example, the slot-level Repetition is applicable for PDSCH, PUCCH, and PUSCH, as mentioned above. In Option R-1, for example, the symbol-level Repetition is applied in order to configure a Virtual symbol and a Virtual slot, and Virtual slot-level Repetition is further applied. For example, in Option R-1, base station 100 and terminal 200 control the Repetition in communication based on the Virtual slot units.

Figure 24:
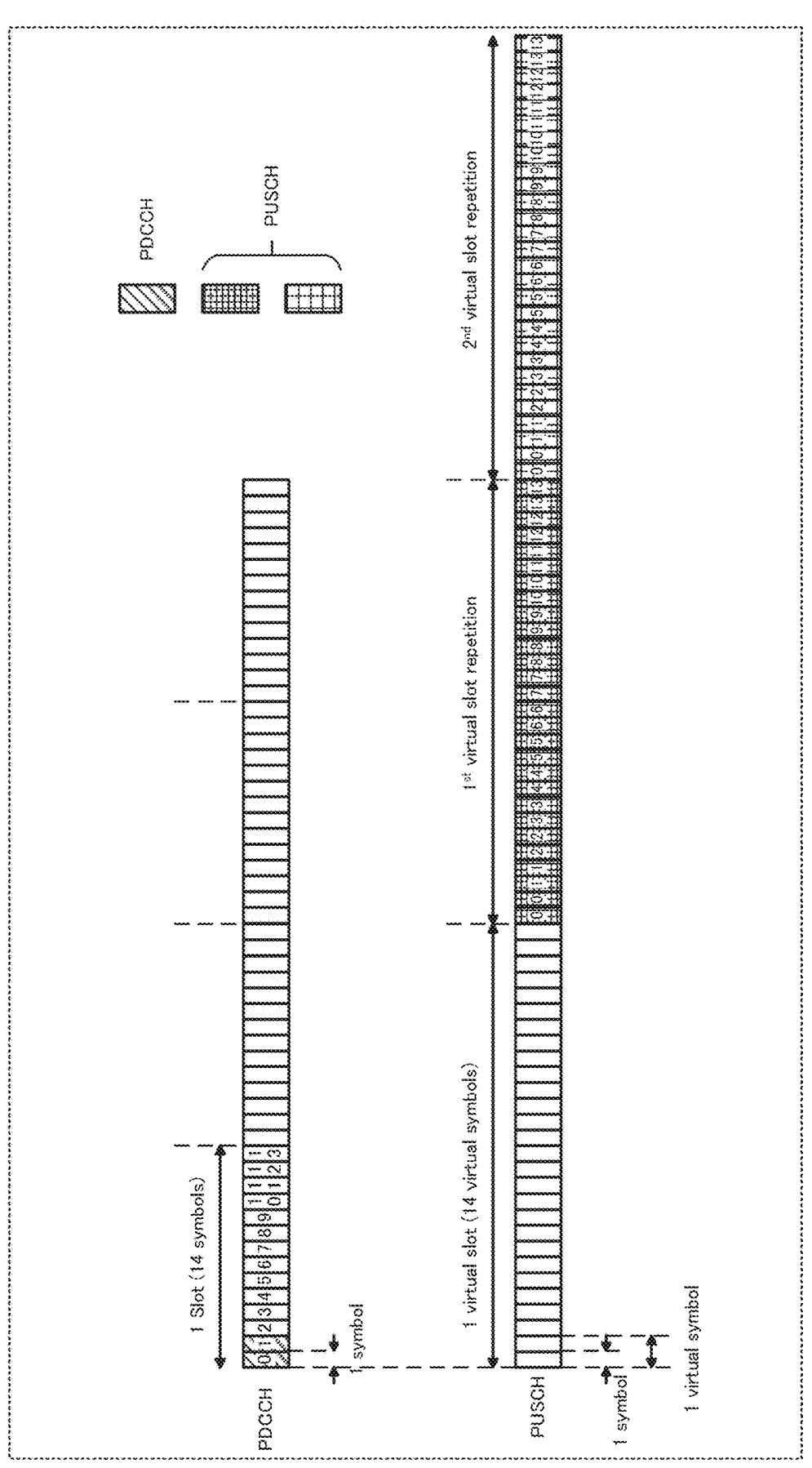
FIG. 24 illustrates an exemplary repetition according to Option R-1.

FIG. 24 illustrates an example of the Virtual slot-level Repetition. In FIG. 24, virtualsymbolLength=2 and numberofRepetition, which is the number of Virtual slot-level Repetitions, is set to 2. For example, as illustrated in FIG. 24, when the Virtual slot-level Repetition is applied, a common time domain resource allocation may be applied over Virtual slots in the number of numberofRepetition.

According to Option R-1, for example, as described in Option FS-1-4, even when the upper limit value that can be configured as the number of virtualsymbolLength is small (in other words, when number of Repetitions applicable to symbol-level Repetition is small), the channel estimation accuracy can be improved by the Virtual slot-level Repetition.

Further, the coverage can be enhanced by a combination of the symbol-level Repetition and the Virtual slot-level Repetition. In other words, the Virtual slot-level Repetition enables compensation for the coverage enhancement effect against a decrease in the number of Repetitions applicable to the symbol-level Repetition.

Here, since the same signal is repeatedly transmitted in the Repetition, an increase in the number of Repetitions may lower the resource utilization efficiency. On the other hand, depending on the channel status, the reception side can demodulate and decode the data without receiving all the configured Repetitions in some cases.

For example, in the downlink data transmission. When the data is successfully demodulated and decoded prior to reception of the data for the configured (in other words, designated) number of Repetitions, terminal 200 feeds back ACK to base station 100, and thereby base station 100 can stop the Repetition transmission halfway (Early termination).

Further, for example, in the uplink data transmission, when the data is successfully demodulated and decoded prior to reception of the data for the configured number of Repetitions, base station 100 can stop (Early termination) the Repetition transmission in terminal 200 by indicating ACK to terminal 200.

Thus, the application of the Early termination makes it possible to suppress a reduction in the resource utilization efficiency.

When the Early termination is applied, the reception side desirably, for example, performs demodulation and decoding of the data in a state where all the encoded bits have been received. On the other hand, in the symbol-level Repetition, all the encoded bits cannot be received unless the last Virtual symbol is received. Hence, it is difficult to apply the Early termination.

By contrast, in Option R-1, the reception side can receive all the encoded bits for each reception of a single Virtual slot because, for example, the symbol-level Repetition and the Virtual slot-level Repetition are combined. Hence, in Option R-1, the Early termination per Virtual slot can be applied. Thus, it is possible to obtain an effect on suppressing a reduction in the resource utilization efficiency due to the Early termination, while improving the channel estimation accuracy by the symbol-level Repetition.

Incidentally, although the Virtual slot-level Repetition for PUSCH has been described in FIG. 24, Option R-1 may be applied to, for example, PDSCH, PUCCH, and PUSCH to which the slot-level Repetition is applied in NR Re. 15, and/or may be applied to another channel/signal such as PDCCH, CSI-RS, or SRS, for example.

<Option R-2>

Figure 25:
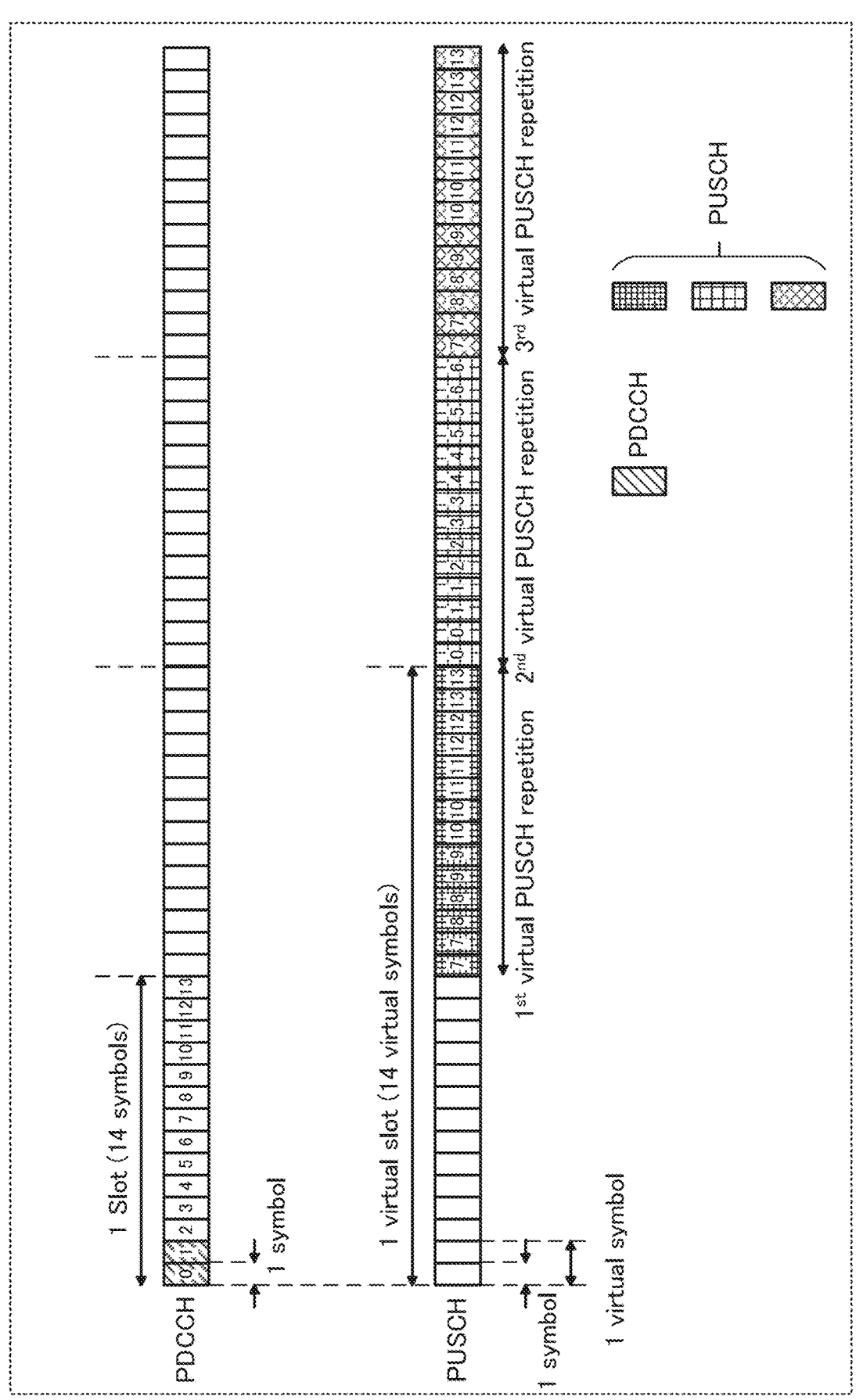
FIG. 25 illustrates an exemplary repetition according to Option R-2.

In NR Rel. 16, for example, as described above, the mini-slot-level Repetition that repeatedly transmits one or more PUSCHs in one slot is applicable to PUSCH. In Option R-2, for example, the symbol-level Repetition is applied in order to configure a Virtual symbol and a Virtual slot, and Repetition per resource allocated by the Virtual symbol and the Virtual slot is further applied. For example, in Option R-2, base station 100 and terminal 200 control the Repetition in communication based in units each including a plurality of Virtual symbols configured as a single unit (e.g., in units of resources allocated to signal per Virtual symbol), FIG. 25 illustrates an exemplary Repetition per resource allocated by Virtual symbol. In FIG. 25, virtualsymbolLength=2, and numberofRepetition, which is the number of Repetitions of PUSCH assigned by using in units of Virtual symbols or Virtual slots is set to 3. In FIG. 25, for example, since a resource is allocated to PUSCH in units of seven Virtual symbols, Repetition in units of seven Virtual symbols is applied.

According to Option R-2, for example, as described in Option FS-1-4, even when the upper limit value that can be configured as the number of virtualsymbolLength is small, the channel estimation accuracy can be improved by the Repetition per resource allocated by Virtual symbol.

Further, the coverage can be enhanced by a combination of the symbol-level Repetition and the Repetition per resource allocated by the Virtual symbol. In other words, Repetition per resource allocated by the Virtual symbol enables compensation for the coverage enhancement effect against a decrease in the number of Repetitions applicable to the symbol-level Repetition.

Further, according to Option R-2, as in Option R-1, since the Early termination per resource allocated by using a Virtual symbol or a Virtual slot can be applied, and thus, a reduction in the resource utilization efficiency can be suppressed.

Incidentally, in FIG. 25, a description has been given of the Repetition for PUSCH to which the PUSCH-level Repetition (repetition in units of PUSCHs) is applied in NR Rel. 16, but Option R-2 may be applied to, for example, PDSCH and MATH and/or may be applied to another channel/signal such as PDCCH, CSI-RS, or SRS, for example.

<Option R-3>

In Option R-3, for example, the symbol-level Repetition is applied in order to configure a Virtual symbol and a Virtual slot, and a Virtual symbol group-level Repetition is further applied.

Here, a "Virtual symbol group" includes, for example, a plurality of Virtual symbols.

For example, in Option R-3, base station 100 and terminal 200 control the Repetition in communication based in units each including a plurality of Virtual symbols configured as a single unit (for example, in units of Virtual symbol groups).

Figure 26:
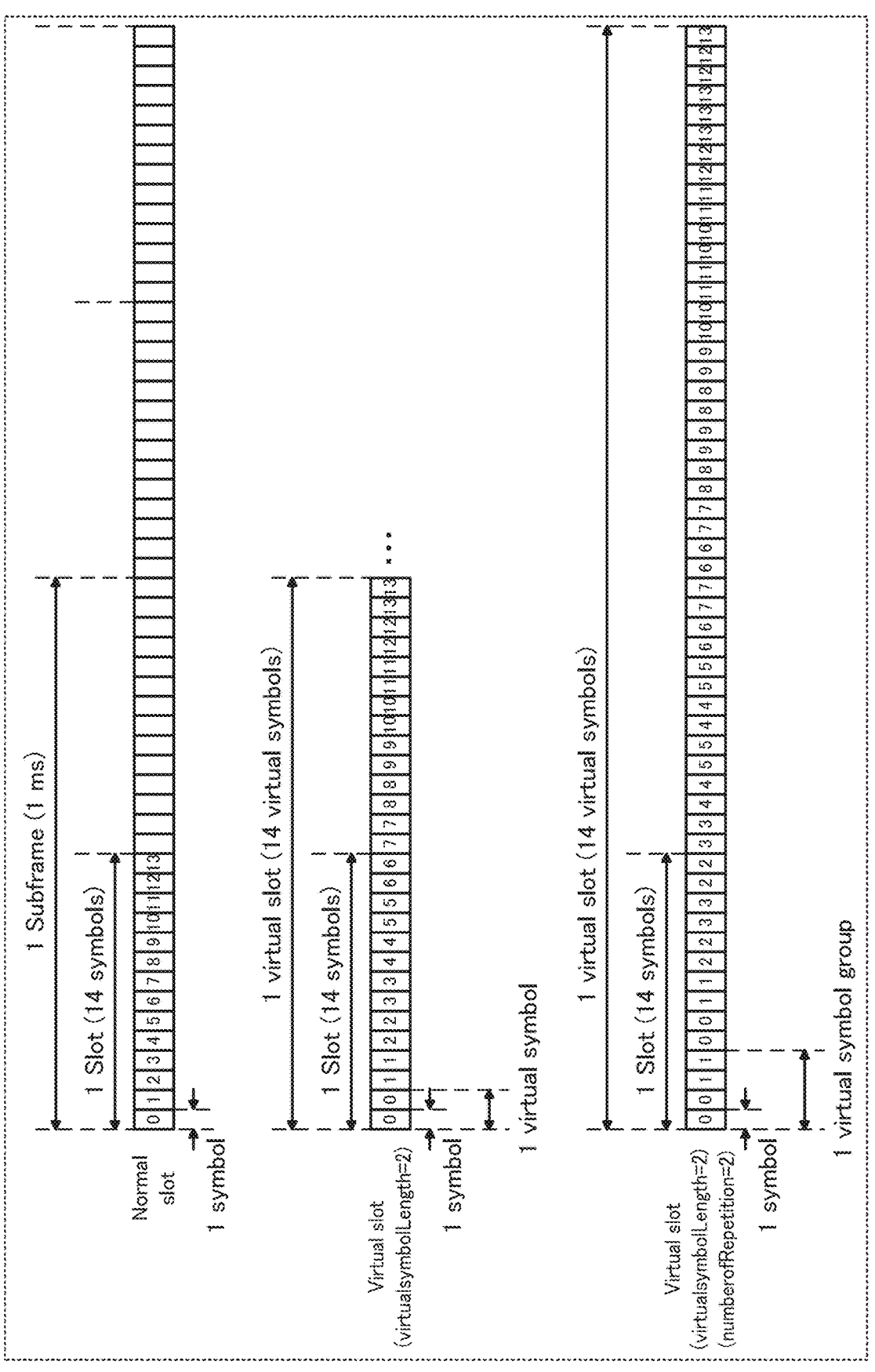
FIG. 26 illustrates an exemplary repetition according to Option R-3.

FIG. 26 illustrates an example of the Virtual symbol group-level Repetition. In FIG. 26, virtualsymbolLength=2, numberofRepetition, which is the number of Virtual symbol group-level Repetitions, is set to 2, and the number of Virtual symbols included in a Virtual symbol group=2.

As illustrated in FIG. 26, for example, one Virtual symbol group is composed of two Virtual symbols, such as Virtual symbols #0 and #1. Then, for the Virtual symbol group including two Virtual symbols, Repetition having numberof-Repetition=2 is performed.

For example, comparing the cases where virtualsymbol-Length=4 (example in Option FS-1-1) in FIG. 26 and FIG. 13 with each other, both cases have the Repetition by the same number of OHM symbols (i.e., Normal symbols). For example, in FIG. 13, four Normal symbols #0 are arranged contiguously. On the other hand, in FIG. 26, four Normal symbols #0 are dispersedly mapped two symbols each.

Thus, according to Option R-3, for example, data symbols including the same data or DMRS can be temporally dispersed in a slot or in a Virtual slot, so that the time diversity effect can be obtained.

Option R-1, Option R-2, and Option R-3 have been each described thus far.

<Configuration Method for Additional Repetition>

Next, a configuration method (i.e., indication method) for additional Repetition will be described.

The presence or absence of the additional Repetition and the number of repetitions may be semi-statically indicated by, for example, an UE-specific higher layer signal (e.g., RRC signal). In other words, the presence or absence of the additional Repetition and the number of repetitions may be indicated by, for example, an indication method as in the PDSCH/PUSCH/PUCCH repetition in NR Rel. 15 (e.g., see NPL 5 or 6).

In addition, the presence or absence of the additional Repetition and the number of repetitions may be indicated by, for example, being included in the above-mentioned TDRA table of PDSCH or PUSCH, or the parameters of the PUCCH resource. In other words, the presence or absence of the additional Repetition and the number of repetitions may be indicated by, for example, an indication method as in the PUSCH repetition in NR Rel. 16 (e.g., see NPL 7).

Meanwhile, for example, a Repetition method to be applied may be differ depending on an operation mode of terminal 200. By way of example, the Normal slot-level (in units of Normal slots) or mini-slot-level Repetition may be applied to an operation mode in which the number of Repetitions is not greater than a threshold value whereas a combination of the symbol-level Repetition and the Normal slot-level or mini-slot-level Repetition may be applied to an operation mode in which the number of Repetitions is greater than the threshold value (i.e., coverage enhancement mode).

<Early Termination>

For example, when Early termination is applied to PDSCH, terminal 200 may transmit ACK to base station 100 after receiving a signal of each Virtual slot (e.g., in case of Option R-1) or PDSCH assigned using a Virtual symbol or a Virtual slot (e.g., in case of Option R-2). ACK may be transmitted by using, for example, PUCCH.

Further, for example, when the Early termination is applied to PUSCH or PUCCH, terminal 200 may monitor a control signal for an notification indicating the Early termination, assuming that the indication may be transmitted from base station 100, after transmitting a signal of each Virtual slot (e.g., in case of Option R-1) or PUSCH or PUCCH assigned using a Virtual symbol or a Virtual slot (e.g., in case of Option R-2).

Here, the control signal indicating the Early termination may be included in, for example, DCI to be transmitted in a Group common PDCCH (e.g., DCI format 2-1 or DCI format 2-4) and in DCI to be transmitted in an UE-specific PDCCH (e.g., DCI format 0-0, DCI format 0-1, or DCI format 0-2).

Besides, for example, terminal 200 may replace, with the Early termination, the indication of ACK by a Downlink Feedback Indicator (DFI) that indicates ACK/NACK for the uplink Configured grant transmission. When the Early termination is indicated, for example, terminal 200 may stop the uplink transmission (e.g., PUSCH or PUCCH) even without performing transmission in the preconfigured number of Repetitions.

[7. Terminal Processing Time]

In NR, for example, processing time of terminal 200 is defined, the processing time including: a minimum signal processing time from the timing of PDSCH reception until terminal 200 transmits ACK/NACK feedback (e.g., see NPL 6), a minimum signal processing time from the timing of PDCCH reception for assigning PUSCH to the transmission of PUSCH (e.g., see NPL 6), CSI calculation time (e.g., see NPL 6), and the BWP switching time (e.g., see NPL 5).

In the present embodiment, for example, the following definitions may be applied to the processing time (e.g., minimum signal processing time) of terminal 200 when a Virtual symbol and a Virtual slot are configured by applying the symbol-level Repetition.

<Option PT-1>

In Option PT-1, for example, a value in units of symbols defined in NR Rel. 15 or NR Rel. 16 (i.e., units of Normal symbol) may be applied to the processing tune (e.g., minimum signal processing time) of terminal 200 when a Virtual symbol and a Virtual slot are configured by applying the symbol-level Repetition.

For example, even when the symbol-level Repetition is applied, the signal actually transmitted by terminal 200 is in units of Normal symbols. For example, terminal 200 transmits and/or receives Normal symbols in the number of virtualsymbolLengths in a time duration of a Virtual symbol. According to Option PT-1, it is possible to define a value similar to (that is, without change) the value defined in NR. Rel. 15 or NR. Rel. 16, with respect to the processing time e.g., minimum signal processing time) of terminal 200.

<Option PT-2>

In Option PT-2, for example, a value different from that in NR Rel. 15 or NR Rel. 16 may be defined with respect to the processing time e.g., minimum signal processing time) of terminal 200 when a Virtual symbol and a Virtual slot are configured by applying the symbol-level Repetition.

For example, with respect to the processing time of terminal 200 when a Virtual symbol and a Virtual slot are configured, a value obtained by adding an offset (e.g., several symbols) to the processing time of terminal 200 defined in NR Rel. 15 or Rel. 16 may be defined. Further, with respect to the processing time of terminal 200 when a Virtual symbol and a Virtual slot are configured by applying the symbol-level Repetition, for example, a value obtained by multiplying the processing time of terminal 200 defined in NR Rel. 15 or Rel. 16 by a coefficient (e.g., virtualsymbolLength) may be defined.

When the symbol-level Repetition is applied, for example, a process of combining DMRS and applying the channel estimation and the like may be added in terminal 200, and thus, the processing time of terminal 200 defined in NR Rel. 15 or Rel. 16 is possibly not applied.

By contrast, according to Option PT-2, a value different from the processing time of terminal 200 defined in NR Rel. 15 or Rel. 16 is applied to the processing time of terminal 200 when the symbol-level Repetition is applied, which enables appropriately indicating, to terminal 200, the timing for PUCCH for transmitting ACK/NACK or the transmission timing of PUSCH.

<Option PT-3>

In Option PT-3, for example, the processing time (e.g., minimum signal processing time) of terminal 200 when a Virtual symbol and a Virtual slot are configured by applying the symbol-level Repetition may be configured based on a certain condition.

For example, when the certain condition is satisfied, the processing time of terminal 200 defined in NR Rel. 15 or Rel. 16 may be applied to the processing time of terminal 200 when the symbol-level Repetition is applied. On the other hand, when the certain condition is not satisfied, a value different from the processing time of terminal 200 defined in NR Rel. 15 or Rel. 16 may be applied to the processing time of terminal 200 when the symbol-level Repetition is applied.

That is, in Option PT-3, Option PT-1 and Option PT-2 may be switched based on whether the certain condition is satisfied.

The certain condition may be, for example, that the additional DMRS is not be applied. In this case, for example, with respect to a minimum signal processing time from the timing of PDSCH reception to the transmission of ACK/NACK feedback, a minimum signal processing time may differ depending on whether to apply the additional DMRS. For example, when no additional DMRS is applied, the minimum signal processing time defined in NR Rel. 15 or Rel. 16 may be applied (i.e., no change from NR), and when the additional DMRS is applied, a newly defined minimum signal processing time may be applied.

Incidentally, the certain condition is not limited to the condition relating to the presence or absence of the additional DMRS and may be another condition. For example, a minimum signal processing time may differ depending on the PDCCH mapping type.

[8. PDCCH]

Methods for configuring Virtual symbols and Virtual slots by application of the symbol-level Repetition mentioned above may be applied to PDCCH.

When applying the symbol-level Repetition to PDCCH, for example, virtualsymbolLength may be semi-statically configured by a cell-specific or an UE-specific higher layer signal (e.g., RRC signal).

In addition, as described in Option C-4 mentioned above, virtualsymbolLength max be included in, for example, the parameters of the CORESET configuration.

For example, when the symbol-level Repetition is applied to PDCCH, PUSCH, or PDCCH mentioned above, the symbol-level Repetition for PDCCH has high affinity with them, which simplifies the resource allocation.

Further, for PDCCH, for example, the Repetition may be applied in units of the number of symbols (e.g., any of one to three symbols) included in CORESET. When PDCCH is subject to the Repetition in units of the number of symbols included in the CORESET, a search space (or CORESET) can be shared between terminals 200 having various PDCCH coverage enhancement levels (i.e., number of Repetitions).

[9. Application of Code Division Multiplexing or Space Time Block Code]

As mentioned above, even when the symbol-level Repetition is applied, a signal actually transmitted and/or received by terminal 200 is in units of Normal symbols, and terminal 200 transmits and/or receives Normal symbols in the number of virtualsymbolLengths, in a time duration of a Virtual symbol.

For example, An orthogonal code (e.g., Orthogonal Cover code: OCC) may be applied to a plurality (e.g., number of virtualsymbolLength) Normal symbols included in one Virtual symbol. The application of OCC enables, for example, code division multiplexing (CDM) of signals for a plurality of terminals 200 to which various OCC are applied, in the same time- and frequency-resources. The application of CDM can improve the resource utilization efficiency by Repetition.

Further, for example, in a case where the transmission side has a plurality of antenna ports, a Space Time Block Code (STBC) may be applied to a plurality (e.g., number of virtualsymbolLength) of symbols included in one Virtual symbol (e.g., see NPL 8). The application of STBC makes it possible to obtain the transmission diversity effect and to further improve the coverage.

[10. Conflict with Uplink/Downlink Pattern]

In NR, for example, terminal 200 can identify the type of slot or the type of symbol in the slot (e.g., any of downlink symbol, uplink symbol and Flexible symbol) by using SFI indication from base station 100. SFI may be indicated from base station 100 to terminal 200 by, for example, a higher layer signal (e.g., RRC signal) or a group shared downlink control signal (Group common PDCCH).

In NR, for example, part of a time resource may conflict (in other words, overlap or collide) with information on uplink and downlink indicated by SFI (hereinafter may be also referred to as "uplink/downlink pattern"). For example, part of the time resource for PUSCH (e.g., uplink symbol) may be configured as a downlink symbol in SFI. In this case, terminal 200 need not transmit PUSCH in the slot (in other words, may drop transmission). That is, terminal 200 may transmit PUSCH by using some symbols not having the conflict between the PUSCH resource and the uplink/downlink pattern.

Moreover, as mentioned above, even when the symbol-level Repetition is applied, a signal actually transmitted and/or received by terminal 200 is in units of Normal symbols, and terminal 200 transmits and/or receives Normal symbols in the number of virtualsymbolLengths, in a time duration of a Virtual symbol.

Furthermore, it is also assumed that the type of slot or the type of symbol in the slot indicated by SFI is configured in units of, for example, Normal symbols or Normal slots. In other words, the types of Normal symbols or the types of Normal slots respectively included in a Virtual symbol or a Virtual slot may be different from each other.

Thus, for example, in the time domain resource for transmission and/or reception designated by the above-mentioned methods, some of Normal symbols included in a Virtual symbol may conflict with the uplink/downlink pattern indicated by SFI. In this situation, the following methods may be applied as an operation of terminal 200.

<Method 1>

In Method 1, terminal 200, tor example, may determine not to perform (i.e., drop) transmission and/or reception of all Normal symbols included in the Virtual symbol.

<Method 2>

In Method 2, terminal 200, for example, may perform transmission and/or reception by using some Normal symbols not having the conflict with the uplink/downlink pattern, among a plurality of Normal symbols included in the Virtual symbol. In other words, terminal 200, for example, may determine not to perform (i.e., drop) transmission and/or reception of a Normal symbol having the conflict with the uplink/downlink pattern, among a plurality of Normal symbols included in the Virtual symbol.

<Method 3>

In Method 3, terminal 200, for example, may switch between Method 1 and Method 2 described above, based on whether to apply the above-mentioned CDM or STBC.

By way of example, when CDM or STBC is applied, terminal 200 may not perform transmission and/or reception of all Normal symbols included in the Virtual symbol (i.e., Method 1 may be applied). On the other hand, for example, when CDM or STBC is not applied, terminal 200 may perform transmission and/or reception by using some symbols not having the conflict with the uplink/downlink pattern, among the Normal symbols included in the Virtual symbol. (i.e., Method 2 may be applied).

Meanwhile, terminal 200 may switch between Method 1 and Method 2 based on, for example, the type of channel/signal, regardless of whether to apply CDM or STBC.

The operation examples of Repetitions in units of symbols have been described thus far.

Next, an example of processing of terminal 200 will be described.

Figure 27:
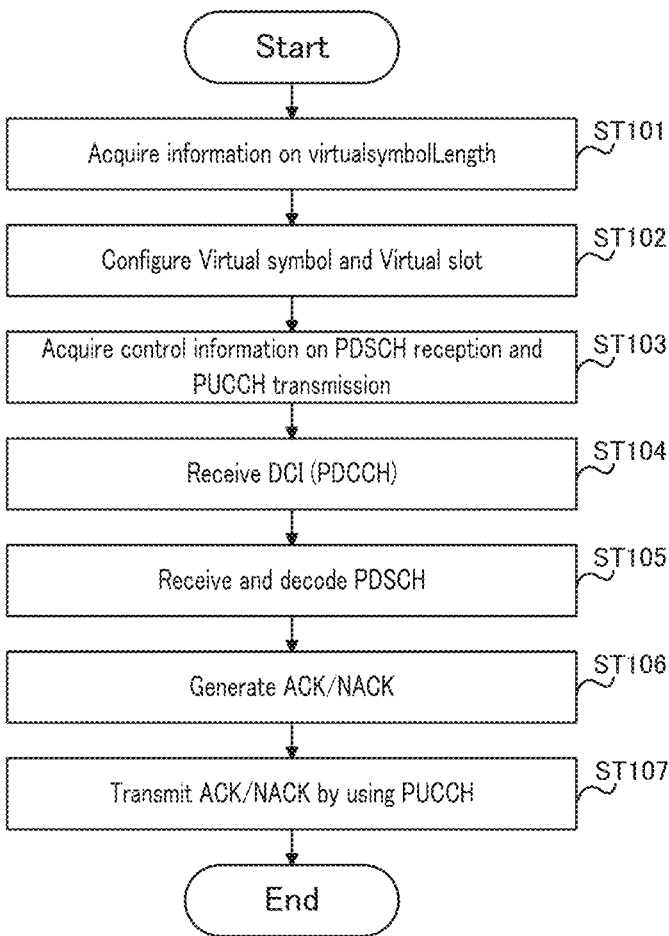
FIG. 27 is a flowchart illustrating an operation example of PDSCH reception and PUCCH transmission in the terminal.

FIG. 27 is a flowchart illustrating an operation example of terminal 200 in a downlink data reception (e.g., PDSCH reception and PUCCH transmission) according to the present embodiment.

In FIG. 27, terminal 200 acquires, for example, information on the symbol-level Repetition (ST101), The information on the symbol-level Repetition may be information on the number of Normal symbols included in one Virtual symbol (e.g., virtualsymbolLength). For example, the processing of ST101 may include the processing described in [2. Configuration (Setting) Example of Virtualsymbol-Length] mentioned above.

Terminal 200, for example, configures (i.e., set) a Virtual symbol and a Virtual slot (ST102). For example, the processing of ST102 may include the processing described in [3. Configuration Examples of Virtual Symbol and Virtual Slot] mentioned above, Terminal 200 acquires, for example, control information on PDSCH reception and control information on PUCCH transmission (ST103).

Terminal 200 receives DCI in, for example, PDCCH (ST104). Terminal 200 also receives PDSCH at, for example, the downlink resource indicated by DCI and decodes PDSCH (ST105).

Further, terminal 200 generates ACK/NACK based on, for example, the decoding result for PDSCH (ST106) and transmits ACK/NACK to base station 100 by using PUCCH (ST107).

For example, the processing of ST104 to ST107 may include the processing described in at least one of the above-mentioned [4. Resource Allocation] and [5. DMRS Mapping] on one hand, and [7. Terminal Processing Time] and [8. PDCCH] on the other hand.

For example, when Option FS-2 in [3. Configuration Examples of Virtual Symbol and Virtual Slot] is applied, in the processing of ST103 or ST104, terminal 200 may configure, after acquiring the resource allocation information related to the time domain resource, a Virtual symbol and a Virtual slot based on the information on virtualsymbolLength, as in ST102.

Figure 28:
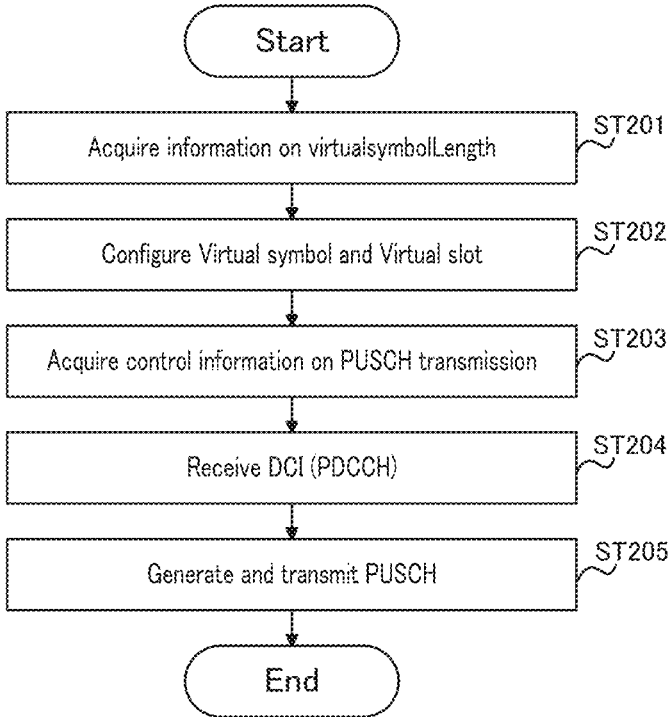
FIG. 28 is a flowchart illustrating an operation example of PUSCH transmission in the terminal.

FIG. 28 is a flowchart illustrating an operation example of terminal 200 in an uplink data reception (e.g., PUSCH transmission) according to the present embodiment.

In FIG. 28, terminal 200 acquires, for example, information on the symbol-level Repetition (ST201). The information on the symbol-level Repetition may be information on the number of Normal symbols included in one Virtual symbol (e.g., virtualsymbolLength). For example, the processing of ST201 may include the processing described in [2. Configuration (Setting) Example of Virtualsymbol-Length] mentioned above.

Terminal 200, for example, configures (i.e., set) a Virtual symbol and a Virtual slot (ST202), For example, the processing of ST202 may include the processing described in [3. Configuration Examples of Virtual Symbol and Virtual Slot] mentioned above.

Terminal 200 acquires, for example, control information on PUSCH transmission (ST203).

Terminal 200 receives DCI in, for example, PDCCH (ST204).

Terminal 200 also generates PUSCH based on, for example, the information on PUSCH transmission and an uplink resource indicated by DCI, and then transmits PUSCH to base station 100 (ST205).

For example, the processing of ST204 to ST205 may include the processing described in the above-mentioned [4. Resource Allocation] and [5. DMRS Mapping], and [7. Terminal Processing Time] or [8. PDCCH].

In FIG. 27 and FIG. 28, although a description has been given of the case not applying the above-mentioned [6. Additional Repetition], [9. Application of Code Division Multiplexing or Space Time Block Code], and [10. Conflict with uplink/downlink pattern], these may be applied in the present embodiment.

The operation example of terminal 200 has been described thus far.

According to the present embodiment, terminal 200 controls communication based on a Virtual symbol composed of a plurality of Normal symbols as one unit or a Virtual slot composed of a plurality of Virtual symbols. With this control, for example, the channel estimation accuracy in radio communication can be improved by the Repetition in a plurality of Normal symbols composing the Virtual symbol (i.e., symbol-level Repetition).

The embodiment according to an exemplary embodiment of the present disclosure has been described thus far.

Other Embodiments

In the above-mentioned embodiment, for convenience, the terms such as Virtual symbol and Virtual slot have been used, but another term may be adopted. For example, the Virtual symbol/Virtual slot may be referred to as "Super symbol/Super slot," "hyper symbol/hyper slot," "Coverage Enhancement (CE) symbol/CE slot," "Pseudo symbol; pseudo slot," or "extended symbol/extended slot".

Further, a Normal symbol and a Normal slot may be referred to as, for example. "Non-virtual symbol/Non-Virtual slot," "Non-super symbol/Non-super slot," "Non-hyper symbol/Non-hyper slot," "Non-CE symbol/Non-CE slot," "Non-Pseudo symbol/Non-Pseudo slot," or "Non-extended symbol/Non-extended slot." The Normal symbol and the Normal slot may be referred to simply as "symbol/slot."

Further, in the above-mentioned embodiment, the downlink communication and the uplink communication between base station 100 and terminal 200 have been assumed. However, an exemplary embodiment of the present disclosure is not limited to this and may be applied to communication between terminals (e.g., sidelink communication).

Further, the downlink control channel, the downlink data channel, the uplink control channel, and the uplink data channel are not limited to be PDCCH, PDSCH, PUCCH, and PUSCH, respectively, and may be control channels of other names.

Further, in the above-mentioned embodiment, RRC signaling is assumed as higher layer signaling, but it may be replaced with Medium Access Control (MAC) signaling and an indication by DCI that is physical layer signaling.

Further, in the above-mentioned embodiment, the time domain resource unit is not limited to a slot and a symbol, and may be, for example, a time domain resource unit such as a frame, a subframe, a slot, a subslot, or a symbol, and may be another time domain resource unit.

In addition, the parameters applied in the above-mentioned embodiment are merely examples and are not limited to these examples. By way of example, at least one of parameters such as the number of Normal symbols composing a Virtual symbol (virtualsymbolLength), the offset in units of Normal symbols, the slot offsets, the symbol positions, and the number of symbols is not limited to the value in the above-mentioned embodiment and may be another value.

Further, in the above-mentioned embodiment, the case of using DMRS has been described, but the reference signal is not limited to DMRS and may be another reference signal.

Further, in the above-mentioned embodiment, frequency hopping may be applied. In this case, a frequency hopping duration may be determined (in other words, identified) based on, for example, at least a Virtual symbols and a Virtual slot.

A configuration method and an operation for/of frequency hopping will be described below.

For example, base station 100 and terminal 200 may determine (in other words, identify), based on a Virtual symbol and a Virtual slot, a frequency hopping duration used for communication (e.g., number of Virtual symbols included in each hop duration) and DMRS resource allocation for each hop. In other words, information on a Normal slot and on a Normal symbol need not be used for identifying the frequency hopping duration and the DMRS resource allocation for each hop.

In NR, for example, the frequency hopping may be applied to PUCCH and PUSCH. The frequency hopping may be applied so that the number of symbols included in each hop duration is equal to respect to the number of assigned symbols, for example. In one example, in a case where the number of assigned symbols is N symbols, the number of symbols included in a first frequency hop duration may be coil (N/2) symbols, and the number of symbols included in a second frequency hop duration may be N-ceil (N/2) symbols. Further, in NR, for example, whether to apply the frequency hopping may be configured by higher layer signaling or may be indicated by DCI.

In a case where the frequency hopping is applied to the above-mentioned embodiment, for example, the frequency hopping operation is applied while a Normal slot and a Normal symbol are replaced with a Virtual slot and a Virtual symbol. In other words, the DMRS resource mapping to the frequency hopping duration or each hop may be identified based on, for example, the number of Virtual symbols in the Virtual slot. That is, when the number of assigned Virtual symbols is N, the number of Virtual symbols included in the first frequency hop duration may be coil (N/2), and the number of Virtual symbols included in the second frequency hop duration may be N-ceil (N/2). Further, a symbol number e.g., Normal symbol number or Virtual symbol number) included in each hopping duration where the DMRS resource is mapped is the same.

In the manner described above, for example, with respect to terminal 200, virtualsymbolLength is set while the Virtual symbol and the Virtual slot are configured, so that the frequency hopping and the DMRS mapping for the symbol-level Repetition (i.e., Virtual slot configuration) can be identified based on a frequency hopping operation as in the Normal slot configuration; accordingly, it is possible to simultaneously obtain the frequency diversity effect due to the frequency hopping and the channel estimation accuracy improvement effect due to the symbol-level Repetition.

Incidentally, the number of Virtual symbols included in each frequency hopping duration (frequency hop) and the number of Normal symbols included in the Virtual symbol may be different.

<5G NR System Architecture and Protocol Stack>

3GPP has been working on the next release for the 5th generation cellular technology (simply called "5G"), including the development of a new radio access technology (NR)

operating in frequencies ranging up to 100 GHz. The first version of the 5G standard was completed at the end of 2017, which allows proceeding to 5G NR standard-compliant trials and commercial deployments of terminals (e.g., smart-phones).

Figure 29:
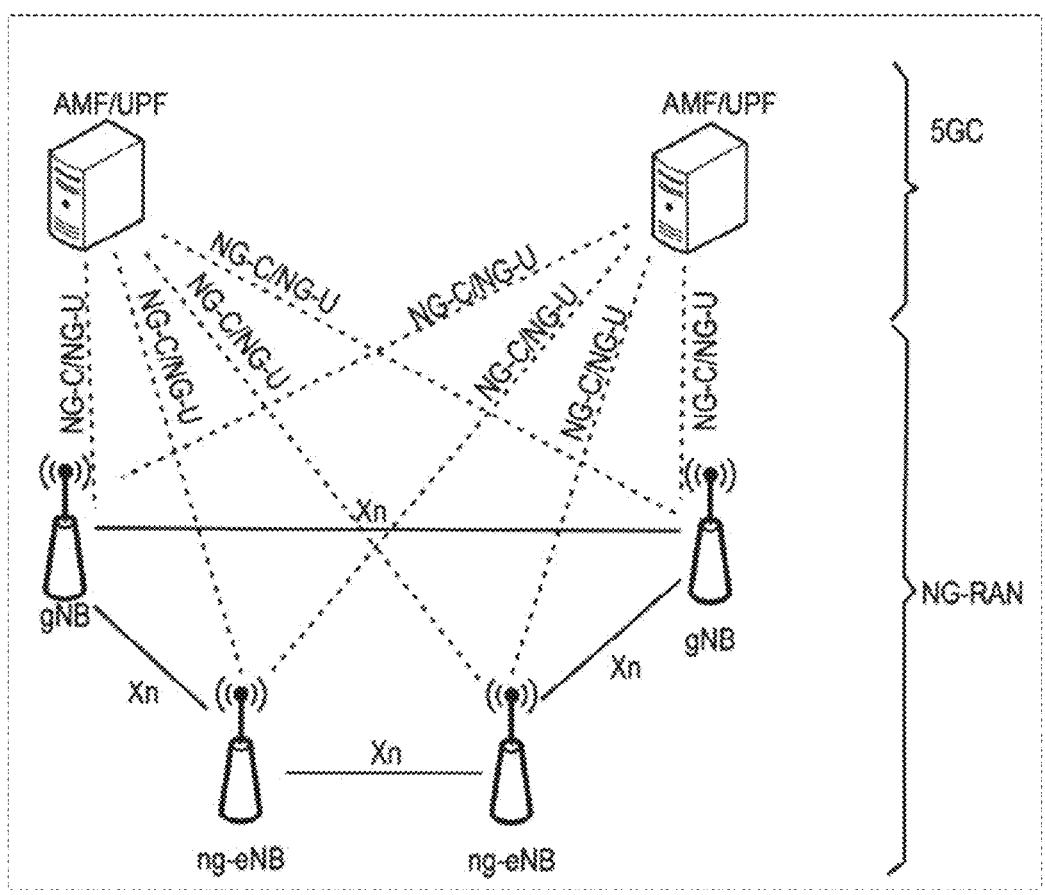
FIG. 29 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are inter-connected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 29 (see e.g., 3GPP TS 38.300 v15.6.0, section 4).

The user plane protocol stack for NR (see e.g., 3GPP TS 38.300, section 44.1) includes the PDCP (Packet Data Convergence Protocol, see clause 6.4 of TS 38.300). RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respec-tively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and schedul-ing-related functions, including handling of different numer-ologies.

The physical layer (PRY) is for example responsible for coding, PRY HARQ processing, modulation, multi-antenna processing, and mapping of the signal to the appropriate physical time-frequency resources. The physical layer also handles mapping of transport channels to physical channels. The physical layer provides services to the MAC layer in the firm of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse require-ments in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km² in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 30:
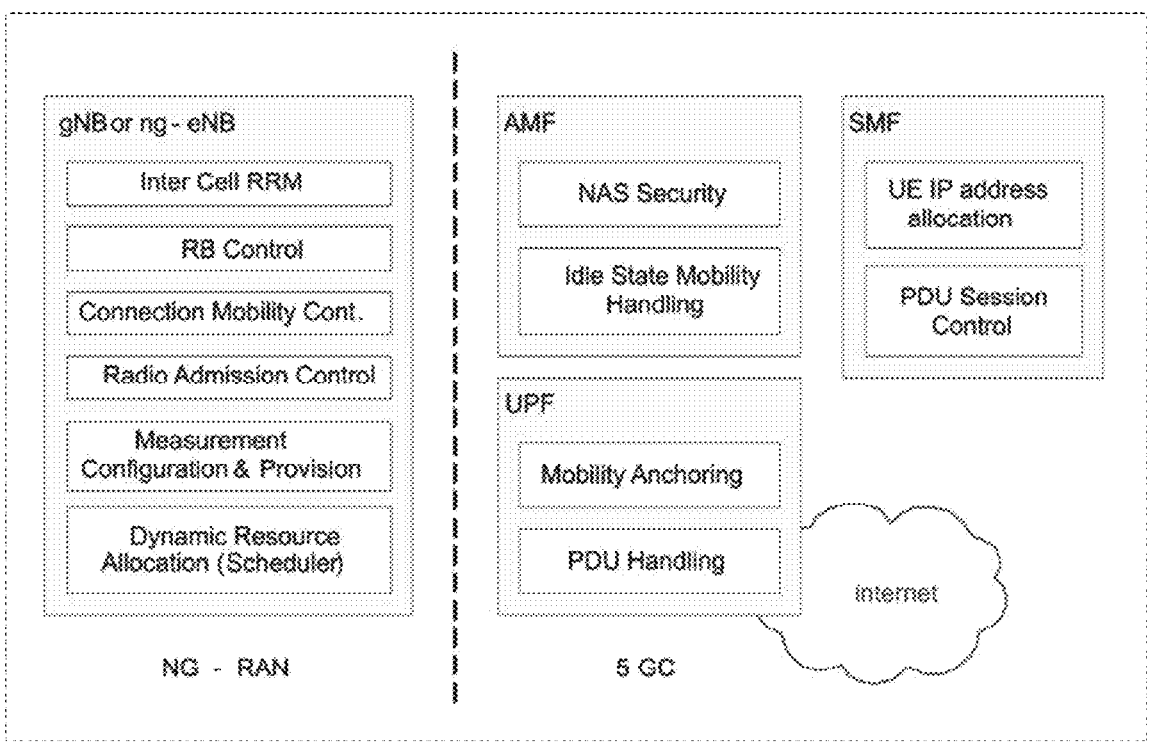
FIG. 30 schematically illustrates a functional split between Next Generation-Radio Access Network (NG-RAN) and 5th Generation Core (5GC)

FIG. 30 illustrates the functional split between the NG-RAN and the 5GC. A logical node of the NG-RAN is gNB or ng-eNB. The 5GC includes logical nodes AMF, UPF, and SMF.

For example, gNB and rig-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UE; in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data indication.

<RRC Connection Setup and Reconfiguration Procedure>

Figure 31:
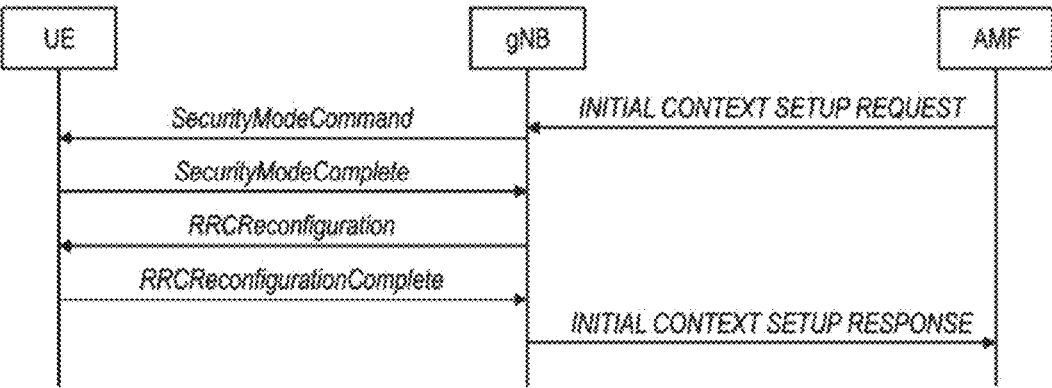
FIG. 31 is a sequence diagram of a Radio Resource Control (RRC) connection setup/reconfiguration procedure.

FIG. 31 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCRecon-figuration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 32:
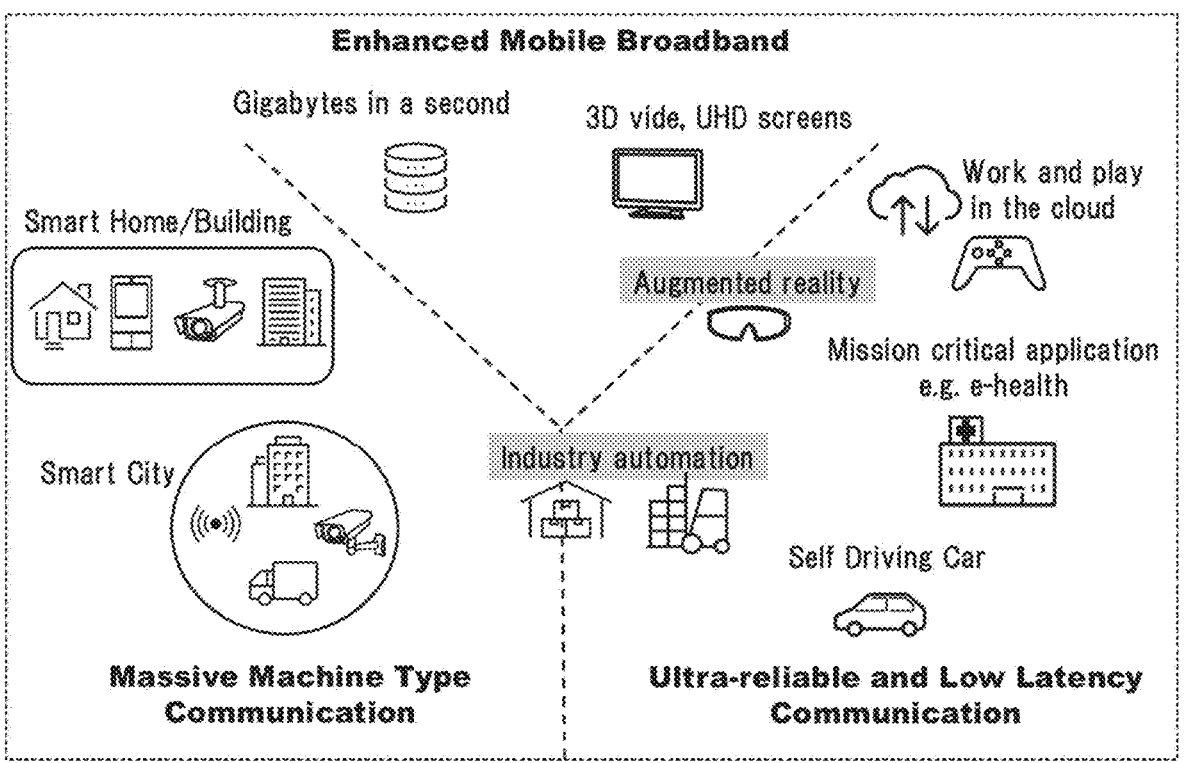
FIG. 32 schematically illustrates usage scenarios of enhanced Mobile BroadBand (eMBB), massive Machine Type Communications (mMTC), and Ultra Reliable and Low Latency Communications (URLLC)

FIG. 32 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 32 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (config-ured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission fora service-type A (URLLC) may be pre-empted by a transmission for a service type B (such as eMBB). Technology enhancements with respect to reliability improvement include dedicated COI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider, One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/rep-etition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow hit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 18. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 33:
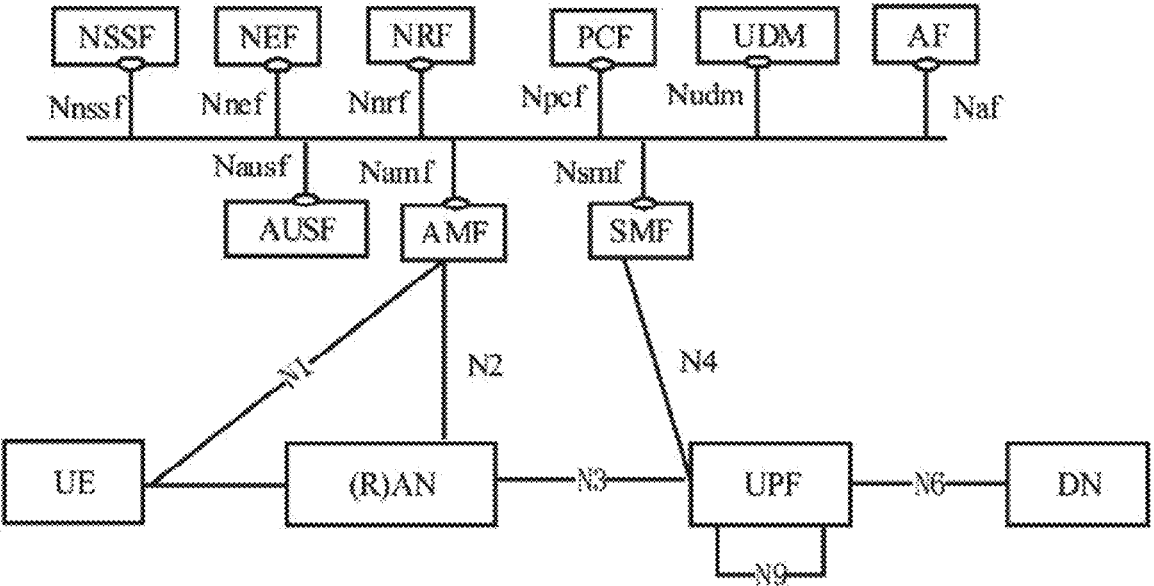
FIG. 33 is a block diagram illustrating an exemplary 5G system architecture for a non-roaming scenario.

FIG. 33 illustrates a 5G NR non-roaming reference architecture (see TS 23.501 v16.1.0, section 4.23). An Application Function (AF) (e.g., an external application server hosting 5G services, exemplarily described in FIG. 32) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 33 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gale Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, controls communication in units of certain symbols each being a symbol with which a plurality of first symbols is associated in one unit and being referred to as a second symbol; and communication circuitry, which, in operation, performs the communication.

In an exemplary embodiment of the present disclosure, the control circuitry controls the communication in units of time durations each composed of a plurality of the second symbols.

In an exemplary embodiment of the present disclosure, the plurality of first symbols is consecutive symbols.

In an exemplary embodiment of the present disclosure, in the plurality of first symbols, a signal is subject to repetition.

In an exemplary embodiment of the present disclosure, a number of the plurality of second symbols forming the time duration is the same as a number of the plurality of first symbols composing a slot.

In an exemplary embodiment of the present disclosure, reception circuitry, which, in operation, receives information on a number of the plurality of first symbols composing the second symbol is further included.

In an exemplary embodiment of the present disclosure, the information on the number of the plurality of first symbols indicates one of a plurality of candidate numbers of symbols.

In an exemplary embodiment of the present disclosure, the information on the number of the plurality of first symbols is configured for at least one of downlink and/or uplink.

In an exemplary embodiment of the present disclosure, the information on the number of the plurality of first symbols is configured for each channel used for the communication or each signal used for the communication, with respect to the terminal.

In an exemplary embodiment of the present disclosure, the information on the number of the plurality of first symbols is configured for each configuration of a parameter for the terminal.

In an exemplary embodiment of the present disclosure, the number of the plurality of first symbols composing the second symbol is a power of 2.

In an exemplary embodiment of the present disclosure, the number of the plurality of first symbols composing the second symbol is configured based on a number of the plurality of first symbols composing a slot.

In an exemplary embodiment of the present disclosure, a number of the plurality of first symbols composing one of at least two of the plurality of second symbols included in the time duration is different from a number of the plurality of first symbols composing another one of the at least two of the plurality of second symbols.

In an exemplary embodiment of the present disclosure, an upper limit value of the number of the plurality of first symbols composing the second symbol is smaller than a number of the plurality of first symbols composing a slot.

In an exemplary embodiment of the present disclosure, the second time duration starts from a start position of a slot.

In an exemplary embodiment of the present disclosure, the second time duration starts from any symbol position of a slot.

In an exemplary embodiment of the present disclosure, the control circuitry determines a time domain resource for the communication, based on at least one of a plurality of the second symbols and the time duration.

In an exemplary embodiment of the present disclosure, the control circuitry determines a time domain resource for the communication, based on at least one of a plurality of the second symbols, the time duration, the plurality of first symbols, and a slot.

In an exemplary embodiment of the present disclosure, the control circuitry determines a time domain resource for the communication, based on at least one of a plurality of the second symbols, the time duration, an offset relating to the plurality of first symbols, and a slot.

In an exemplary embodiment of the present disclosure, the control circuitry determines mapping of a reference signal used for the communication to a time domain resource, based on at least one of a plurality of the second symbols and the time duration.

In an exemplary embodiment of the present disclosure, the control circuitry determines mapping of a reference signal used for the communication to a time domain resource, based on at least one of a plurality of the second symbols, the time duration, and a slot.

In an exemplary embodiment of the present disclosure, the control circuitry controls repetition in the communication, based at least in units of the time durations and/or in units each including the plurality of second symbols configured as a single unit.

In an exemplary embodiment of the present disclosure, at least one of the units each including the plurality of second symbols configured as a single unit is a unit of a resource allocated to a signal in units of the plurality of second symbols.

A communication method according to an exemplary embodiment of the present disclosure includes: controlling, by a terminal, communication in units of certain symbols each being a symbol with which a plurality of first symbols is associated in one unit and being referred to as a second symbol; and performing the communication by the terminal.

The disclosure of Japanese Patent Application No. 2020-028050, filed on Feb. 21, 2020, including the specification, drawings and abstract, is incorporated herein by reference in entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. A terminal, comprising:

control circuitry, which, in operation, controls communication in units of virtual symbols in a virtual slot, the virtual slot being composed of symbols in a plurality of slots, a total number of the virtual symbols in the virtual slot being equal to a total number of symbols in each of the plurality of slots, each of the virtual symbols including a plurality of consecutive symbols of the symbols in the plurality of slots associated in one unit, a signal in the plurality of consecutive symbols being subject to repetition;

communication circuitry, which, in operation, performs the communication; and reception circuitry, which, in operation, receives information on a total number of the plurality of consecutive symbols composing each of the virtual symbols in the virtual slot, wherein the information includes information on the total number of the plurality of consecutive symbols composing each of the virtual symbols in the virtual slot for each of a plurality of types of channels used for the communication, and the total number of the plurality of consecutive symbols composing each of the virtual symbols in the virtual slot differs for each of the plurality of types of channels.

2. The terminal according to claim 1, wherein the control circuitry controls communication in units of time durations each composed of a plurality of virtual symbols.

3. The terminal according to claim 1, wherein the information indicates one of a plurality of candidate numbers of symbols.

4. The terminal according to claim 1, wherein the information includes information on the total number of the plurality of consecutive symbols composing each of the virtual symbols for a downlink or an uplink.

5. The terminal according to claim 1, wherein the total number of the plurality of consecutive symbols composing each of the virtual symbols is a power of 2.

6. The terminal according to claim 1, wherein the total number of the plurality of consecutive symbols composing each of the virtual symbols is configured based on a number of the plurality of consecutive symbols composing a slot.

7. The terminal according to claim 2, wherein a number of the plurality of consecutive symbols composing one of at least two of the virtual symbols included in a time duration is different from a number of the plurality of consecutive first symbols composing another one of the at least two of the virtual symbols.

8. The terminal according to claim 1, wherein an upper limit value of the total number of the plurality of consecutive symbols composing each of the virtual symbols is smaller than a number of the plurality of consecutive symbols composing a slot.

9. The terminal according to claim 1, wherein the information includes information on the total number of the plurality of consecutive symbols composing each of the virtual symbols for each of a plurality of types of signals used for the communication.

10. The terminal according to claim 1, wherein the information includes information on the total number of the plurality of consecutive symbols composing each of the virtual symbols for each of a plurality of parameters for the terminal.

11. The terminal according to claim 1, wherein the total number of the plurality of consecutive symbols composing each of the virtual symbols for a first type of channel is different from the total number of the plurality of consecutive symbols composing each of the virtual symbols for a second type of channel.

12. The terminal according to claim 1, wherein the information includes information on the total number of the plurality of consecutive symbols composing each of the virtual symbols for each of a first type of symbols and a second type of symbols, and the total number of the plurality of consecutive symbols composing each of the virtual symbols for the first type of symbols is different from the total number of the plurality of consecutive symbols composing each of the virtual symbols for the second type of symbols.

13. A communication method, comprising:

controlling, by a terminal, communication in units of virtual symbols in a virtual slot, the virtual slot being composed of symbols in a plurality of slots, a total number of the virtual symbols in the virtual slot being equal to a total number of symbols in each of the plurality of slots, each of the virtual symbols including a plurality of consecutive symbols of the symbols in the plurality of slots associated in one unit, a signal in the plurality of consecutive symbols being subject to repetition;

performing the communication by the terminal; and receiving, by the terminal, information on a total number of the plurality of consecutive symbols composing each of the virtual symbols in the virtual slot, wherein the information includes information on the total number of the plurality of consecutive symbols composing each of the virtual symbols in the virtual slot for each of a plurality of types of channels used for the communication, and the total number of the plurality of consecutive symbols composing each of the virtual symbols in the virtual slot differs for each of the plurality of types of channels.

\* \* \* \* \*